US009354370B1

(12) United States Patent  (10) Patent No.: US 9,354,370 B1
Erdogan et al.  (45) Date of Patent: May 31, 2016

(54) OPTICAL THIN-FILM NOTCH FILTER WITH VERY WIDE PASS BAND REGIONS

(75) Inventors: Turan Erdogan, Spenceport, NY (US); Ligang Wang, Penfield, NY (US)

(73) Assignee: SEMROCK, INC., Rochester, NY (US)

( * ) Notice: Subject to any disclaimer, the term of this patent is extended or adjusted under 35 U.S.C. 154(b) by 543 days.

(21) Appl. No.: 12/238,228

(22) Filed: Sep. 25, 2008

Related U.S. Application Data

(60) Provisional application No. 60/974,851, filed on Sep. 25, 2007.

(51) Int. Cl.
*G02B 5/28* (2006.01)
(52) U.S. Cl.
CPC ....................... *G02B 5/288* (2013.01)
(58) Field of Classification Search
CPC ................. G02B 1/115; G02B 5/288
USPC ................. 359/588, 586, 587, 589, 580, 584; 313/570
See application file for complete search history.

(56) References Cited

U.S. PATENT DOCUMENTS

| | | | |
|---|---|---|---|
| 2,406,318 A | 8/1946 | Brace | |
| 2,670,400 A | 2/1954 | Grunwald | |
| 3,306,158 A | 2/1967 | Makabe et al. | |
| 3,390,604 A | 7/1968 | Makabe | |
| 3,492,478 A | 1/1970 | Smith | |
| 3,666,351 A | 5/1972 | Pao | |
| 3,759,604 A * | 9/1973 | Thelen | 359/588 |
| 3,861,788 A | 1/1975 | Webster | |
| 3,864,037 A | 2/1975 | Johnson | |
| 4,009,453 A | 2/1977 | Mahlein | |
| 4,082,464 A | 4/1978 | Johnson, Jr. | |
| 4,084,909 A | 4/1978 | Mathisen | |
| 4,141,653 A | 2/1979 | Arnold | |
| 4,176,916 A | 12/1979 | Carpenter | |
| 4,373,782 A | 2/1983 | Thelen | |
| 4,410,272 A | 10/1983 | Beauvineau et al. | |
| 4,461,532 A * | 7/1984 | Sato et al. | 359/359 |

(Continued)

FOREIGN PATENT DOCUMENTS

DE  20 2008 016 287 U1  4/2009
EP  1 130 432 A2  9/2001

(Continued)

OTHER PUBLICATIONS

Baumeister, *Optical Coating Technology*, (2004) p. 10, SPIE Press, Bellingham, Washington USA.

(Continued)

*Primary Examiner* — Audrey Y Chang

(74) *Attorney, Agent, or Firm* — Finnegan, Henderson, Farabow, Garrett & Dunner, LLP

(57) ABSTRACT

The present disclosure relates to thin film notch filters having the basic structure of an interference filter. In some embodiments, the filters according to the present disclosure exhibit at least one notch correlating to a pass band defect. The filters of the present disclosure may exhibit at least one of improved pass band bandwidth, improved edge steepness, narrower notch band FWHM, and lower sensitivity to material mismatch, relative to prior known thin film notch filters based on the basic structure of an interference filter. The present disclosure also relates to methods of making the filters described herein, and the use of these filters in optimal measurement systems.

22 Claims, 19 Drawing Sheets

(56) References Cited

U.S. PATENT DOCUMENTS

| | | | |
|---|---|---|---|
| 4,684,255 | A | 8/1987 | Ford |
| 4,733,926 | A | 3/1988 | Title |
| 4,738,535 | A | 4/1988 | Webster |
| 4,772,798 | A | 9/1988 | Craig |
| 4,775,234 | A | 10/1988 | Shimomura |
| 4,925,259 | A * | 5/1990 | Emmett .................. 359/359 |
| 5,034,613 | A | 7/1991 | Denk et al. |
| 5,132,826 | A | 7/1992 | Johnson et al. |
| 5,149,578 | A * | 9/1992 | Wheatley et al. .......... 428/213 |
| 5,221,957 | A | 6/1993 | Jannson et al. |
| 5,400,174 | A * | 3/1995 | Pagis et al. ............. 359/359 |
| 5,449,413 | A * | 9/1995 | Beauchamp et al. ......... 136/257 |
| 5,481,402 | A | 1/1996 | Cheng et al. |
| 5,591,981 | A | 1/1997 | Heffelfinger et al. |
| 5,767,965 | A | 6/1998 | Zhou et al. |
| 5,781,332 | A | 7/1998 | Ogata |
| 5,781,341 | A | 7/1998 | Lee |
| 5,796,512 | A | 8/1998 | Wachman et al. |
| 5,852,498 | A | 12/1998 | Youvan et al. |
| 5,926,317 | A | 7/1999 | Cushing |
| 5,953,169 | A | 9/1999 | Tsai |
| 6,075,599 | A | 6/2000 | Milman et al. |
| 6,110,337 | A | 8/2000 | Sullivan et al. |
| 6,115,180 | A | 9/2000 | Hirai et al. |
| 6,217,720 | B1 | 4/2001 | Sullivan et al. |
| 6,292,299 | B1 | 9/2001 | Liou |
| 6,344,653 | B1 | 2/2002 | Webb et al. |
| 6,362,904 | B1 | 3/2002 | Cormack |
| 6,611,378 | B1 | 8/2003 | Wang et al. |
| 6,700,690 | B1 | 3/2004 | Buchsbaum et al. |
| 6,781,757 | B2 | 8/2004 | Cormack |
| 6,809,859 | B2 | 10/2004 | Erdogan et al. |
| 6,879,619 | B1 | 4/2005 | Green et al. |
| 6,894,838 | B2 | 5/2005 | Mizrahi et al. |
| 6,897,609 | B2 * | 5/2005 | Krisl et al. .................. 313/570 |
| 6,943,938 | B1 | 9/2005 | Liu et al. |
| 7,050,224 | B2 | 5/2006 | Kawamata et al. |
| 7,068,430 | B1 | 6/2006 | Clarke et al. |
| 7,119,960 | B1 | 10/2006 | Erdogan et al. |
| 7,123,416 | B1 | 10/2006 | Erdogan et al. |
| 7,411,679 | B2 | 8/2008 | Erdogan et al. |
| 7,420,678 | B2 | 9/2008 | Lundgren et al. |
| 7,453,568 | B2 | 11/2008 | Kawamata et al. |
| 8,059,327 | B1 | 11/2011 | Erdogan et al. |
| 2002/0054614 | A1 | 5/2002 | Jin |
| 2004/0240093 | A1 | 12/2004 | Yoshikawa et al. |
| 2005/0171630 | A1 | 8/2005 | Dinauer et al. |
| 2006/0007547 | A1 | 1/2006 | Kamikawa |
| 2006/0158991 | A1 | 7/2006 | Hatano et al. |
| 2006/0228089 | A1 | 10/2006 | Shimokozono et al. |
| 2007/0268568 | A1 | 11/2007 | Higashi et al. |
| 2008/0037129 | A1 | 2/2008 | Hodgson et al. |
| 2008/0055584 | A1 | 3/2008 | Pradhan et al. |
| 2008/0055716 | A1 | 3/2008 | Erdogan et al. |
| 2008/0055717 | A1 | 3/2008 | Pradhan et al. |

FOREIGN PATENT DOCUMENTS

| | | |
|---|---|---|
| WO | WO 2004/111717 A1 | 12/2004 |
| WO | WO 2006/080422 A1 | 8/2006 |

OTHER PUBLICATIONS

Thelen, *Design of Optical Interference Coatings*, (1989) p. 180-195, McGraw Hill New York, New York USA.

Wang, "Constrain of Coating Thickness on LaserMux," Semrock Memorandum (Jan. 9, 2007), p. 1-2 and Attachment #1: Newport Tutorials entitled "Gaussian Beam Optics Tutorial" (Dec. 17, 2008).

A. Thelen, "Design of Optical Minus Filters," J. Opt. Soc. Am., vol. 61, pp. 365-369 (Mar. 1971)(5 pages).

A. Thelen, "Nonpolarizing edge filters," J. Opt. Soc. Am., vol. 71, pp. 309-314 (Mar. 1981)(6 pages).

P. Baumeister, "Theory of rejection filters with ultranarrow bandwidths," J. Opt. Soc. Am., vol. 71, pp. 604-606 (May 1981)(3 pages).

A. Thelen, "Nonpolarizing edge filters: Part 2," Appl. Optics, vol. 23, pp. 3541-3543 (Oct. 15, 1984) (3 pages).

P. Yeh, *Optical Waves in Layered Media* John Wiley & Sons, New York, 1988, pp. v-x, 144-165, and 254-297 (38 pages).

A. Thelen, *Design of Optical Interference Coatings*, McGraw-Hill, New York, 1989, pp. v-viii, 147-196, and 249-250 (32 pages total).

R.-Y. Tsai, et al., "Comparative Study of Ultraviolet-Infrared Cutoff Filters Prepared by Reactive Electron-Beam Deposition and Reactive Ion-Assisted Deposition", Opt. Eng., May 1998, pp. 1475-1481 (7 pages).

T.R. Jensen, et al., "Environmentally Stable UV Raman Edge Filters", Society of Vacuum Coaters 43rd Annual Technical Conference Proceedings (2000) pp. 1-5 (5 pages).

H.A. Macleod, Thin-Film Optical Filters, Third Edition, Taylor & Francis, NY, 2001, pp. vii-xi, 20-37, 4650, 210-392 (213 pages total).

M. Lequime, "Tunable thin-film filters: review and perspectives," Proc. SPIE vol. 5250, (*Advances in Optical Thin Films*, Ed. by C. Amra, N. Kaiser, H.A. McLeod) pp. 302-311 (2004) (10 pages).

P.W. Baumeister, *Optical Coating Technology*, SPIE Press, Bellingham WA, 2004, pp. v-xviii, "1-23"-"1-24", "5-41"-"5-45", "7-76"-"7-77". "8-11"-"8-17", "10-9"-"10-13" and "11-24" (38 pages total).

B.E. Perilloux, *Thin-Film design*, pp. i-xvi, 1-116 (SPIE Press, Bellingham Washington) (2002) (68 pages total).

H. A. Macleod, *Thin-Film Optical Filters*, Third Edition, 2001 (Taylor & Francis, New York) pp. 621-630 (8 pages total).

"Notch filter spectra vs. Angle of Incidence," available from http://www.semrock.com/TN_Notch_SpectrumvsAOI.aspx, printed Nov. 10, 2011 (3 pages total).

German Cancer Research Center Office of Technology Transfer, *Technology Offer* "Device for tuning of color beam splitters (P-382)," Apr. 2009 (2 pages).

International Search Report and Written Opinion mailed Mar. 10, 2011 for PCT/US2011/020438, corresponding to U.S. Appl. No. 12/684,871 (10 pages).

D.S. Kliger, *Polarized Light in Optics and Spectroscopy*, pp. v-vii, 27-58, and 237-274 (Academic Press, Inc. Boston, MA) (1990) (40 pages total).

T. Baur "A New Type of Beam Splitting Polarizer Cube" (Meadowlark Optics, Inc.) (2005) (9 pages total).

"Basic Polarization Techniques and Devices" (Meadowlark Optics, Inc.) (2005) (7 pages total).

H. Fabricius et al., "Optimizing the phase retardation caused by optical coatings," Advances in Optical Thin Films III, Ed. By N. Kaiser et al., Proc. of SPIE vol. 7101, (2008) pp. 71011I-1-71011I-12 (12 pages total).

H. Fabricius, "Synthesis and functioning of SMART coatings for application in compact instruments and sensors," DOPS-Nyt Jan. 2001, p. 28-38 (The Quarterly Journal of the Danish Optical Society) (11 pages total).

Software Spectra, *TFCalc Thin Film Design Software for Windows*, Ver. 3.5 (1985-2002) (Portland, OR) (144 pages total).

K.V. Popov et al., "Broadband high-reflection multilayer coatings at oblique angles of incidence," 1 Apr. 1997, vol. 36, No. 10, Applied Optics, pp. 2139-2151 (1997) (13 pages total).

A.V. Tikhonravov, "Some theoretical aspects of thin-film optics and their applications," Oct. 1, 1993, vol. 32, No. 28, Applied Optics, pp. 5417-5426 (1993) (10 pages total).

\* cited by examiner

OPTICAL THIN-FILM NOTCH FILTER WITH VERY WIDE PASS BAND REGIONS

This application claims priority to U.S. Provisional Application No. 60/974,851, filed Sep. 25, 2007, the contents of which are incorporated herein by reference.

The present disclosure relates to optical thin-film filters, including thin film notch filters. The present disclosure also relates to spectroscopy systems including such filters, and methods for making such filters.

Thin film interference filters are important components in systems for optical measurement and analysis, such as Raman spectroscopy and fluorescence microscopy. In particular, thin film interference filters, such as optical edge filters, notch filters, and/or laser line filters (LLF's), are advantageously used in such systems to block unwanted light that would otherwise constitute or generate spurious optical signals and swamp the signals to be detected and analyzed. Thus, failure or inadequate performance of these filters erode performance of a system in which they are utilized.

In general, interference filters are wavelength-selective by virtue of the interference effects that take place between incident and reflected waves at boundaries between materials having different refractive indices. This interference effect is exploited in interference filters, which typically include a dielectric stack composed of multiple alternating layers of two or more dielectric materials having different refractive indices.

In a typical interference filter, each of the respective layers of the filter stack is very thin, e.g., having an optical thickness (physical thickness times the refractive index of the layer) on the order of a quarter wavelength of light. These layers may be deposited on one or more substrates (e.g., a glass substrate) and in various configurations to provide one or more of long-wave-pass (also called long-pass), short-wave-pass (also called short-pass), notch, band-pass, or band-rejection filter characteristics. For example, these layers may be deposited on one side of a substrate, equally on both sides of a substrate, or unequally on respective sides of a substrate, depending on the optical effect desired.

In the case of prior known edge filters, the filter is configured so as to exhibit a spectrum having a clearly defined edge, wherein unwanted light having wavelengths above or, alternatively, below a chosen "transition" wavelength $\lambda_T$ is blocked, whereas desired light is transmitted on the opposite side of $\lambda_T$. Edge filters which transmit optical wavelengths longer than $\lambda_T$ are called long-wave-pass (LWP) filters, and those that transmit wavelengths shorter than $\lambda_T$ are short-wave-pass (SWP) filters.

FIGS. 1A and 1B schematically illustrate the spectral transmission of ideal LWP and SWP filters, respectively. As shown in FIG. 1A, an ideal LWP filter blocks light with wavelengths below $\lambda_T$, and transmits wavelengths above $\lambda_T$. Conversely, as shown in FIG. 1B, an ideal SWP filter transmits light with wavelengths below $\lambda_T$, and blocks light with wavelength above $\lambda_T$.

Edge steepness and the relative amount of transmitted light are important parameters in many filter applications. As shown in FIGS. 1A and 1B, an ideal edge filter has a precise wavelength edge represented by a vertical line at $\lambda_T$. As such, an ideal filter has an "edge steepness" (i.e. a change in wavelength over a defined range of transmission) of 0 at $\lambda_T$. However, real edge filters change from blocking to transmission over a small but non-zero range of wavelengths, with increasing values of edge steepness reflecting an edge that is increasingly less steep. The transition of a real edge filter is therefore more accurately represented by a non-vertical but steeply sloped line at or near $\lambda_T$. Similarly, while an ideal edge filter transmits all light in the transmission region (transmission T=1), real filters have some amount of transmission loss, invariably blocking a small portion of the light to be transmitted (T<1).

Notch filters are another type of filter commonly used in optical measurement systems. These filters exhibit a spectrum that includes at least one "notch," i.e., a specific wavelength of light (ideally a single laser "line" $\lambda_L$), or a narrow range of wavelengths that is/are substantially blocked (i.e., not transmitted) by the filter. Notch filters generally transmit light with high transmission on both sides of the notch (or notches).

Notch filters are useful in optical measurement and analysis systems that use excitation light to excite a sample at one wavelength (e.g., $\lambda_L$) or a small band of wavelengths, and measure or view an optical response of the excited sample at other wavelengths. The excitation light $\lambda_L$ is delivered to the sample by an excitation light path, and the optical response of the sample is delivered to the eye or measuring instrument by a collection path.

Because lasers emit a very small, but non-zero, bandwidth (BW) of light, an ideal notch filter for an optical measurement system blocks light at wavelengths within this bandwidth ($\lambda_L-(BW/2)$) to ($\lambda_L+(BW/2)$) with no ripple and perfectly steep transition edges (edge steepness=0), as shown in FIG. 2A. An ideal notch filter also exhibits unlimited pass band bandwidth. That is, an ideal notch filter passes 100% of light at wavelengths longer than the notch band ($\lambda > (\lambda_L+(BW/2))$) and 100% of light at wavelengths shorter than the notch band ($\lambda < (\lambda_L-(BW/2))$).

As shown in FIG. 2B, however, real notch filters do not perfectly transmit light outside of the notch band, and do not exhibit perfect blocking within the notch band. Real notch filters also feature non-vertical transition edges (i.e., edge steepness>0), and thus change from blocking to transmission over a small range of wavelengths at either edge of the notch band. The notch band may also exhibit a notch band full width half maximum ("FWHM") that is less than ideal, meaning that the notch band encompasses wavelengths other than the bandwidth of a laser or excitation light source. As used herein, the terms "notch band full width half maximum" and "notch band FWHM" refer to the difference between the wavelengths of the long and short edge of a notch band, measured at the two points along the notch band where the filter transmits 50% of incident light.

In addition, prior known notch filters having the basic structure of an interference filter (i.e., a plurality of alternating distinct material layers having different refractive indices) exhibit substantially limited pass band bandwidth due to the presence of higher-order (harmonic) stop bands. These conventional notch filters are also highly sensitive to material variation, which is manifested as the variation in notch bandwidth as a function of physical location on the filter substrate or of the filter within the deposition chamber.

Raman spectroscopy is one example of an optical analysis system that advantageously employs notch and/or other interference filters. In Raman spectroscopy, molecular material is irradiated with excitation light, i.e., high intensity light of a given wavelength (e.g., $\lambda_L$). Upon irradiation, the molecular material scatters the excitation light. A small portion of the scattered excitation light is "Raman shifted," i.e., it is shifted in wavelength above and/or below $\lambda_L$. This Raman shifting is attributed to the interaction of the light with resonant molecular structures within the material, and the spectral distribution of the Raman shifted light provides a spectral "fingerprint" characteristic of the composition of the material. However, the bulk portion of the scattered excitation light is "Rayleigh scattered," i.e., it is scattered without a shift in wavelength.

In Raman or fluorescence spectroscopy and imaging, a filter that blocks a specific laser wavelength yet has a very wide pass band provides an important advantage, particularly in systems which use multiple laser wavelengths for excitation and detect fluorescence over multiple emission bands associated with the various laser wavelengths. For example, a fluorescence spectroscopy system might utilize both a visible laser (such as 488 nm) for exciting fluorescence detected at slightly longer visible wavelengths (such as 500 to 550 nm), and an infrared laser (such as 980 nm) for exciting fluorescence at slightly longer infrared wavelengths (such as 1000 to 1100 nm). In such a system, a notch filter which substantially blocks 488 nm, yet which has a pass band that extends all the way to 1100 nm can be positioned in front of a detector to provide blocking of the visible laser, while at the same time passing the infrared fluorescence signal to the detector.

FIG. 3 schematically illustrates a Raman spectroscopy system 30 having a standard configuration. As shown, this standard configuration includes a light source 31, such as a laser, an excitation filter 32, a sample 33, a collection filter 34, and a detector 35. In operation, light source 31 emits light having a wavelength (e.g., $\lambda_L$) or range of wavelengths which passes though excitation filter 32 and illuminates sample 33 directly. Sample 33 scatters Raman shifted and unshifted excitation (Rayleigh scattered) light. Collection filter 34 is positioned between sample 33 and detector 35, such as a spectrometer. Collection filter 34 is configured to block the Rayleigh scattered light from sample 33 but transmit as much of the Raman shifted light as possible, and as close to $\lambda_L$ as possible.

Because the amount of Raman shifted light is very small relative to the amount of Rayleigh scattered light, it is necessary to filter the Rayleigh scattered light from the collection path before it reaches the detector. Without such filtering, the Rayleigh scattered light will swamp the detector, and may excite spurious Raman scattering in the collection path.

Filtering of the Rayleigh scattered light can be accomplished, for example, by placing a notch filter having a notch band that substantially blocks incident excitation light having a wavelength (e.g., $\lambda_L$) or small range of wavelengths between the sample and the detector. In this position, the notch filter can ensure that the light reaching the detector is predominantly long or short-wavelength Raman-shifted light from the sample.

In an ideal Raman spectroscopy setup employing a notch filter, the filter is configured such that it blocks 100% of excitation light having a wavelength $\lambda_L$ (or range of wavelengths) from reaching the detector, and transmits 100% of light having wavelengths other than the excitation light to the detector for measurement. This blocking could be accomplished, for example, if the notch filter were configured so as to exhibit the ideal notch filter characteristics described above.

As mentioned, however, real notch filters do not exhibit ideal characteristics. Indeed, real notch filters exhibit one or more of imperfect blocking, lower than ideal edge steepness, relatively wide notch band FWHM, imperfect pass band transmission, and limited pass band bandwidth. Thus, for example, a conventional notch filter that exhibits high blocking (i.e., high optical density (OD) over a region of wavelengths, where $OD=-\log_{10}(T)$, T being transmission of the filter at a particular wavelength) at certain wavelengths or wavelength regions may not necessarily also achieve high transmission (in excess of 50%, for example) at any other wavelengths or wavelength regions.

Accordingly, the blocking level, edge steepness, pass band bandwidth, and notch band FWHM are important characteristics of a notch filter.

As used herein, the term "stop band" refers to a range of wavelengths over which transmitted light is strongly attenuated (T≤10%) due to constructive interference of the many partial waves of light reflected off of a structure with a periodic or nearly periodic variation of the index of refraction, as found in a thin-film interference filter. For a "quarter wavelength stack" structure comprised of alternating layers of high- and low-index materials, each of which is approximately one quarter of a particular wavelength $\lambda_0$ thick (in the material), the "fundamental" (i.e., first order) stop band is roughly centered on $\lambda_0$ and ranges from approximately $\lambda_0/(1+x)$ to $\lambda_0/(1-x)$, where x is related to the high and low index of refraction values, $n_H$ and $n_L$, respectively, according to $$x = \frac{2}{\pi}\arcsin\left(\frac{n_H - n_L}{n_H + n_L}\right)$$

If the layer-to-layer index of refraction variation is not a purely sinusoidal variation, but rather changes abruptly, as is typically the case in a multi-layer thin-film interference filter, higher-order stop bands exist at shorter wavelengths. For example, a quarter-wave stack having such abrupt refractive index changes exhibits "odd-harmonic" stop bands that occur approximately at the wavelengths $\lambda_0/3$, $\lambda_0/5$, etc., and that range from approximately $\lambda_0/(3+x)$ to $\lambda_0/(3-x)$, for the third-order stop band, $\lambda_0/(5+x)$ to $\lambda_0/(5-x)$, for the fifth-order stop band, and so on. If the layers are not exactly a quarter-wave thick, there may also be "even-harmonic" stop bands that occur approximately at the wavelengths $\lambda_0/2$, $\lambda_0/4$, etc.

In general, known thin film notch filters, such those described in U.S. Pat. No. 7,123,416, which is incorporated herein by reference, are designed based on the so-called "higher order" stop band approach. That is, they are designed to exhibit a fundamental stop band at a relatively high wavelength, and to define a notch band with at least one higher order stop band (e.g., a second order stop band) on the short wave side of the fundamental stop band. This approach, when based on even-order harmonic stop bands, allows for great control over notch bandwidth, which is proportional to and easily controlled by adjusting material mismatch in the filter structure. As explained in the paragraph above, when odd-order harmonic stop bands are used, the notch bandwidth is subject to fundamental constraints and cannot be easily adjusted. However, these conventional filters exhibit numerous limitations.

As used herein, the term, "material mismatch" means the relative deviation of the optical thickness of the high and low index layers from one quarter wavelength. A stack of purely quarter-wavelength thick layers has no mismatch. Mathematically, each high index layer has an optical thickness $n_H t_H$ and each low index layer has an optical thickness $n_L t_L$, where $n_H$ and $n_L$ are the refractive indices of the high and low index layers, respectively, and $t_H$ and $t_L$ are the physical thicknesses of those layers. In general, the fundamental stop band is located at a wavelength $\lambda$ such that $n_H t_H + n_L t_L = \lambda/2$. If each layer is a quarter wavelength thick, then $n_H t_H = n_L t_L = \lambda/4$. If the layers are non-quarter wavelength thick, then the material mismatch (in %) is defined as:

$$\text{Material Mismatch} = \frac{|n_H t_H - n_L t_L|}{n_H t_H + n_L t_L} \times 100\%.$$

Conventional notch filters based on the higher order stop band approach exhibit limited pass band bandwidth due to the presence of the fundamental stop band and higher order stop bands. In particular, extension of the pass band in these conventional filters is limited by the short-wave edge of the fundamental stop band and the long-wave edge of a higher order stop band, such as a third order stop band. In addition, conventional notch filters based on even harmonic orders are highly sensitive to material mismatch. That is, the notch bandwidth of these filters is severely impacted by even slight variation in the composition of the material layers and/or the thickness of the layers in the filter stack. As a result, it may be difficult and/or exceedingly expensive to produce such filters with large diameters.

Besides thin-film notch filters, holographic filters, such as those described in U.S. Pat. No. 5,221,957, have also been used for the applications described herein. Holographic filters are typically manufactured by exposing a thick gelatinous material between two glass plates with light, thereby forming a holographic diffraction grating, or Bragg structure, within the material. The resulting Bragg structure comprises a continuous, approximately sinusoidal variation of the index of refraction along a particular direction. Because the film can be relatively thick, allowing a very large number of fringes in the holographic grating, such filters can achieve a narrow notch bandwidth with steep edges. These filters block unwanted excitation light with a "notch" of very low transmission over a relatively narrow bandwidth, and are thus often called "holographic notch filters." The light that is not transmitted by these filters is generally diffracted at an acute angle relative to the direction of the transmitted light.

In addition, rugate filters, such as those described in U.S. Pat. No. 6,115,180, have also been used for the applications described herein. These filters comprise multiple materials of differing optical index that have been deposited such that the optical index of the resulting structure varies continuously and (typically) sinusoidally. That is, the materials making up a rugate filter are deposited such that distinct layers of material are not formed. Rather, the layers are deposited such that the composition of the filter structure varies continuously throughout its thickness. The resulting continuous variation in optical index allows the formation of a notch filter that exhibits one and only one stop band, and wide pass band regions.

Clearly, holographic and rugate filters are of a substantially different structure than a thin film notch filter based upon a basic interference structure, i.e., a plurality of distinct alternating materials layers. Moreover, holographic and rugate filters exhibit many drawbacks.

For example, holographic filters are generally less reliable than thin-film notch filters—particularly those based on hard oxide thin film materials—because the basic material of the holographic filter is a soft gel rather than oxide glass. Further, because holographic filters necessarily require multiple substrates with the associated interfaces between these and the gel material, transmission outside the notch is compromised. Holographic notch filters are produced one at a time—in a serial fashion—in contrast to thin film notch filters which may be manufactured in large volumes in a parallel fashion, resulting in generally higher cost and lower repeatability or consistency for the holographic filters. Finally, the light within the notch bandwidth rejected by holographic notch filters is generally diffracted at an acute angle relative to the desired light transmitted in the pass band regions, and thus it is more difficult to separate the rejected light from the transmitted light, resulting in higher unwanted noise or a more expensive optical system geometry.

Similarly, rugate notch filters also exhibit several drawbacks. Because it is very difficult to continuously vary the index of refraction using thin film deposition, the choices of coating process and coating materials are limited. Generally the process is limited to an evaporation approach, and the more reliable and precise techniques such as ion-beam sputtering are not practical. Further the selection of materials is limited due to the constraint that the two materials must be capable of being simultaneously co-deposited and must result in a hybrid material with a continuously varying index of refraction. Thus, it is generally difficult to choose materials that have a very high index contrast or which are the most robust materials. As a result, rugate filters can exhibit lower overall transmission, especially at shorter visible and near ultraviolet wavelengths, and poorer reliability as compared to thin-film filters. Finally, because of the difficulty of depositing a sinusoidially varying index of refraction, the total number of periods that may be deposited with high precision is limited, resulting in generally lower blocking within the notch bandwidth. For example, it is generally difficult to achieve blocking levels approaching OD 6 or more.

Thus, there is a need in the art for improved thin film notch filters that exhibit better spectral performance relative to prior known thin film notch filters. In particular, there is a desire in the art for improved thin film notch filters that exhibit at least one of extended pass band bandwidth, improved edge steepness, narrow notch band FWHM, and low sensitivity to material mismatch.

SUMMARY OF THE DISCLOSURE

The present disclosure provides optical thin-film notch filters that are suitable, for example, for use in Raman spectroscopy, fluorescence imaging, and/or quantification applications.

Thus, consistent with the present disclosure are thin film notch filters that include a substrate and a plurality of discrete alternating material layers. The discrete alternating material layers have respectively different refractive indices. For the purposes of this disclosure, this structure is referred to as the "basic structure of an interference filter" or "basic structure."

As will be discussed at length below, the notch filters in accordance with the present disclosure may be configured to achieve one or more of a variety of desired optical characteristics. In some embodiments, the plurality of alternating material layers are configured to obtain a thin film notch that exhibits a filter spectrum having a pass band that substantially extends from, near, or below the visible region of the electromagnetic spectrum to at or above the infrared region of the electromagnetic spectrum. This pass band may be interrupted by a notch correlating to a non-harmonic stop-band, such as a pass band defect. This notch represents wavelengths at which the filter has a region of low optical transmission. The notch may, for example, correlate to at least one non-harmonic stop band, such as a pass band defect.

In addition, the plurality of discrete alternating material layers may be configured to achieve a thin film notch filter that exhibits a filter spectrum having a pass band wherein light in a first wavelength range of 350 nm to 1600 nm is transmitted in an amount ranging from greater than or equal to about 90%. The pass band may be interrupted by a notch corresponding to a subset of wavelengths within said first wavelength range.

The notch may, for example, correlate to at least one non-harmonic stop band, such as a pass band defect. The filter may exhibit low optical transmission over said at least one subset of wavelengths. In some embodiments, the notch may be a single notch.

Further, the plurality of discrete alternating material layers may be configured to achieve a thin film notch filter that exhibits a filter spectrum having a fundamental stop band and a pass band, wherein the pass band correlates to a range of wavelengths longer and/or shorter than the stop band over which the filter transmits greater than or equal to 90% of light. The pass band may be interrupted by a notch corresponding to a non-harmonic stop band, such as a pass band defect. The notch may correspond to a region of low optical transmission, and has a long wave side, a short wave side, and a notch wavelength $\lambda_n$. The pass band may extend at least from a wavelength that is greater than about $(1.3*\lambda_n)$ on the long wave side to less than about $(\lambda_n/1.3)$ on the short wave side of the notch.

The present disclosure also describes methods of making the optical filters described herein, as well as systems using the optical filters described herein. Thus, consistent with the present disclosure are optical filters having the structure described herein, and which are produced by known deposition techniques, such computer controlled ion beam sputtering.

Also consistent with the present disclosure are optical systems that incorporate at least one of the filters described herein as an optical filter. For example, these systems may include the filters described herein as a collection filter.

The present disclosure also provides thin film notch filters having the basic structure of an interference filter, wherein the plurality of discrete alternating material layers is configured to optimize and/or designate the location of certain features in the filter spectrum. For example, the plurality of discrete alternating material layers may be configured to obtain a filter spectrum that includes a fundamental stop band in a region of the electromagnetic spectrum (such as the ultraviolet, visible, near-infrared, etc.), and a notch band correlating to a non-harmonic stop band (e.g., a pass band defect) within the same or another region of the electromagnetic spectrum. In some embodiments, the notch bands are placed so as to coincide with wavelengths of light emitted by an excitation light source, such as a laser.

The filters in accordance with the present disclosure may also be configured, for example, to exhibit improved resistance to material variation, relative to prior known thin film notch filters having the basic structure of an interference filter.

In some embodiments, filters in accordance with the disclosure may be configured so as to simultaneously optimize two or more of the features described herein.

Finally, also consistent with the present disclosure are optical systems that incorporate at least one of the filters described herein as an optical filter. For example, these systems may include the filters described herein as notch filters in the collection path of a Raman or fluorescence spectroscopy system. Of course, the filters described herein may also be used in other systems and in other ways consistent with the use of previously known optical filters.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several non-limiting embodiments of the invention, and together with the description serve to explain the principles of the invention.

DETAILED DESCRIPTION

Figure 1A:
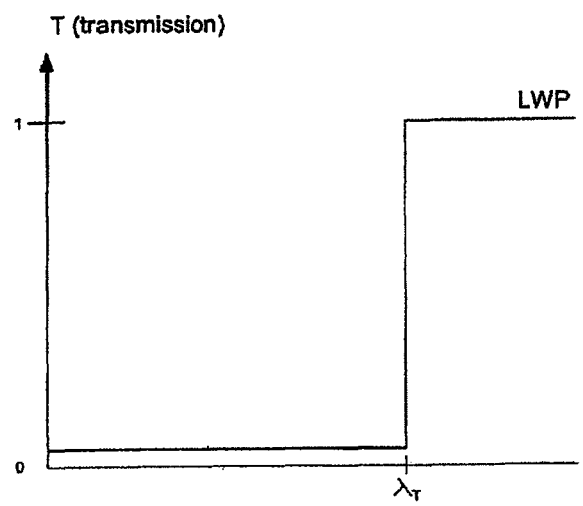
FIG. 1A is an exemplary spectrum of an ideal long wave pass interference filter.
Figure 1B:
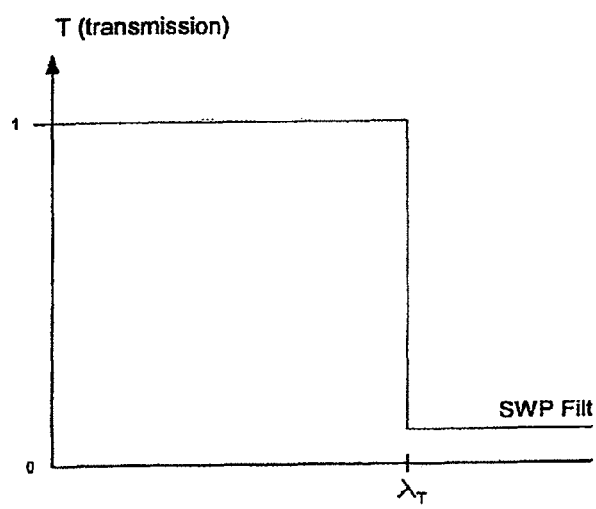
FIG. 1B is an exemplary spectrum of an ideal short wave pass interference filter.
Figure 2A:
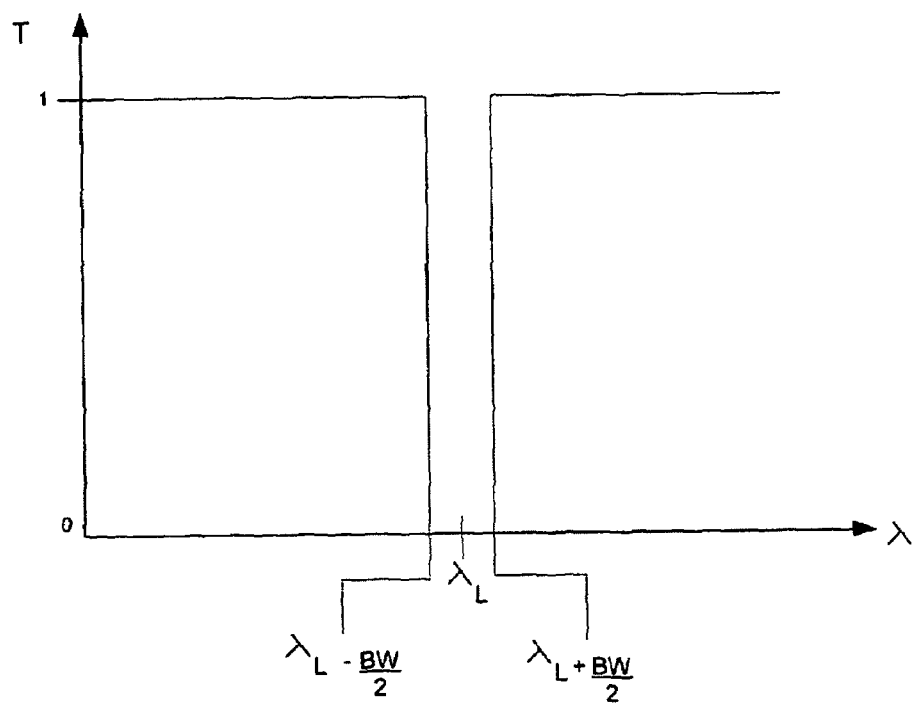
FIG. 2A is a exemplary spectrum of an ideal notch filter.
Figure 2B:
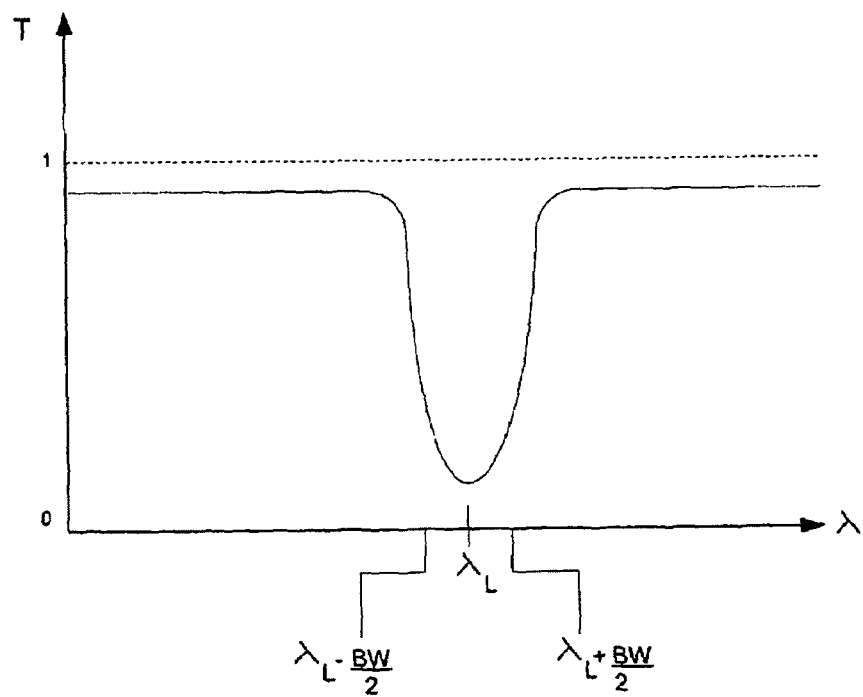
FIG. 2B is a exemplary spectrum of a realistic notch filter.

Reference will now be made in detail to various exemplary embodiments of the present disclosure, examples of which are illustrated in the accompanying drawings. Wherever possible, the same reference numbers will be used throughout the drawings to refer to the same or like parts.

One aspect of the present disclosure relates to optical notch filters having the basic structure of an interference filter, and which exhibit a filter spectrum having at least one desired characteristic, such as extended pass band bandwidth, and at least one notch corresponding to a non-harmonic stop band.

As used herein, the terms "notch" and "notch band" refers to a region of wavelengths over which an optical filter exhibits low transmission, and which has a notch bandwidth that is less than or equal to about the notch bandwidth NBW calculated with the following expression:

$$NBW=((55\times10^{-6})\times\lambda_r^2)+((14\times10^{-3})\times\lambda_r)-5.9$$

where NBW is in nm, and $\lambda_r$ is a reference wavelength (e.g., a wavelength of a laser) in nm. Thus, for example, a notch filter having a reference wavelength of $\lambda_r$ of 632.8 nm will exhibit a notch bandwidth (NBW) of 25.0 nm. Accordingly, consistent with the present disclosure are notch filters that exhibit a notch and/or notch band having a notch bandwidth of less than or equal to about 30 nm, such as less than or equal to about 25 nm, including less than or equal to about 20 nm, or even less than or equal to about 15 nm.

Accordingly, one of ordinary skill in the art of optics will understand that the bandwidth of a notch is significantly less than that of a typical fundamental stop band exhibited by an optical filter and thus, that the terms "stop band" and "notch" refer to distinct filter characteristics.

All of the optical filters according to the present disclosure generally include the basic structure of an interference filter described above, i.e., a plurality of discrete alternating material layers deposited on a surface of substrate thereof. As used herein, the phrase, "discrete alternating material layers" means that the optical index between individual layers in the filter stack changes abruptly (i.e., not gradually or continuously).

A wide variety of materials may be used to form the plurality of discrete alternating material layers. Among such materials, non-limiting mention is made of metals, metallic and non-metallic oxides, transparent polymeric materials, and so called "soft" coatings, such as sodium aluminum fluoride ($Na_3AlF_6$) and zinc sulfide (ZnS). Further non-limiting mention is made of metallic oxides chosen from silicon dioxide ($SiO_2$), tantalum pentoxide ($Ta_2O_5$), niobium pentoxide ($Nb_2O_5$), hafnium dioxide ($HfO_2$), titanium dioxide ($TiO_2$), and aluminum oxide ($Al_2O_5$).

In some embodiments, the plurality of alternating material layers may include at least two distinct materials. As a non-limiting example, the filters according to the present disclosure may include a plurality of distinct alternating $Nb_2O_5$ and $SiO_2$ layers. Alternatively, the filters in accordance with the present disclosure may include at least three distinct materials, such as distinct $Nb_2O_5$, $SiO_2$, and $Ta_2O_5$ layers. Of course, greater than three materials and other combinations of materials may also be used.

Generally, the filters in accordance with the present disclosure may be manufactured using deposition methods and techniques that are known in the art. For example, these filters may be made with a computer controlled ion beam sputtering system, such as the one described in U.S. Pat. No. 7,068,430, which is incorporated herein by reference. In general, such a system is capable of depositing a plurality of discrete alternating material layers, wherein the thickness of each layer may be precisely controlled.

Filter designs in accordance with the present disclosure may be produced by known thin-film filter design techniques. For example, these filter designs may be produced by optimizing the filter spectra and structure of an initial design, such as a traditional short wave pass or long wave pass interference filter, against a target spectrum using known optical optimization routines. Non-limiting examples of such optimization routines include the variable-metric or simplex methods implemented in standard commercial thin-film design software packages, such as TFCalc by Software Spectra, Inc. of Portland, Oreg., and The Essential Macleod by Thin Film Center, Inc., of Tucson, Ariz. A detailed description of filter design techniques that can be used to produce filter designs according to the present disclosure may be found in U.S. Pat. No. 7,068,430, which is incorporated herein by reference.

The notch filters of the present disclosure differ from the traditional thin film notch filters described herein in that during production, the individual thicknesses of the discrete alternating material layers making up the interference stack are carefully controlled so as to achieve desired optical characteristics that are not exhibited by prior known notch filters having the basic structure of an interference filter. For example, notch filters consistent with the present disclosure may be configured to exhibit at least one of extended pass band bandwidth, improved pass band transmission, and reduced sensitivity to material variation, relative to prior known notch filters based upon the basic structure described above.

As used herein, the term, "pass band" refers to a region of wavelengths over which a notch filter exhibits high (e.g., greater than or equal to 90%) transmission of light. Thus, the term, "pass band bandwidth," refers to the range of wavelengths extending from a long or short wave edge of a fundamental stop band of the filter, and over which the filter exhibits high transmission. Further, values associated with the term "pass band bandwidth" are generally reported herein without regard to the presence of a narrow notch band (or bands) that may interrupt the pass band. However, the term "pass band bandwidth" can also refer to the range of wavelengths within individual pass band regions located to the long and short wave side of a notch band (or bands).

As used herein, the term "configured," means that at least one of the materials chosen to make up the basic structure, the individual layer thicknesses, and/or the overall geometry of the filter structure is chosen to obtain a filter that exhibits desired optical properties.

Thus, consistent with the present disclosure are thin film notch filters having the basic structure described above, wherein the filter may be configured to exhibit a spectrum having an extended pass band or pass band region. For example, some embodiments of the filters according to the present disclosure may be configured to exhibit a filter spectrum that extends substantially from near, within, or below one region of the electromagnetic spectrum to near, within, above or below the same or another region of the electromagnetic spectrum. More specifically, the filters according to the present disclosure may be configured to exhibit a pass band that substantially extends from near or below the visible region of the electromagnetic spectrum to near or above the infrared region of the electromagnetic spectrum or vice versa. In some embodiments, the pass band may span substantially all of the visible region of electromagnetic spectrum.

In more quantitative terms, the filters according to the present disclosure may, for example, exhibit a pass band that extends substantially from about 330 nm to about 2000 nm, such as from about 350 nm to about 1600 nm, for example from about 400 nm to about 1200 nm, including from 400 to 900 nm. Of course, other pass band ranges are also encompassed by the present disclosure. For example, the filters according to the present disclosure may be configured to exhibit a spectrum having a notch band with a short wave edge, a long wave edge and a notch wavelength $\lambda_n$, wherein $\lambda n$ corresponds to a wavelength of light within the notch band that is least transmitted the filter. Further, these filters may be configured to exhibit pass band regions extending at least from a wavelength that is greater than or equal to about $(1.3*\lambda_n)$ (e.g., $1.4\lambda_n$, or even $1.5\lambda_n$) on the long wave side of the notch band to less than or equal to about $(\lambda_n/1.3)$ (e.g., $\lambda_n/1.4$, or even $\lambda_n/1.5$) on the short wave side of the notch. Alternatively, because of the flexibility in positioning a notch within the pass band region afforded by the design approaches in accordance with the present disclosure, the pass band may extend at least from a wavelength on the long wave side of the notch to a wavelength on the short wave side of the notch that is at least 2.5 times smaller than the longer wavelength.

In some embodiments, the filters according to the present disclosure may be configured to optimize the transmission of light having a wavelength or wavelengths within a pass band or pass band region within the spectrum exhibited by the filter. For example, the filters according to the present disclosure may be configured to transmit greater than or equal to about 70%, greater than or equal to about 80%, or greater than or equal to about 90% of light having a wavelength within a pass band or pass band region. In a non-limiting embodiment, the filters of the present disclosure are configured to transmit substantially 100% of light having a wavelength within a pass band or pass band region.

The filters according to the present disclosure may also be configured, for example, to exhibit enhanced blocking within at least one notch band. For example, the filters described herein may exhibit notch band optical densities of greater than or equal to 4, greater than or equal to 6, and higher. Enhanced blocking may be achieved, for example, by increasing the number of distinct alternating material layers used to make the filter, or by increasing the index contrast for a given number of layers.

The filters according to the present disclosure may also be configured to exhibit a desired notch band FWHM. For example, the filters of the present disclosure may be configured to exhibit a spectrum having a notch band that substantially encompasses only the desired wavelengths of a source of excitation light, such as a laser.

The filters according to the present disclosure may also be configured to exhibit a filter spectrum exhibiting spectral characteristics in desired locations of the electromagnetic spectrum. For example, the filters according to the present disclosure may be configured to exhibit at least one of a pass band (or pass band region), fundamental stop band, harmonic stop band, non-harmonic stop band (such as a pass band defect), and or notch band in a desired region of the electromagnetic spectrum.

As used herein, the term "non-harmonic stop band" means a stop band that occurs in a wavelength region that does not correspond to an odd or even harmonic of a fundamental stop band of a filter in question.

For example, the filters according to the present disclosure may be configured to exhibit at least one of the aforementioned features in the ultraviolet, visible, and/or infrared regions of the electromagnetic spectrum. In more quantitative terms, the filters of the present disclosure may be configured to exhibit at least one of these features within a wavelength range of about 350 nm to about 2000 nm, such as about 350 to about 1600 nm, for example from about 350 to about 1200 nm, such as from about 400 to about 900 nm.

In non-limiting embodiments, the filters of the present disclosure may be configured to exhibit at least one of a pass band (or pass band region), a notch band, and a stop band within at least one of the ultraviolet, visible, and/or infrared regions of the spectrum. For example, the filters of the present disclosure may be configured to exhibit a stop band within or near the ultraviolet region or the infrared region, a notch band within the visible region, and a pass band extending from a long or short wave edge of the notch band. In a non-limiting embodiment, the stop-band may correlate to a harmonic stop band or a fundamental stop band.

In another non-limiting embodiment, the at least one notch band may correspond to a wavelength or range of wavelengths of light emitted by an excitation light source in an optical analysis technique, such as Raman spectroscopy. For example, the at least one notch band may correspond to a desired wavelength of a laser, such as about 405 nm, about 440 nm, about 442 nm, about 458 nm, about 473 nm, about 488 nm, about 491 nm, about 515 nm, about 532 nm, about 543 nm, about 561 nm, about 568 nm, about 594 nm, about 633 nm, about 635 nm, about 647 nm, about 664 nm, about 671 nm, about 780 nm, about 785 nm, about 808 nm, about 830 nm, about 850 nm, about 980 nm, and about 1064 nm.

The at least one notch band may also be placed relative to the location of another spectral feature. For example, the at least one notch band may be placed to the long or short wave side of a fundamental stop band, such as a fundamental stop band of a LWP or SWP filter. As a result, the filters according to the present disclosure may, for example, exhibit a filter spectrum having a stop band within one region of the electromagnetic spectrum, such as the ultraviolet region, and at least one notch in the same or a different region, such as the visible or infrared region. In non-limiting embodiments, the filters according to the present disclosure may be configured to exhibit filter spectrum that includes a fundamental stop band and at least one notch band.

In more quantitative terms, the filters according to the present disclosure may, for example, exhibit a fundamental stop band, at least one harmonic stop band, and/or at least one notch band in a wavelength range chosen, for example, from 350-2000 nm, 350-1600 nm, 400-1200 nm, and 400-900 nm, or any subset thereof. In non-limiting embodiments, the filters according to the present disclosure exhibit a spectrum having a fundamental stop band in the range of 300-400 nm, and may include at least one notch band within the range of 400-900 nm. In another non-limiting embodiment, the filters according to the present disclosure may exhibit a spectrum having a fundamental stop band in the range of 900-2000 nm, and at least one notch band within the range of 400-900 nm. In some embodiments, the at least one notch band exhibited by these filters correlates to a non-harmonic stop band, such as a pass band defect.

The filters according to the present disclosure may also be configured to exhibit a spectrum that includes a fundamental stop band, a pass band extending substantially from a long or short wave edge of the fundamental stop band, and a single notch band interrupting the pass band.

Consistent with the foregoing description, the filters of the present disclosure may be configured to exhibit a filter spectrum having at least one notch band that correlates to a non-harmonic stop band of the filter, such as a pass band defect. As previously described, a "non-harmonic stop band" is a stop band that occurs in a wavelength region that does not correspond to an odd or even harmonic of a fundamental stop band of a filter.

A non-harmonic stop band may be created, for example, by optimizing the thicknesses of the nearly quarter-wavelength-thick layers which form the fundamental stop band in such a way as to cause the optical interference of light in the layer structure to exhibit strong reflection over a region within a pass band, while exhibiting high transmission with relatively low ripple over the remaining portion of the pass band. When formed this way, this type of stop band is referred to here as a "pass band defect."

Thin film notch filters exhibiting at least one notch band correlating to a pass band defect may be designed, for example, from an initial edge filter design having the general structure: $(0.5H:L:0.5H)^N$, where N is an integer determined by available coating thickness, desired performance, or cost considerations, and H and L are distinct layers of material of relatively high and low optical index, respectively. The optical thickness of the individual H and L layers in the initial filter design is about a quarter wavelength of a reference wavelength, which determines and is located near the center of the fundamental stop band.

The reference wavelength may be chosen from any wavelength, based on the desired location of the pass band defect. For example, a reference wavelength around 300 nm may be used to obtain a thin film notch filter design based on a plurality of distinct alternating $SiO_2$ and $Ta_2O_5$ layers. Other non-limiting reference wavelengths include, for example, about 530 nm, about 750 nm, about 340 nm, and about 790 nm. Of course, any other reference wavelengths may be chosen, depending on desired filter performance and material selection.

After determining the initial structure, one or more notches based on pass band defect may be developed using known filter optimization routines, such as those described above. These optimizations can be used, for example, to gradually increase the blocking level over at least one desired wavelength or wavelength range within a pass band of an LWP or SWP edge filter, thus resulting in the production of a notch band (or bands) corresponding to a pass band defect (or defects). The final design of the resulting notch filter typically shows an approximately periodic modulation in the optical thickness of the materials within the dielectric stack.

Because notch filter designs based on a long-wave pass band defect are generally built using quarter wavelength thick layers (i.e., a quarter of the reference wavelength associated with the fundamental stop band), they typically comprise many more layers per unit coating thickness than comparable higher order stop band designs, which use half wavelength thick layers for a reference notch wavelength. For example, the filters according to the present disclosure based on pass band defect may contain over one hundred, to several hundreds (or even thousands) of layers, depending on available coating thickness. This high layer count may result in filters having improved spectral performance. For example, some filters according to the present disclosure may exhibit smaller notch band FWHM, lower pass band ripple, and lower sensitivity to material mismatch.

From a design perspective, the concept of pass band defect allows great flexibility in the placement of a notch in a filter spectrum, relative to the edges of a pass band. This provides an important advantage over traditional notch filters based on the higher order stop band approach. As described in the background, the pass band bandwidth of a traditional notch filter based on second order is limited by the short wave edge of the fundamental stop band and the long wave edge of the third order stop band. Moreover, the placement of the second order stop band relative to the edges of the fundamental and third order stop band is primarily determined by the difference between the optical indices of adjacent material layers in the interference stack of the filter.

In contrast, because the location of a pass band defect may be controlled by altering the layer thickness of the individual layers making up the interference stack of a notch filter, it is possible to place a notch band based on the concept of pass band defect at any point within the pass band of a SWP or LWP edge filter.

Thus, in some embodiments, the notch filters according to the present disclosure are configured to exhibit a spectrum having at least one notch corresponding to a pass band defect in the pass band of a traditional SWP edge filter. Because the pass band of an SWP appears to the short wave side of a transition wavelength $\lambda_T$, the pass band defect in this context is referred to as a "SWP pass band defect."

Like a traditional notch filter developed with the higher order stop band approach, extension of the pass band in a notch filter based on a SWP defect may be limited by the fundamental and higher order stop bands of the underlying SWP filter design. However, the pass band defect approach provides great flexibility, particularly when a design with relatively limited extension of pass band is necessary. This is because the SWP pass band defect can be placed anywhere within the pass band of the SWP filter. For example, if the filter requires a very wide pass band on the short wavelength side of the notch, the SWP pass band defect may be placed much closer to the fundamental stop band than a second harmonic notch can be placed. As a result, the SWP pass band defect approach can obtain a filter that exhibits a wider pass band region between the notch and the third order stop band on the short wavelength side than which can be obtained with the traditional higher order stop band approach. Moreover, notch filters based on SWP pass band defect (and indeed, all of the notch filters based on pass band defect described herein) may exhibit smaller notch FWHM and lower pass band ripple than notch filters based on the higher order stop band approach.

Also consistent with the present disclosure are notch filters having the basic structure of an interference filter, and which are configured to exhibit a spectrum having at least one notch corresponding to a pass band defect in the pass band of a traditional LWP edge filter. Because the pass band of an LWP edge filter appears on the long wave side of a transition wavelength $\lambda_T$, the pass band defect in this context is referred to as a "LWP pass band defect."

The LWP pass band defect approach provides notch filters with even more advantages over traditional notch filters than do notch filters based on a SWP pass band defect. This is because the short wave edge of the pass band of filter based on LWP pass band defect corresponds to the long wave edge of the fundamental stop band of the underlying LWP filter. As a result, extension of the pass band to the long wave side of the fundamental stop band is not limited by the presence of harmonic stop bands of the underlying LWP filter. Thus, for example, it is possible to insert a notch based on LWP pass band defect anywhere in the pass band of a LWP edge filter, with potentially unlimited extension of the pass band to the long wave side of the notch.

In the case of a filter that exhibits a SWP pass band defect, simulation revealed that optimizations from an initial design are more likely to converge to a satisfactory notch design based on pass band defect when the reference wavelength chosen is relatively short. Further, when a relatively long reference wavelength is used in a notch filter design based on SWP pass band defect, the quarter wavelength layers of the filter stack making up the filter will be relatively thick. For example, a reference wavelength for a SWP pass band defect design may, for example, be in the range of 750-800 nm. As a result, each quarter wavelength thick layer in the design will have an optical thickness (index times physical thickness) of about 188 to 200 nm. Thus, as a practical matter, coating thickness and cost may be minimized by designing a filter with a SWP pass band based on the shortest reference wavelength available for a desired level of performance.

In contrast to filters that exhibit a SWP pass band defect, filters that exhibit a LWP pass band defect typically are not limited by available coating thickness. This is because the reference wavelengths typically chosen during the production of a LWP pass band defect design are relatively short. For example, a reference wavelength corresponding to the fundamental stop band of a LWP edge filter may be used as a reference wavelength to obtain a notch filter based on LWP pass band defect. For example, the reference wavelength for a LWP pass band defect design may be in the range of 300-350 nm. As a result, each quarter wavelength thick layer in the design will have an optical thickness of about 75 to 88 nm. Thus, the filters disclosed herein based on LWP pass band defect may include many more layers per unit of coating thickness than a traditional higher order stop band notch filter or a filter based on SWP pass band defect.

Figure 4A:
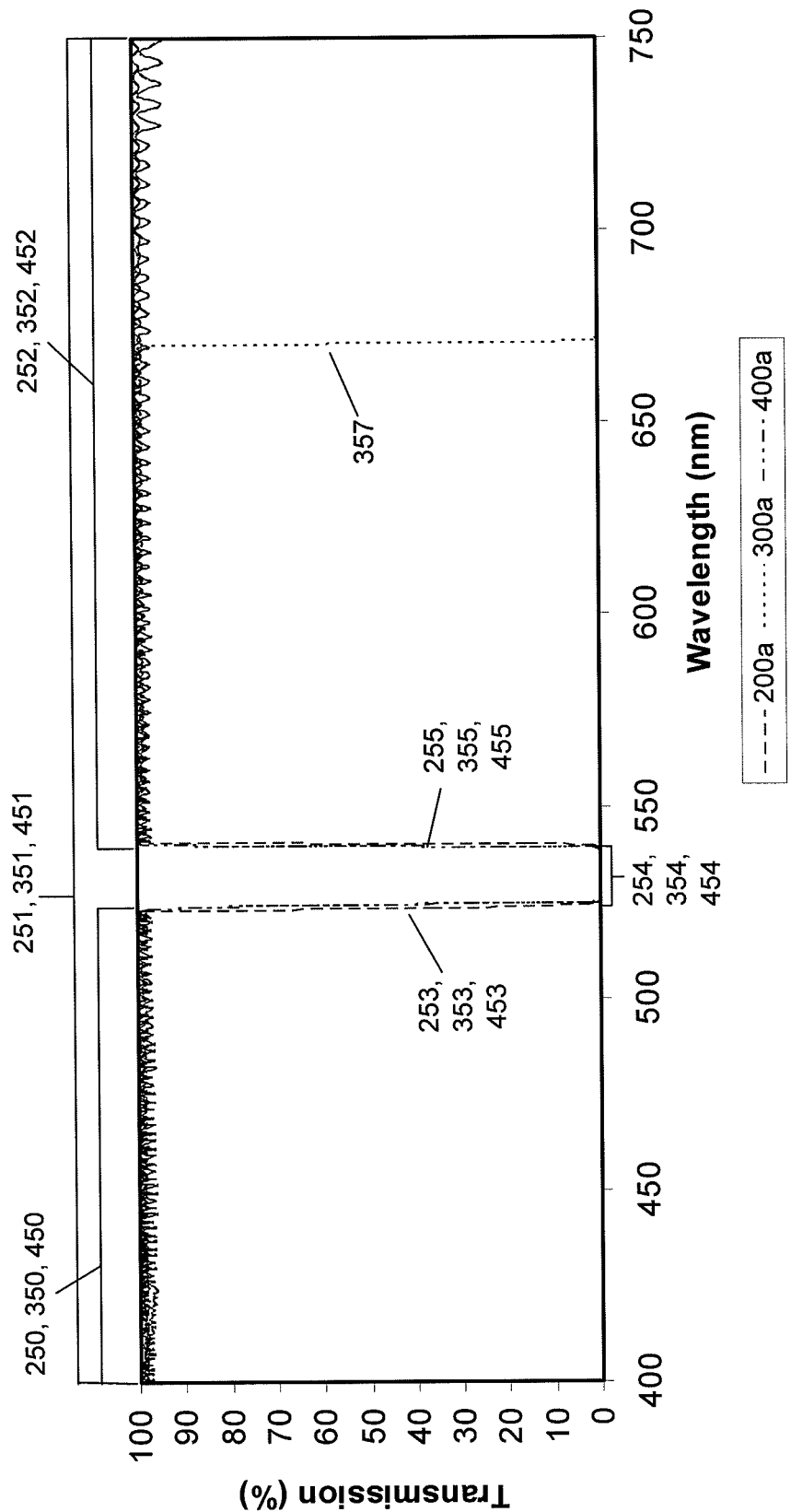
FIG. 4A is a graph plotting transmission (%) vs. wavelength (nm) for three notch filter designs, i.e., one based on second-order stop band, one based on a short-wave pass band defect, and one based on a long-wave pass band defect.

To better explain the uniqueness of the notch filters of the present disclosure that are based on pass band defect, reference is made to FIGS. 4A and B. FIG. 4A is a graph that plots transmission of light having average polarization (%) vs. wavelength (nm) at normal (0°) angle of incidence for three notch filter designs. Plot 200*a* corresponds to the design spectrum of a traditional thin film notch filter having a notch band corresponding to a second order harmonic stop band. Plots 300*a* and 400*a* correlate to design spectra of filters in accordance with the present disclosure, and which exhibit a notch band correlating to a non-harmonic stop band, specifically a short-wave pass band defect, and a long-wave pass band defect, respectively. By design, the calculated plots for these filters substantially overlap in the wavelength range of 400 to 750 nm.

As shown in FIG. 4A, plots 200*a*, 300*a*, 400*a* generally include a pass band 251, 351, 451 that includes short pass band regions 250, 350, 450 and long pass band regions 252, 352, 452. Pass band 251, 351, 451 is interrupted by a region of low optical transmission 254, 354, 454 which correlates to a higher order stop band in plot 200*a*, and pass-band defects in plots 300*a* and 400*a*. A region of low optical transmission 254, 354, 454 has a short wave edge 253, 353, 453 and a long wave edge 255, 355, 455. Fundamental stop band 357 in plot 300*a* (SWP pass band defect) is also shown in this FIG.

Figure 4B:
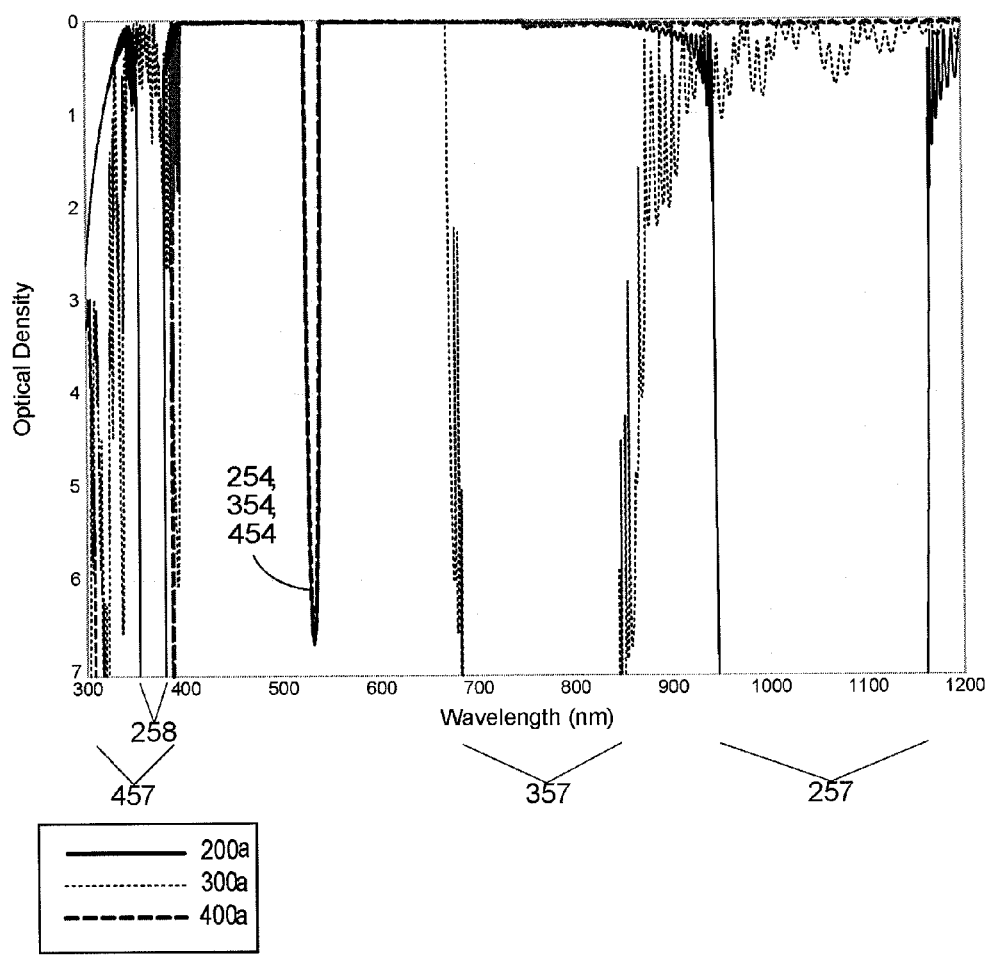
FIG. 4B is a graph plotting optical density vs. wavelength (nm) for the same filters used to create the plots in FIG. 4A, and over a wider range of wavelengths.

FIG. 4B plots optical density vs. wavelength for the same filters used to create the plots in FIG. 4A, and over a wider range of wavelengths. As shown, plot 200*a*, 300*a*, and 400*a* exhibited a fundamental stopband 257, 357, and 457, respectively. In addition, plot 200*a* exhibited a third order stop band 258. From FIG. 4A, the prior art filter and the two filters in accordance with the present disclosure appear to exhibit similar spectral performance at normal incidence over a wavelength range of 400 to 750 nm. However, it is emphasized that these spectra were obtained from significantly different filter structures, as shown in FIG. 4B. For example, plot 200*a* was obtained from a notch filter based on the higher order stopband approach. Thus, notch 254 shown in FIGS. 4A and 4B correlates to a higher order stop band of a fundamental stop band of the filter. In contrast, plots 300*a* and 400*a* were obtained from notch filters based on the concept of pass band defect. Thus, notches 354 and 454 shown in plots 300*a* and 400*a* do not correlate to a higher order stop band of the filter. Rather, they correlate to a pass band defect that was specifically placed to coincide with the notch in plot 200*a* for the purpose of comparing the optical performance of certain notch filters according to the present disclosure to the performance of traditional notch filters based on the higher order stop band approach.

When the filter spectra of the prior art filter and the filters according to the present disclosure are calculated at 45° angle of incidence, as shown in FIGS. 5-8, further differences become apparent.

Figure 5:
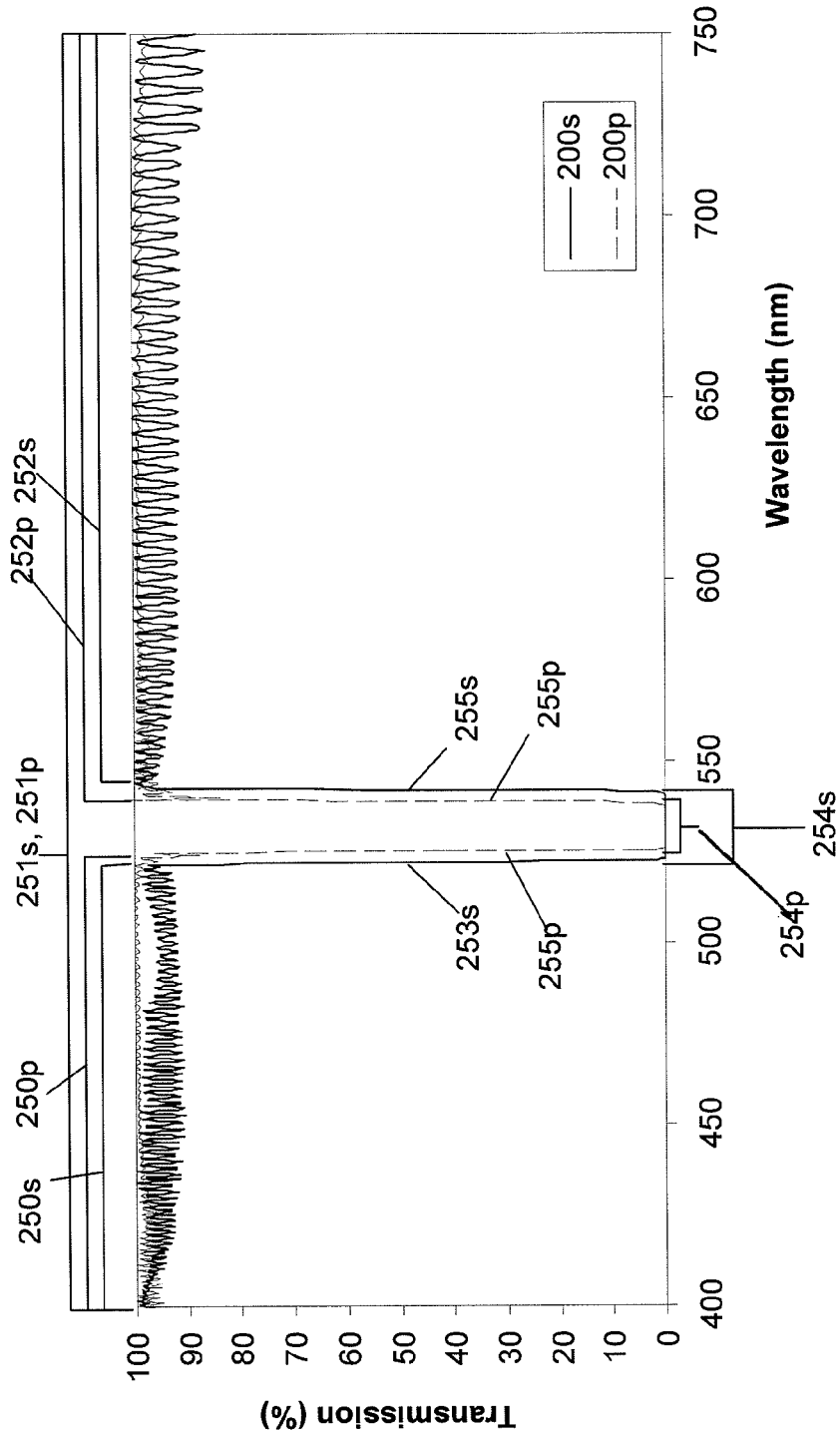
FIG. 5 is a design spectrum plotting transmission (%) vs. wavelength (nm) for s- and p-polarized light at 45° angle of incidence for a prior art notch filter based on second-order stop band.
Figure 6:
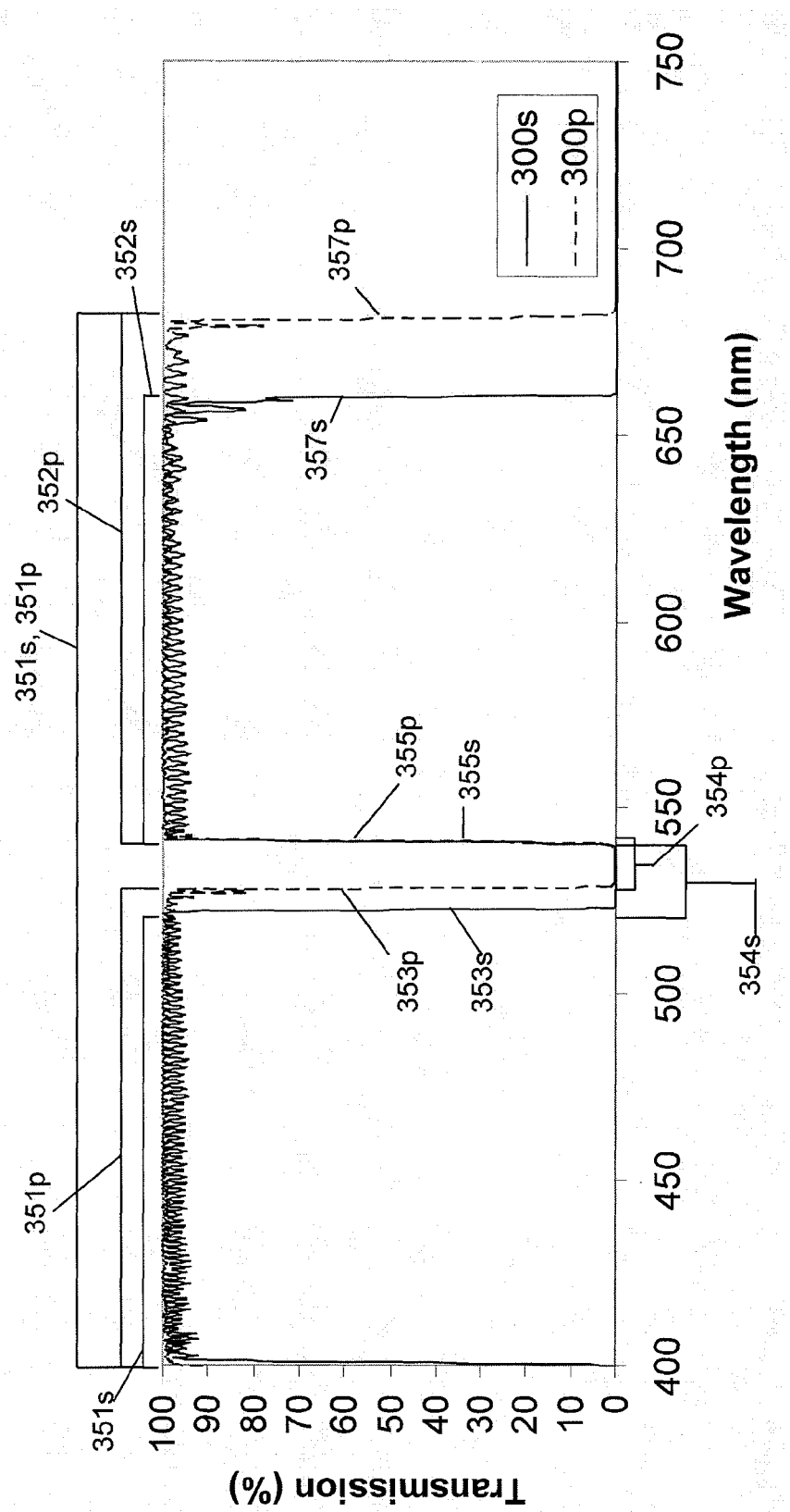
FIG. 6 is a design spectrum plotting transmission (%) vs. wavelength (nm) for s- and p-polarized light at 45° angle of incidence for a notch filter based on a short-wave pass band defect.
Figure 7:
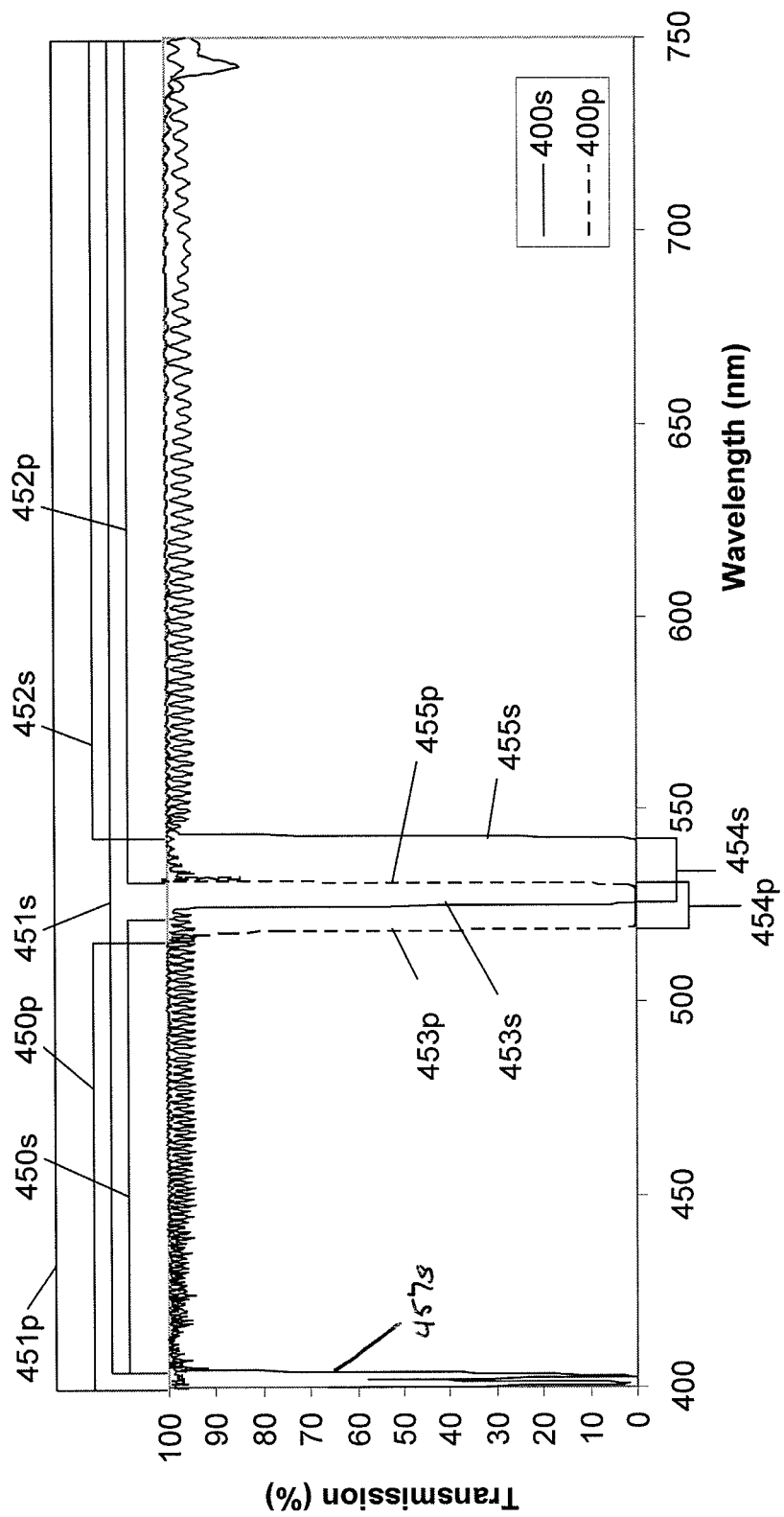
FIG. 7 is a design spectrum plotting transmission (%) vs. wavelength (nm) for s- and p-polarized light at 45° angle of incidence for a notch filter based on a long-wave pass band defect.
Figure 8:
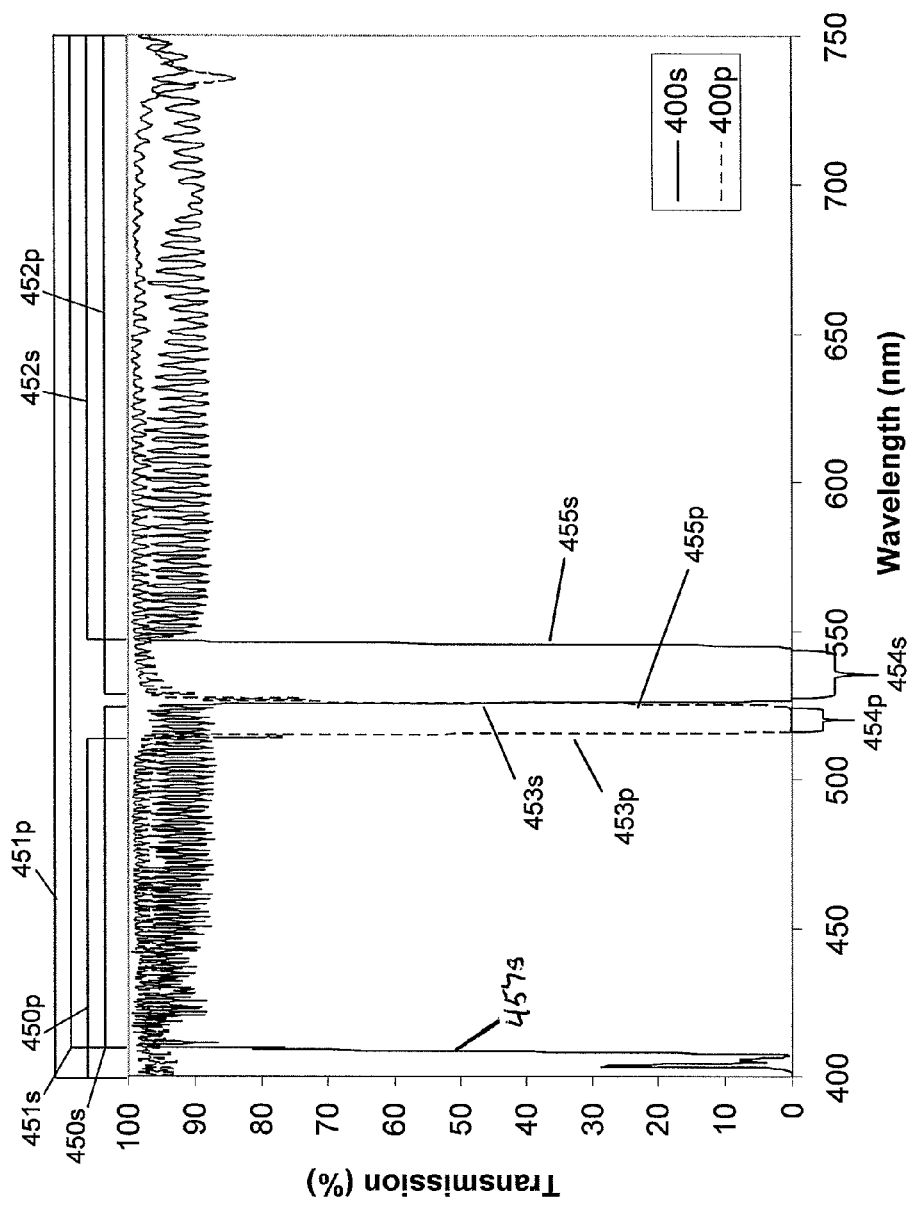
FIG. 8 is a design spectrum plotting transmission (%) vs. wavelength (nm) for s- and p-polarized light at 60° angle of incidence for a notch filter based on a long-wave pass band defect.

FIG. 5 is a graph that plots transmission of light (in %) vs. wavelength (in nm) for a traditional notch filter based on second order stop band. FIG. 6 is a graph that plots transmission (in %) vs. wavelength (in nm) for a notch filter in accordance with the present disclosure and based on SWP pass band defect. FIGS. 7 and 8 are graphs that plot transmission (in %) vs. wavelength (in nm) for a notch filter in accordance with the present disclosure and based on LWP pass band defect. The plots in FIGS. 5-7 were calculated at about 45° angle of incidence, whereas the plot FIG. 8 was calculated at about 60° angle of incidence.

As shown in FIG. 5, the second order notch filter exhibits a filter spectrum 200*s* for s-polarized light and a spectrum 200*p* for p-polarized light when calculated at 45° angle of incidence. Each of spectrum 200*s* and spectrum 200*p* has a pass band 251*s*, 251*p* including pass band regions 250*s*, 250*p* and 252*s*, 252*p* on the short and long wave side of second order stop band 254*s*, 254*p*. Second order stop band 254*s*, 254*p* has a short wave edge 253*s*, 253*p* and a long wave edge 255*s*, 255*p*. The second order notch filter also exhibits both a fundamental (i.e., first order) stop band and higher order stop bands, but these features are not shown in FIG. 5 due to cropping. If shown, the fundamental stop band would appear to the long wave side of second order stop band 254*s*, 254*p* and the higher order stop bands would appear to the short wave side of second order stop band 254*s*, 254*p*.

As shown in FIG. 6, the exemplary notch filter based on SWP pass band defect exhibited a filter spectrum 300*s* for s-polarized light and a spectrum 300*p* for p-polarized light when operated at 45° angle of incidence. Each of spectrum 300*s* and 300*p* includes a pass band 351*s*, 351*p* that includes a pass band region 350*s*, 350*p* on the short wave side of notch band 354*s*, 354*p* and a pass band region 352*s*, 352*p* on the long wave of notch band 354*s*, 354*p*. Notch band 354*s*, 354*p* exhibits a short wave edge 353*s*, 353*p* and a long wave edge 355*s*, 355*p*.

In FIGS. 7 and 8, the exemplary notch filter based on LWP pass band defect also exhibits a filter spectrum 400*s* for s-polarized light and a spectrum 400*p* for p-polarized light when operated at 45° angle of incidence. Each of spectrum 400*s* and 400*p* includes a pass band 453*s*, 453*p* that includes a pass band region 450s, 450p on the short wave side of notch band 454s, 454p and a pass band region 452s, 452p on the long wave of notch band 454s, 454p. Notch band 454s, 454p exhibits a short wave edge 453s, 453p and long wave edge 455s, 455p.

In addition, filter spectra 300s, 300p in FIG. 6 include a fundamental stop band 357s (shown), 357p (not shown due to cropping), and filter spectra 400s, 400p in FIGS. 7 and 8 include a fundamental stop band 457s (shown), 457p (not shown due to cropping). Because the filter producing the filter spectra 300s, 300p in FIG. 6 is based on the concept of short-wave pass band defect, fundamental stop band 357s, 357p appears on the long wave side of notch band 355s, 355p and has a short wave edge 353s, 353p. In contrast, because the filter producing the filter spectra 400s, 400p shown in FIGS. 7 and 8 is based on the concept of long wave pass band defect, fundamental stop band 457s, 457p, appears on the short wave side of notch 454s, 454p. Of course, the precise placement and fidelity of these and other spectral features of the filters according to the present disclosure are not limited to that shown in FIGS. 6-8.

A comparison of filter spectra 200s, 200p with filter spectra 300s, 300p, 400s and 400p demonstrates that the filters according to the present disclosure based on pass band defect exhibit significantly different optical properties than the traditional second order notch filter. Specifically, FIG. 5 shows that the notch region 254p associated with p polarized light falls symmetrically inside of the notch region 254s associated with s polarized light. As shown in FIGS. 6-8, however, the spectra of the notch filters based on pass band defect are oriented in a substantially different way.

Specifically, the s- and p-spectra 300s, 300p of a notch filter based on SWP pass band defect shown in FIG. 6 show that the notch region 354p associated with p-polarized light is narrower than region 354s associated with s-polarized light, but the two regions are not necessarily symmetrically centered on one another. In fact, for this case the long wave edges 355s, 355p of notch 354s, 354p (i.e., the "cut on wavelength" of the filter) are substantially aligned with one another, while the short wave edges 353s, 353p are substantially not aligned. Further, the s- and p-spectra 400s, 400p of a notch filter based on LWP pass band defect shown in FIGS. 7 and 8 show that the notch region 454p associated with p-polarized light is again narrower than region 454s associated with s-polarized light, but the two regions are even less symmetrically centered on one another than for the case of the SWP pass band defect. In fact for this example of a LWP pass band defect filter, at 45 degrees angle of incidence neither the short wave edges 453s, 453p nor the long wave edges 455s, 455p are aligned with one another, and at 60 degrees angle of incidence the edges become so misaligned that the notch regions 454p for p polarized light and 454s for s polarized light do not overlap at all. In contrast, simulation showed that filters based on SWP pass band defect may retain alignment of the s- and p-spectra 300s, 300p at the cut on wavelength of the filter, even at elevated (e.g., 45°, 60°, etc.) angles of incidence.

This phenomenon, referred to here as "redistribution of polarization splitting," may be characteristic of thin film interference filters that are configured to have at least one pass band defect. As used herein, the term, "polarization splitting" refers to the difference in notch edge positions between the two polarizations of light.

As previously described, filters in accordance with the present disclosure and which are based on pass band defect—in particular a LWP pass band defect—generally include many more layers than a traditional second order stop band edge filter. For example, a traditional second order notch filter may be constructed of about 180 alternating material layers. In contrast, the notch filters according to the present disclosure may, for example, comprise from about 200 to about 600 layers or more.

Figure 9:
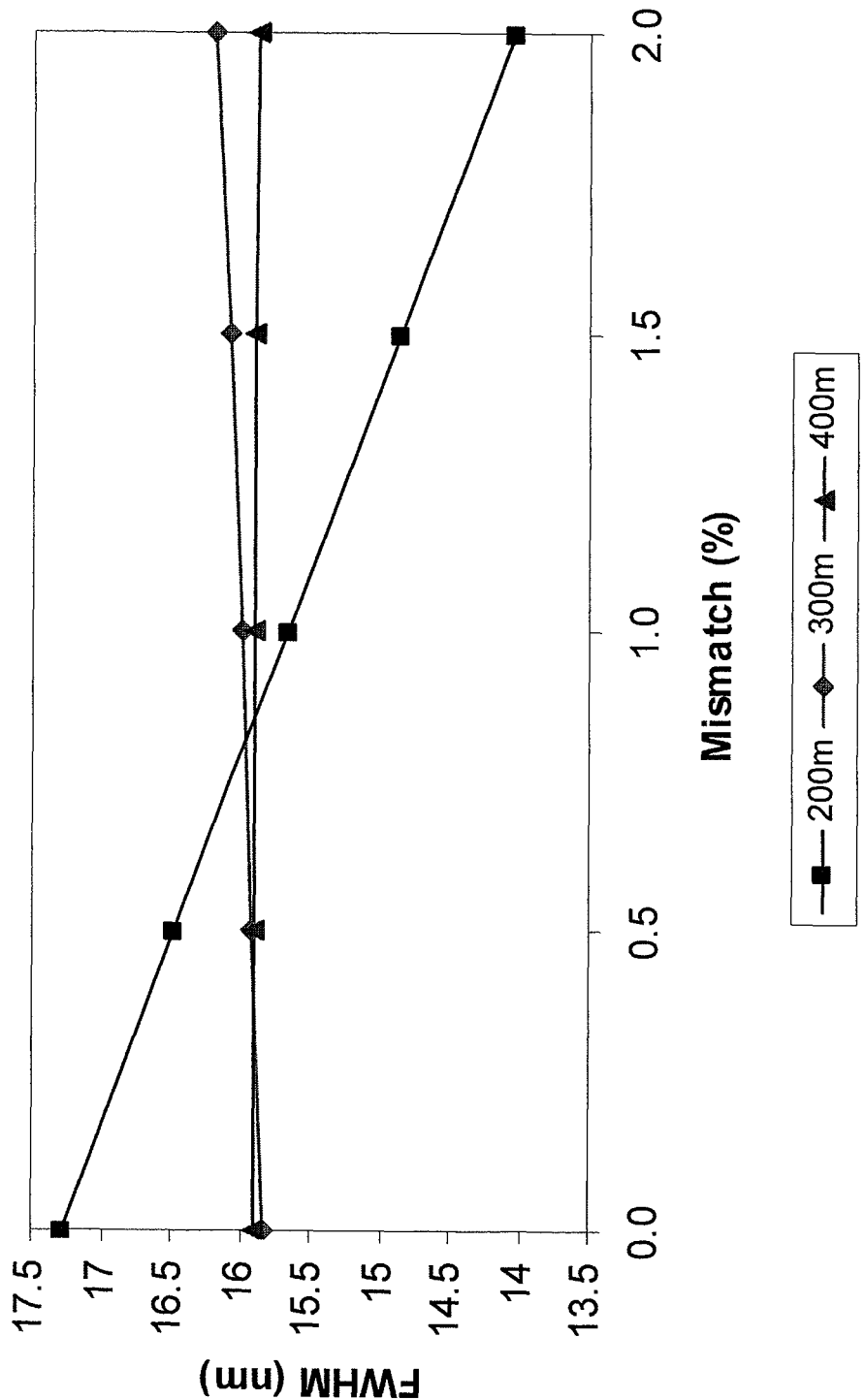
FIG. 9 is a plot of full width half maximum vs. material mismatch for three different filter designs.

Further, the filters according to the present disclosure may exhibit reduced sensitivity to material mismatch, relative to traditional higher order stop band notch filters. This benefit is clearly shown by FIG. 9, which is a graph that plots the notch band FHWM vs. material mismatch for a traditional thin film filter 200m exhibiting a second order stop band, and two non-limiting embodiments of notch filters according to the present disclosure, i.e., a filter 300m having a SWP pass band defect, and a filter 400m having a LWP pass band defect. As shown, the filters in accordance with the present disclosure exhibited relatively constant notch band FWHM, even when the degree of material mismatch in the filter varied from 0 to 2.0%. In contrast, the notch band FWHM of the second order notch filter varied from ~17.25 nm to ~14 nm (roughly 20%), as material mismatch was varied by the same amount.

Thus, consistent with the present disclosure are thin film notch filters that exhibit less than about a 6% change in notch FWHM when the material mismatch between the plurality of distinct alternating material layers varies between 0 and 2%. In some embodiments, the change in notch FWHM is less than about 3%, for example less than about 1.5%, over the same variation in material mismatch. Filters according to the present disclosure can improve the performance of a variety of optical analysis systems that illuminate/excite a sample with light of a first wavelength (or range of wavelengths) to produce a measurable or viewable response of light at a second wavelength different from the first. Such systems, which include Raman spectroscopy and fluorescence microscopy, generally have the typical construction shown in FIG. 3. Of course, the filters of the present disclosure may be used in optical systems having other configurations.

Filters according to the present disclosure may be used in known optical systems in any manner consistent with the use of interference filters known in the art. For example, filters according to the present disclosure may be used in optical systems employing the configuration shown in FIG. 3. As previously described, such a system generally includes a light source 31, such as a laser, an excitation filter 32, a sample 33, a collection filter 34, and a detector 35. In operation, light source 31 emits light having a wavelength (e.g., $\lambda_L$) or range of wavelengths which passes though excitation filter 32 and illuminates sample 33 directly. Sample 33 scatters Raman shifted and unshifted excitation (Rayleigh scattered) light. Collection filter 34 is positioned between sample 33 and detector 35, such as a spectrophotometer. Collection filter 34 is configured to block the Rayleigh scattered light from sample 33 but transmit as much of the Raman shifted light as possible, and as close to $\lambda_L$ as possible.

Figure 3:
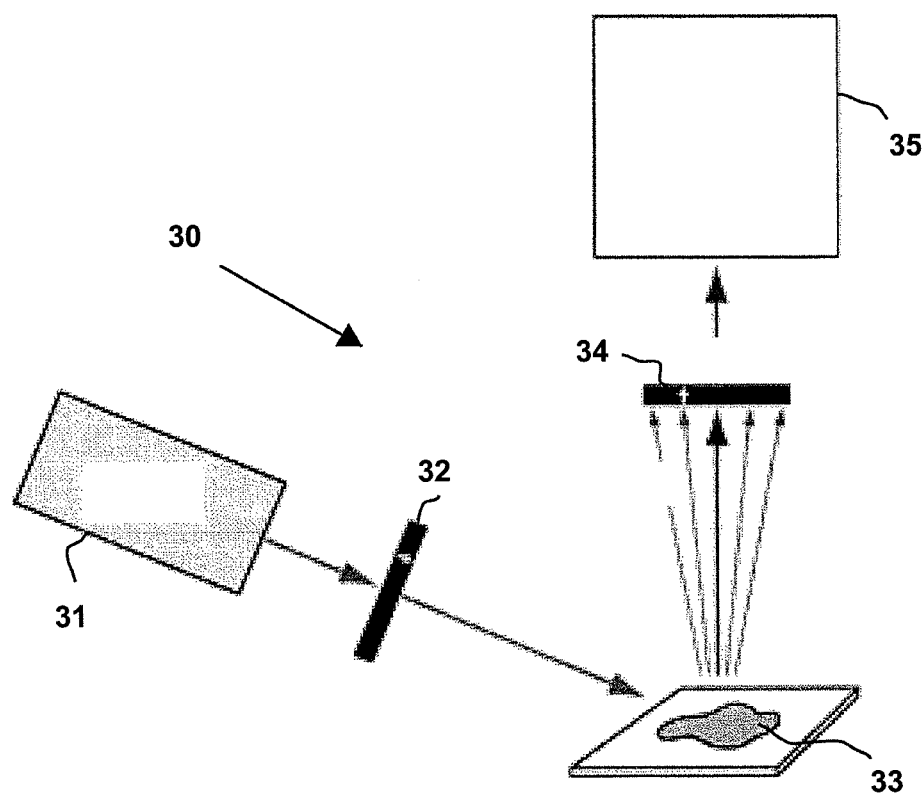
FIG. 3 is a schematic illustration of a Raman spectroscopy system having a standard configuration.

Filters in accordance with the present disclosure may be used, for example, as collection filter 34 in optical systems of the general configuration shown in FIG. 3. In this case, the plurality of distinct material layers in the filter may be configured such that the filter substantially blocks all light corresponding to scattered but unshifted light emitted by light source 31.

Use of filters according to the present disclosure in such systems allows signals to be measured closer to the wavelength or wavelength region associated with the excitation laser or source, while maintaining necessary high blocking of the source light from the detection system. Thus, in Raman spectroscopy, filters according to the present disclosure allow the measurement of signals closer to the laser line. As a result, vibrational lines with very small energy shifts can be measured, thus providing information about a measured sample that would otherwise be obscured by Rayleigh scattered light.

In fluorescence spectroscopy and imaging, the ability to measure signals closer to the source wavelength means that more signal can be captured, thus increasing the sensitivity of the system (ability to measure very small signals) and the specificity of the system (decrease in background noise). Furthermore, filters according to the present disclosure that exhibit enhanced blocking may allow for one or more of the excitation and/or collection filters of the system shown in FIG. 3 to be removed.

The disclosure will be more fully illustrated using the following non-limiting examples.

EXAMPLES

Examples 1-3

Thin Film Notch Filter Designs Based on SWP or LWP Pass Band Defect

Three filter designs (filters 300m, 400m, 500m) in accordance with the present disclosure were produced by optimizing a standard SWP or LWP edge filter design having an initial structure corresponding to $(0.5H:L:0.5H)^N$, where H and L are quarter wave thick layers of materials having high and low refractive index, respectively, and N is an integer determined by coating thickness. The initial design was optimized against a design spectrum using well-known optimization algorithms (e.g., the variable metric approach) to produce a design spectrum for a thin film notch filter comprising two materials and exhibiting a SWP pass band defect (i.e., filter 300m), a notch filter comprising two materials and exhibiting a LWP pass band defect (i.e. filter 400m), and a notch filter comprising three materials and exhibiting a SWP pass band defect and (i.e., filter 500m). For the third design (500m), the high and low index materials were $Nb_2O_5$ and $Ta_2O_5$, which have a similar index of refraction, and subsequently layers incorporating a third, much-lower index material ($SiO_2$) were added above and below the basic structure. In each case, the initial design was optimized starting from a basic SWP or LWP filter structure comprising a substrate and a plurality of alternating quarter wavelength thick layers of materials having high and low refractive index at a reference wavelength, respectively, and in view of a target (design) spectrum having desired spectral characteristics.

In the design spectrum, the edge of the initial SWP/LWP design was chosen to be slightly longer/shorter than a specified long/short wavelength edge of the pass band. The pass band ripple of the design spectrum may be optimized. After optimizing the pass band ripple, the optimization continued while the blocking level just below the cut-on wavelength of the pass band defect was gradually increased. Three notch filter designs were produced, one based on SWP pass band defect and two materials, one based on LWP pass band defect, and one based on SWP pass band defect and three materials.

Figure 10:
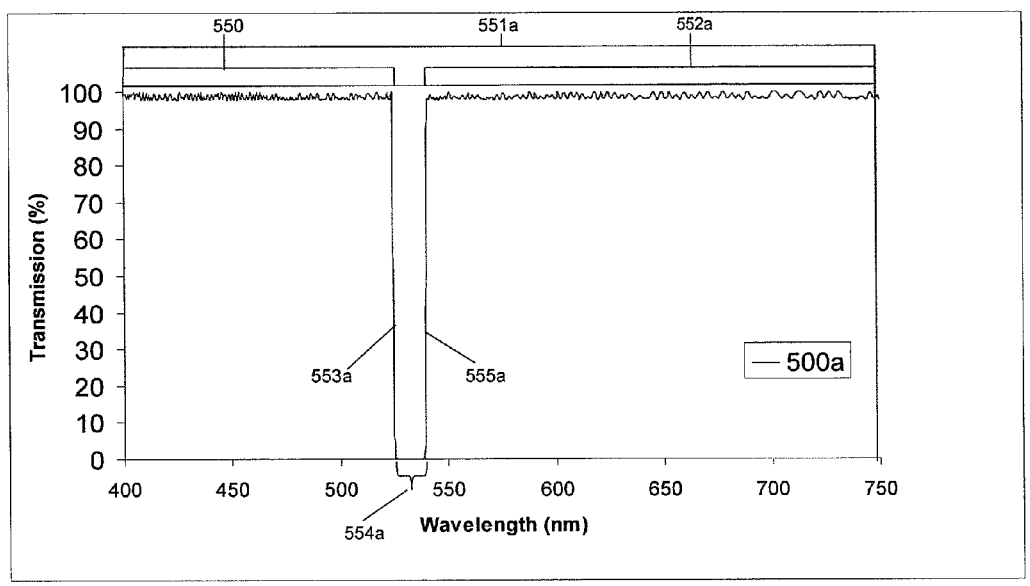
FIG. 10 is a design spectrum plotting transmission vs. wavelength for s- and p-polarized light at 0° angle of incidence for a notch filter based on a short-wave pass band defect and constructed of $NB_2O_5$, $TaO_2$, and $SiO_2$ layers.
Figure 11:
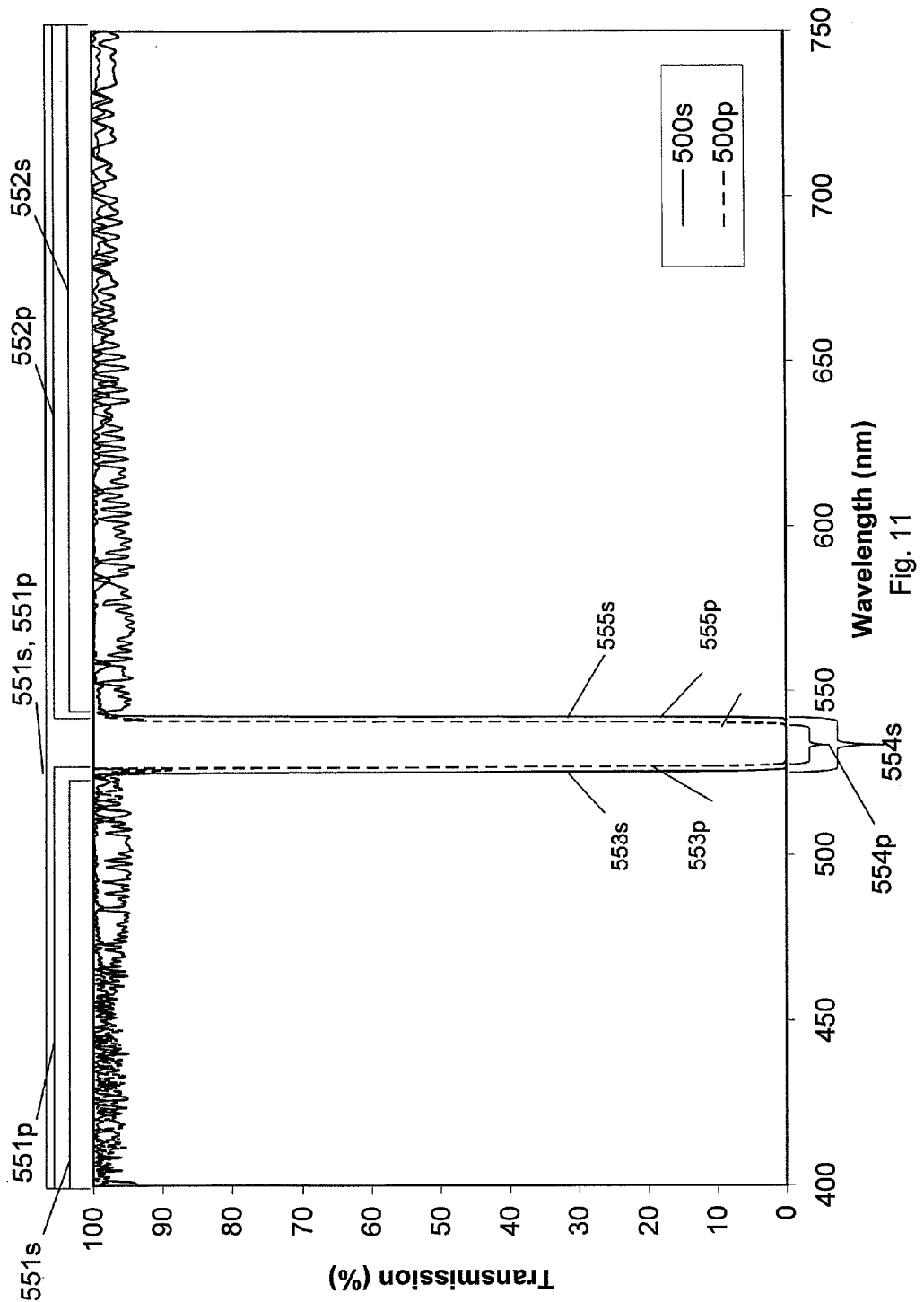
FIG. 11 is a design spectrum plotting transmission (%) vs. wavelength (nm) for s- and p-polarized light at 45° angle of incidence for a notch filter based on short-wave pass band defect and constructed of $NB_2O_5$, $TaO_2$, and $SiO_2$ layers.

The spectra of these filter designs were calculated at 0° angle of incidence. The calculated spectra 300a, 400a for the two material filter 300m based on SWP pass band defect and the two material filter based on LWP pass band defect 300m, respectively, are shown in FIG. 4A. The calculated spectrum 500a for the three material filter 500m based on SWP pass band defect is shown in FIG. 10. The spectra for these filter designs were further calculated at 45°, and in one case at 60° angle of incidence. The calculated spectra 300p, 300s for p-polarized light and s-polarized light, respectively, for filter 300m are shown in FIG. 6. The calculated spectra 400p, 400s for p-polarized light and s-polarized light, respectively, for filter 400m are shown in FIGS. 7 and 8 for light incident at an angle of 45° and 60°, respectively. The calculated spectra 500p, 500s for p-polarized light and s-polarized light, respectively, for filter 500m are shown in FIG. 11.

As shown in FIGS. 4 and 10, each of the calculated spectra for light at a 0° angle of incidence includes a pass band 351, 451, 551 and pass band regions 350, 352, 450, 452, 550, 552. Each of these spectra also includes a notch 354, 454, 554 having a long wave edge 355, 455, 555 and a short wave edge 353, 453, 553. As shown in FIGS. 6-8 and 11, each of the calculated spectra for light at a 45° or 60° angle of incidence includes a pass band 351s, 351p, 451s, 451p, 551s, 551p, and pass band regions 350s, 350p, 352s, 352p, 450s, 450p, 452s, 452p, 550s, 550p, 552s, 552p. Each of these spectra also includes a notch 354s, 354p, 454s, 454p, 554s, 554p having a long wave edge 355s, 355p, 455s, 455p, 555s, 555p and a short wave edge 353s, 353p, 453s, 453p, 553s, 553p.

As shown in FIG. 6, each of the spectra 300s, 300p also includes a fundamental stop band 357s, 357p to the long wave side of notch 354s, 354p.

As shown in FIGS. 7 and 8, each of the spectra 400s, 400p includes a fundamental pass band 458s, 458p to the short wave side of notch 454s, 454p.

The calculated spectra 300a, 400a, 300s, 300p, 400s, 400p, and 500s, 500p were compared to the spectra of a comparative notch filter 200m (comparative example 1) that was designed based on the second order stop band approach. The calculated spectra 200a, 200s, 200p for the comparative filter 200m are shown in FIGS. 4 and 5, and the calculated spectra for the filters 300m, 400m, 500m, are shown in FIGS. 4, 6, 7, 8, 10, and 11. Quantitative characteristics of the comparative design and the three exemplary filter are provided in the following table.

TABLE 1

Comparison of Three Exemplary Filter Designs Based on Pass Band Defect to a Traditional Second Order Stop band Design

| | Example | | | |
|---|---|---|---|---|
| | Comparative | 1 | 2 | 3 |
| description | Second Order (200 m) | SWP 1 (300 m) | LWP 1 (400 m) | SWP 2 (500 m) |
| FIG. | 4, 5 | 4, 6 | 4, 7, 8 | 10, 11 |
| Material | Nb/Si | Nb/Si | Nb/Si | Nb/Ta/Si |
| Reference Wavelength (nm) | 532 | 755 | 345 | 790 |
| Coating thickness (µm) | 27.6 | 28.8 | 28.3 | 27.8 |
| Number of Layers | 180 | 264 | 601 | 307 |
| Notch FWHM (nm) | 17.3 | 15.8 | 15.9 | 15.7 |

The spectra in FIGS. 4-8 and 10-11 and the data in Table 1 demonstrate that the notch filter designs based on the pass band defect approach can exhibit equal or better performance to comparable notch filters based on the higher order stop band approach at 0° degree angle of incidence. As an example, FIG. 11, which plots the calculated spectra for a three material filter based on SWP pass band defect, shows that notch 554p associated with p-polarized light falls symmetrically inside of notch 554s associated with s-polarized light for light at non-zero angles of incidence, just as in the case of filter 200m. In fact, the bandwidths of notches 554p and 554s, respectively, for filter 500m are even more similar than those of notches 254p and 254s shown in FIG. 5, which plots the calculated spectra for filter 200m (based on second order harmonic stop band).

At higher angles of incidence, the notch filters based on pass band defect generally behave in different ways from harmonic stop band notch filters. However, the flexibility afforded by pass band defect designs makes it possible to design pass band defect notch filters that have a similar or even improved performance relative to the harmonic stop band notch filters as the angle of incidence is varied from 0 degrees to higher angles.

Example 4

Single Notch Filter Based on Pass Band Defect and Exhibiting Extended Pass Band Bandwidth A thin film notch filter 600m based on LWP pass band defect was designed having the configuration shown in the following table.

TABLE 2

Notch Filter (600 m) Having A Single Notch at 632.8 nm.

| Layer # | Material | Thickness (nm) | Layer # | Material | Thickness (nm) |
|---|---|---|---|---|---|
| 1 | Ta2O5 | 10.00 | 2 | SiO2 | 68.15 |
| 3 | Ta2O5 | 17.69 | 4 | SiO2 | 57.85 |
| 5 | Ta2O5 | 28.52 | 6 | SiO2 | 42.20 |
| 7 | Ta2O5 | 36.00 | 8 | SiO2 | 42.44 |
| 9 | Ta2O5 | 34.22 | 10 | SiO2 | 43.43 |
| 11 | Ta2O5 | 32.50 | 12 | SiO2 | 52.96 |
| 13 | Ta2O5 | 25.53 | 14 | SiO2 | 56.72 |
| 15 | Ta2O5 | 27.21 | 16 | SiO2 | 54.74 |
| 17 | Ta2O5 | 25.95 | 18 | SiO2 | 52.03 |
| 19 | Ta2O5 | 31.47 | 20 | SiO2 | 43.36 |
| 21 | Ta2O5 | 30.66 | 22 | SiO2 | 48.14 |
| 23 | Ta2O5 | 29.55 | 24 | SiO2 | 44.97 |
| 25 | Ta2O5 | 28.93 | 26 | SiO2 | 53.13 |
| 27 | Ta2O5 | 25.00 | 28 | SiO2 | 50.93 |
| 29 | Ta2O5 | 29.26 | 30 | SiO2 | 49.94 |
| 31 | Ta2O5 | 26.93 | 32 | SiO2 | 49.90 |
| 33 | Ta2O5 | 31.77 | 34 | SiO2 | 43.99 |
| 35 | Ta2O5 | 29.04 | 36 | SiO2 | 51.23 |
| 37 | Ta2O5 | 28.35 | 38 | SiO2 | 45.31 |
| 39 | Ta2O5 | 28.48 | 40 | SiO2 | 52.58 |
| 41 | Ta2O5 | 24.89 | 42 | SiO2 | 47.76 |
| 43 | Ta2O5 | 30.26 | 44 | SiO2 | 46.63 |
| 45 | Ta2O5 | 26.53 | 46 | SiO2 | 49.31 |
| 47 | Ta2O5 | 30.67 | 48 | SiO2 | 43.32 |
| 49 | Ta2O5 | 28.25 | 50 | SiO2 | 52.33 |
| 51 | Ta2O5 | 27.03 | 52 | SiO2 | 45.17 |
| 53 | Ta2O5 | 29.20 | 54 | SiO2 | 51.49 |
| 55 | Ta2O5 | 25.01 | 56 | SiO2 | 47.57 |
| 57 | Ta2O5 | 31.41 | 58 | SiO2 | 45.06 |
| 59 | Ta2O5 | 26.52 | 60 | SiO2 | 51.23 |
| 61 | Ta2O5 | 29.78 | 62 | SiO2 | 43.09 |
| 63 | Ta2O5 | 28.39 | 64 | SiO2 | 53.73 |
| 65 | Ta2O5 | 26.19 | 66 | SiO2 | 45.31 |
| 67 | Ta2O5 | 30.53 | 68 | SiO2 | 50.30 |
| 69 | Ta2O5 | 25.06 | 70 | SiO2 | 48.53 |
| 71 | Ta2O5 | 31.90 | 72 | SiO2 | 44.01 |
| 73 | Ta2O5 | 26.43 | 74 | SiO2 | 52.86 |
| 75 | Ta2O5 | 28.80 | 76 | SiO2 | 42.73 |
| 77 | Ta2O5 | 28.73 | 78 | SiO2 | 53.55 |
| 79 | Ta2O5 | 25.51 | 80 | SiO2 | 45.26 |
| 81 | Ta2O5 | 31.55 | 82 | SiO2 | 48.37 |
| 83 | Ta2O5 | 25.03 | 84 | SiO2 | 49.73 |
| 85 | Ta2O5 | 31.59 | 86 | SiO2 | 43.37 |
| 87 | Ta2O5 | 26.48 | 88 | SiO2 | 54.29 |
| 89 | Ta2O5 | 28.02 | 90 | SiO2 | 42.17 |
| 91 | Ta2O5 | 29.84 | 92 | SiO2 | 53.16 |
| 93 | Ta2O5 | 25.05 | 94 | SiO2 | 45.71 |
| 95 | Ta2O5 | 32.49 | 96 | SiO2 | 47.30 |
| 97 | Ta2O5 | 24.93 | 98 | SiO2 | 51.63 |
| 99 | Ta2O5 | 31.22 | 100 | SiO2 | 42.74 |
| 101 | Ta2O5 | 27.03 | 102 | SiO2 | 54.96 |
| 103 | Ta2O5 | 27.48 | 104 | SiO2 | 42.15 |
| 105 | Ta2O5 | 30.58 | 106 | SiO2 | 52.17 |
| 107 | Ta2O5 | 24.83 | 108 | SiO2 | 46.26 |
| 109 | Ta2O5 | 32.79 | 110 | SiO2 | 46.64 |
| 111 | Ta2O5 | 24.67 | 112 | SiO2 | 53.32 |
| 113 | Ta2O5 | 30.98 | 114 | SiO2 | 42.38 |
| 115 | Ta2O5 | 27.69 | 116 | SiO2 | 55.64 |
| 117 | Ta2O5 | 27.38 | 118 | SiO2 | 41.91 |
| 119 | Ta2O5 | 31.45 | 120 | SiO2 | 52.10 |
| 121 | Ta2O5 | 24.35 | 122 | SiO2 | 47.08 |
| 123 | Ta2O5 | 32.78 | 124 | SiO2 | 45.99 |
| 125 | Ta2O5 | 24.36 | 126 | SiO2 | 53.99 |
| 127 | Ta2O5 | 30.66 | 128 | SiO2 | 41.39 |
| 129 | Ta2O5 | 28.16 | 130 | SiO2 | 55.34 |
| 131 | Ta2O5 | 26.71 | 132 | SiO2 | 42.09 |
| 133 | Ta2O5 | 32.01 | 134 | SiO2 | 51.13 |
| 135 | Ta2O5 | 23.84 | 136 | SiO2 | 48.50 |
| 137 | Ta2O5 | 32.47 | 138 | SiO2 | 45.11 |
| 139 | Ta2O5 | 24.70 | 140 | SiO2 | 54.44 |
| 141 | Ta2O5 | 30.20 | 142 | SiO2 | 40.66 |
| 143 | Ta2O5 | 29.02 | 144 | SiO2 | 55.22 |
| 145 | Ta2O5 | 26.18 | 146 | SiO2 | 42.66 |
| 147 | Ta2O5 | 32.50 | 148 | SiO2 | 51.06 |
| 149 | Ta2O5 | 23.54 | 150 | SiO2 | 49.88 |
| 151 | Ta2O5 | 32.63 | 152 | SiO2 | 44.38 |
| 153 | Ta2O5 | 25.20 | 154 | SiO2 | 55.10 |
| 155 | Ta2O5 | 30.11 | 156 | SiO2 | 40.24 |
| 157 | Ta2O5 | 29.61 | 158 | SiO2 | 55.13 |
| 159 | Ta2O5 | 25.64 | 160 | SiO2 | 43.47 |
| 161 | Ta2O5 | 32.43 | 162 | SiO2 | 50.69 |
| 163 | Ta2O5 | 23.47 | 164 | SiO2 | 50.39 |
| 165 | Ta2O5 | 32.92 | 166 | SiO2 | 43.57 |
| 167 | Ta2O5 | 25.56 | 168 | SiO2 | 55.36 |
| 169 | Ta2O5 | 29.80 | 170 | SiO2 | 40.07 |
| 171 | Ta2O5 | 29.69 | 172 | SiO2 | 55.22 |
| 173 | Ta2O5 | 24.90 | 174 | SiO2 | 43.48 |
| 175 | Ta2O5 | 32.67 | 176 | SiO2 | 48.98 |
| 177 | Ta2O5 | 23.26 | 178 | SiO2 | 51.04 |
| 179 | Ta2O5 | 32.34 | 180 | SiO2 | 41.98 |
| 181 | Ta2O5 | 26.12 | 182 | SiO2 | 55.47 |
| 183 | Ta2O5 | 28.49 | 184 | SiO2 | 39.80 |
| 185 | Ta2O5 | 30.24 | 186 | SiO2 | 53.63 |
| 187 | Ta2O5 | 23.42 | 188 | SiO2 | 44.75 |
| 189 | Ta2O5 | 32.52 | 190 | SiO2 | 44.96 |
| 191 | Ta2O5 | 23.59 | 192 | SiO2 | 52.82 |
| 193 | Ta2O5 | 30.71 | 194 | SiO2 | 39.79 |
| 195 | Ta2O5 | 27.90 | 196 | SiO2 | 55.70 |
| 197 | Ta2O5 | 25.80 | 198 | SiO2 | 41.35 |
| 199 | Ta2O5 | 31.86 | 200 | SiO2 | 50.19 |
| 201 | Ta2O5 | 22.79 | 202 | SiO2 | 48.49 |
| 203 | Ta2O5 | 32.37 | 204 | SiO2 | 41.86 |
| 205 | Ta2O5 | 25.26 | 206 | SiO2 | 55.32 |
| 207 | Ta2O5 | 28.85 | 208 | SiO2 | 39.83 |
| 209 | Ta2O5 | 30.14 | 210 | SiO2 | 55.10 |
| 211 | Ta2O5 | 24.36 | 212 | SiO2 | 44.00 |
| 213 | Ta2O5 | 33.04 | 214 | SiO2 | 47.51 |
| 215 | Ta2O5 | 22.99 | 216 | SiO2 | 51.33 |
| 217 | Ta2O5 | 31.53 | 218 | SiO2 | 39.79 |
| 219 | Ta2O5 | 26.67 | 220 | SiO2 | 55.70 |
| 221 | Ta2O5 | 26.69 | 222 | SiO2 | 40.27 |
| 223 | Ta2O5 | 31.51 | 224 | SiO2 | 52.39 |
| 225 | Ta2O5 | 23.09 | 226 | SiO2 | 47.18 |
| 227 | Ta2O5 | 33.12 | 228 | SiO2 | 43.67 |
| 229 | Ta2O5 | 24.22 | 230 | SiO2 | 54.05 |
| 231 | Ta2O5 | 29.80 | 232 | SiO2 | 39.28 |
| 233 | Ta2O5 | 28.78 | 234 | SiO2 | 55.28 |
| 235 | Ta2O5 | 24.89 | 236 | SiO2 | 42.54 |
| 237 | Ta2O5 | 32.75 | 238 | SiO2 | 49.57 |
| 239 | Ta2O5 | 22.99 | 240 | SiO2 | 50.45 |
| 241 | Ta2O5 | 32.93 | 242 | SiO2 | 42.00 |
| 243 | Ta2O5 | 25.70 | 244 | SiO2 | 56.17 |
| 245 | Ta2O5 | 28.79 | 246 | SiO2 | 39.77 |
| 247 | Ta2O5 | 30.37 | 248 | SiO2 | 55.06 |
| 249 | Ta2O5 | 24.20 | 250 | SiO2 | 44.50 |
| 251 | Ta2O5 | 33.43 | 252 | SiO2 | 47.90 |
| 253 | Ta2O5 | 23.36 | 254 | SiO2 | 52.15 |
| 255 | Ta2O5 | 32.32 | 256 | SiO2 | 41.26 |
| 257 | Ta2O5 | 26.55 | 258 | SiO2 | 56.74 |

TABLE 2-continued

Notch Filter (600 m) Having A Single Notch at 632.8 nm.

| Layer # | Material | Thickness (nm) | Layer # | Material | Thickness (nm) |
|---|---|---|---|---|---|
| 259 | Ta2O5 | 28.09 | 260 | SiO2 | 40.35 |
| 261 | Ta2O5 | 31.08 | 262 | SiO2 | 54.66 |
| 263 | Ta2O5 | 24.03 | 264 | SiO2 | 45.23 |
| 265 | Ta2O5 | 33.71 | 266 | SiO2 | 46.98 |
| 267 | Ta2O5 | 23.48 | 268 | SiO2 | 53.30 |
| 269 | Ta2O5 | 31.95 | 270 | SiO2 | 40.93 |
| 271 | Ta2O5 | 27.01 | 272 | SiO2 | 57.20 |
| 273 | Ta2O5 | 27.63 | 274 | SiO2 | 40.79 |
| 275 | Ta2O5 | 31.84 | 276 | SiO2 | 54.15 |
| 277 | Ta2O5 | 24.18 | 278 | SiO2 | 46.09 |
| 279 | Ta2O5 | 33.79 | 280 | SiO2 | 47.32 |
| 281 | Ta2O5 | 23.63 | 282 | SiO2 | 53.70 |
| 283 | Ta2O5 | 32.04 | 284 | SiO2 | 41.35 |
| 285 | Ta2O5 | 26.86 | 286 | SiO2 | 57.33 |
| 287 | Ta2O5 | 27.91 | 288 | SiO2 | 40.26 |
| 289 | Ta2O5 | 32.08 | 290 | SiO2 | 54.12 |
| 291 | Ta2O5 | 24.10 | 292 | SiO2 | 46.33 |
| 293 | Ta2O5 | 33.78 | 294 | SiO2 | 47.78 |
| 295 | Ta2O5 | 23.44 | 296 | SiO2 | 54.12 |
| 297 | Ta2O5 | 32.01 | 298 | SiO2 | 41.34 |
| 299 | Ta2O5 | 27.02 | 300 | SiO2 | 56.82 |
| 301 | Ta2O5 | 28.27 | 302 | SiO2 | 39.97 |
| 303 | Ta2O5 | 31.84 | 304 | SiO2 | 54.30 |
| 305 | Ta2O5 | 24.03 | 306 | SiO2 | 46.26 |
| 307 | Ta2O5 | 33.48 | 308 | SiO2 | 47.98 |
| 309 | Ta2O5 | 23.21 | 310 | SiO2 | 53.89 |
| 311 | Ta2O5 | 32.13 | 312 | SiO2 | 40.76 |
| 313 | Ta2O5 | 27.22 | 314 | SiO2 | 56.24 |
| 315 | Ta2O5 | 28.04 | 316 | SiO2 | 39.91 |
| 317 | Ta2O5 | 31.76 | 318 | SiO2 | 54.06 |
| 319 | Ta2O5 | 23.50 | 320 | SiO2 | 46.98 |
| 321 | Ta2O5 | 33.16 | 322 | SiO2 | 47.29 |
| 323 | Ta2O5 | 23.46 | 324 | SiO2 | 53.63 |
| 325 | Ta2O5 | 32.19 | 326 | SiO2 | 40.05 |
| 327 | Ta2O5 | 27.72 | 328 | SiO2 | 56.57 |
| 329 | Ta2O5 | 27.38 | 330 | SiO2 | 40.53 |
| 331 | Ta2O5 | 31.87 | 332 | SiO2 | 53.98 |
| 333 | Ta2O5 | 23.19 | 334 | SiO2 | 47.81 |
| 335 | Ta2O5 | 33.44 | 336 | SiO2 | 46.24 |
| 337 | Ta2O5 | 23.96 | 338 | SiO2 | 54.10 |
| 339 | Ta2O5 | 31.94 | 340 | SiO2 | 39.92 |
| 341 | Ta2O5 | 28.13 | 342 | SiO2 | 56.35 |
| 343 | Ta2O5 | 26.99 | 344 | SiO2 | 41.24 |
| 345 | Ta2O5 | 31.65 | 346 | SiO2 | 54.27 |
| 347 | Ta2O5 | 23.16 | 348 | SiO2 | 47.81 |
| 349 | Ta2O5 | 33.93 | 350 | SiO2 | 45.70 |
| 351 | Ta2O5 | 24.40 | 352 | SiO2 | 54.21 |
| 353 | Ta2O5 | 32.13 | 354 | SiO2 | 40.34 |
| 355 | Ta2O5 | 27.96 | 356 | SiO2 | 57.65 |
| 357 | Ta2O5 | 26.95 | 358 | SiO2 | 41.69 |
| 359 | Ta2O5 | 31.78 | 360 | SiO2 | 54.16 |
| 361 | Ta2O5 | 23.73 | 362 | SiO2 | 47.00 |
| 363 | Ta2O5 | 34.31 | 364 | SiO2 | 46.05 |
| 365 | Ta2O5 | 24.23 | 366 | SiO2 | 54.06 |
| 367 | Ta2O5 | 32.05 | 368 | SiO2 | 41.11 |
| 369 | Ta2O5 | 27.21 | 370 | SiO2 | 57.95 |
| 371 | Ta2O5 | 27.14 | 372 | SiO2 | 41.00 |
| 373 | Ta2O5 | 31.90 | 374 | SiO2 | 53.53 |
| 375 | Ta2O5 | 23.93 | 376 | SiO2 | 46.18 |
| 377 | Ta2O5 | 34.24 | 378 | SiO2 | 46.12 |
| 379 | Ta2O5 | 23.97 | 380 | SiO2 | 54.70 |
| 381 | Ta2O5 | 31.51 | 382 | SiO2 | 41.71 |
| 383 | Ta2O5 | 27.15 | 384 | SiO2 | 57.74 |
| 385 | Ta2O5 | 27.73 | 386 | SiO2 | 40.42 |
| 387 | Ta2O5 | 32.17 | 388 | SiO2 | 53.38 |
| 389 | Ta2O5 | 24.22 | 390 | SiO2 | 45.96 |
| 391 | Ta2O5 | 34.01 | 392 | SiO2 | 47.35 |
| 393 | Ta2O5 | 23.38 | 394 | SiO2 | 55.15 |
| 395 | Ta2O5 | 31.72 | 396 | SiO2 | 41.75 |
| 397 | Ta2O5 | 27.27 | 398 | SiO2 | 57.35 |
| 399 | Ta2O5 | 28.39 | 400 | SiO2 | 39.96 |
| 401 | Ta2O5 | 32.25 | 402 | SiO2 | 53.54 |
| 403 | Ta2O5 | 24.11 | 404 | SiO2 | 45.96 |
| 405 | Ta2O5 | 33.11 | 406 | SiO2 | 47.87 |
| 407 | Ta2O5 | 22.94 | 408 | SiO2 | 54.31 |
| 409 | Ta2O5 | 31.73 | 410 | SiO2 | 40.87 |
| 411 | Ta2O5 | 27.58 | 412 | SiO2 | 56.36 |
| 413 | Ta2O5 | 28.34 | 414 | SiO2 | 39.88 |
| 415 | Ta2O5 | 32.24 | 416 | SiO2 | 54.10 |
| 417 | Ta2O5 | 23.51 | 418 | SiO2 | 47.04 |
| 419 | Ta2O5 | 32.76 | 420 | SiO2 | 47.13 |
| 421 | Ta2O5 | 23.16 | 422 | SiO2 | 54.07 |
| 423 | Ta2O5 | 31.70 | 424 | SiO2 | 39.76 |
| 425 | Ta2O5 | 28.30 | 426 | SiO2 | 55.72 |
| 427 | Ta2O5 | 27.65 | 428 | SiO2 | 40.64 |
| 429 | Ta2O5 | 31.91 | 430 | SiO2 | 53.98 |
| 431 | Ta2O5 | 22.99 | 432 | SiO2 | 48.04 |
| 433 | Ta2O5 | 32.75 | 434 | SiO2 | 46.04 |
| 435 | Ta2O5 | 23.83 | 436 | SiO2 | 53.91 |
| 437 | Ta2O5 | 31.77 | 438 | SiO2 | 39.01 |
| 439 | Ta2O5 | 28.93 | 440 | SiO2 | 56.36 |
| 441 | Ta2O5 | 26.65 | 442 | SiO2 | 41.99 |
| 443 | Ta2O5 | 31.98 | 444 | SiO2 | 53.97 |
| 445 | Ta2O5 | 22.88 | 446 | SiO2 | 48.68 |
| 447 | Ta2O5 | 33.34 | 448 | SiO2 | 44.95 |
| 449 | Ta2O5 | 24.73 | 450 | SiO2 | 53.90 |
| 451 | Ta2O5 | 31.77 | 452 | SiO2 | 39.89 |
| 453 | Ta2O5 | 28.83 | 454 | SiO2 | 57.49 |
| 455 | Ta2O5 | 26.77 | 456 | SiO2 | 42.90 |
| 457 | Ta2O5 | 31.83 | 458 | SiO2 | 54.82 |
| 459 | Ta2O5 | 23.72 | 460 | SiO2 | 47.63 |
| 461 | Ta2O5 | 34.28 | 462 | SiO2 | 45.47 |
| 463 | Ta2O5 | 24.60 | 464 | SiO2 | 53.34 |
| 465 | Ta2O5 | 31.69 | 466 | SiO2 | 40.48 |
| 467 | Ta2O5 | 27.37 | 468 | SiO2 | 57.69 |
| 469 | Ta2O5 | 26.25 | 470 | SiO2 | 41.70 |
| 471 | Ta2O5 | 31.64 | 472 | SiO2 | 52.09 |
| 473 | Ta2O5 | 23.48 | 474 | SiO2 | 46.36 |
| 475 | Ta2O5 | 33.61 | 476 | SiO2 | 42.79 |
| 477 | Ta2O5 | 24.42 | 478 | SiO2 | 54.64 |
| 479 | Ta2O5 | 29.45 | 480 | SiO2 | 40.27 |
| 481 | Ta2O5 | 28.45 | 482 | SiO2 | 56.83 |
| 483 | Ta2O5 | 25.16 | 484 | SiO2 | 42.64 |
| 485 | Ta2O5 | 33.11 | 486 | SiO2 | 49.28 |
| 487 | Ta2O5 | 23.51 | 488 | SiO2 | 48.89 |
| 489 | Ta2O5 | 32.87 | 490 | SiO2 | 41.45 |
| 491 | Ta2O5 | 25.22 | 492 | SiO2 | 56.55 |
| 493 | Ta2O5 | 27.83 | 494 | SiO2 | 40.91 |
| 495 | Ta2O5 | 30.00 | 496 | SiO2 | 55.03 |
| 497 | Ta2O5 | 24.74 | 498 | SiO2 | 43.91 |
| 499 | Ta2O5 | 33.94 | 500 | SiO2 | 46.50 |
| 501 | Ta2O5 | 23.68 | 502 | SiO2 | 51.22 |
| 503 | Ta2O5 | 31.20 | 504 | SiO2 | 41.08 |
| 505 | Ta2O5 | 25.91 | 506 | SiO2 | 57.25 |
| 507 | Ta2O5 | 26.52 | 508 | SiO2 | 41.04 |
| 509 | Ta2O5 | 31.88 | 510 | SiO2 | 52.25 |
| 511 | Ta2O5 | 24.39 | 512 | SiO2 | 45.88 |
| 513 | Ta2O5 | 33.92 | 514 | SiO2 | 44.88 |
| 515 | Ta2O5 | 23.84 | 516 | SiO2 | 54.27 |
| 517 | Ta2O5 | 29.69 | 518 | SiO2 | 40.93 |
| 519 | Ta2O5 | 27.39 | 520 | SiO2 | 56.42 |
| 521 | Ta2O5 | 25.96 | 522 | SiO2 | 41.62 |
| 523 | Ta2O5 | 33.13 | 524 | SiO2 | 49.87 |
| 525 | Ta2O5 | 24.26 | 526 | SiO2 | 48.04 |
| 527 | Ta2O5 | 32.99 | 528 | SiO2 | 44.21 |
| 529 | Ta2O5 | 24.09 | 530 | SiO2 | 56.46 |
| 531 | Ta2O5 | 28.76 | 532 | SiO2 | 41.03 |
| 533 | Ta2O5 | 29.15 | 534 | SiO2 | 55.08 |
| 535 | Ta2O5 | 25.99 | 536 | SiO2 | 42.08 |
| 537 | Ta2O5 | 33.82 | 538 | SiO2 | 48.07 |
| 539 | Ta2O5 | 23.43 | 540 | SiO2 | 50.01 |
| 541 | Ta2O5 | 30.81 | 542 | SiO2 | 42.38 |
| 543 | Ta2O5 | 24.56 | 544 | SiO2 | 56.01 |
| 545 | Ta2O5 | 27.03 | 546 | SiO2 | 40.75 |
| 547 | Ta2O5 | 31.56 | 548 | SiO2 | 52.21 |
| 549 | Ta2O5 | 25.88 | 550 | SiO2 | 44.83 |
| 551 | Ta2O5 | 34.07 | 552 | SiO2 | 47.85 |
| 553 | Ta2O5 | 23.54 | 554 | SiO2 | 54.05 |
| 555 | Ta2O5 | 29.96 | 556 | SiO2 | 42.77 |
| 557 | Ta2O5 | 26.00 | 558 | SiO2 | 55.09 |
| 559 | Ta2O5 | 27.51 | 560 | SiO2 | 40.02 |
| 561 | Ta2O5 | 32.90 | 562 | SiO2 | 51.06 |

TABLE 2-continued

Notch Filter (600 m) Having A Single Notch at 632.8 nm.

| Layer # | Material | Thickness (nm) | Layer # | Material | Thickness (nm) |
|---|---|---|---|---|---|
| 563 | Ta2O5 | 25.58 | 564 | SiO2 | 47.21 |
| 565 | Ta2O5 | 33.31 | 566 | SiO2 | 49.61 |
| 567 | Ta2O5 | 23.51 | 568 | SiO2 | 56.18 |
| 569 | Ta2O5 | 30.68 | 570 | SiO2 | 43.24 |
| 571 | Ta2O5 | 27.47 | 572 | SiO2 | 53.66 |
| 573 | Ta2O5 | 29.00 | 574 | SiO2 | 39.15 |
| 575 | Ta2O5 | 32.20 | 576 | SiO2 | 51.21 |
| 577 | Ta2O5 | 24.52 | 578 | SiO2 | 48.20 |
| 579 | Ta2O5 | 31.08 | 580 | SiO2 | 49.96 |
| 581 | Ta2O5 | 23.46 | 582 | SiO2 | 54.52 |
| 583 | Ta2O5 | 31.31 | 584 | SiO2 | 41.45 |
| 585 | Ta2O5 | 29.00 | 586 | SiO2 | 52.18 |
| 587 | Ta2O5 | 29.18 | 588 | SiO2 | 40.57 |
| 589 | Ta2O5 | 31.37 | 590 | SiO2 | 53.39 |
| 591 | Ta2O5 | 23.26 | 592 | SiO2 | 50.07 |
| 593 | Ta2O5 | 30.34 | 594 | SiO2 | 48.44 |
| 595 | Ta2O5 | 24.45 | 596 | SiO2 | 51.91 |
| 597 | Ta2O5 | 31.67 | 598 | SiO2 | 39.47 |
| 599 | Ta2O5 | 29.89 | 600 | SiO2 | 51.21 |
| 601 | Ta2O5 | 27.63 | 602 | SiO2 | 43.28 |
| 603 | Ta2O5 | 29.76 | 604 | SiO2 | 54.14 |
| 605 | Ta2O5 | 22.41 | 606 | SiO2 | 51.43 |
| 607 | Ta2O5 | 30.28 | 608 | SiO2 | 45.07 |
| 609 | Ta2O5 | 26.41 | 610 | SiO2 | 49.35 |
| 611 | Ta2O5 | 31.53 | 612 | SiO2 | 38.79 |
| 613 | Ta2O5 | 30.21 | 614 | SiO2 | 52.21 |
| 615 | Ta2O5 | 25.20 | 616 | SiO2 | 47.58 |
| 617 | Ta2O5 | 28.51 | 618 | SiO2 | 53.66 |
| 619 | Ta2O5 | 22.62 | 620 | SiO2 | 51.24 |
| 621 | Ta2O5 | 31.24 | 622 | SiO2 | 40.69 |
| 623 | Ta2O5 | 29.08 | 624 | SiO2 | 47.37 |
| 625 | Ta2O5 | 30.41 | 626 | SiO2 | 40.67 |
| 627 | Ta2O5 | 29.87 | 628 | SiO2 | 54.94 |
| 629 | Ta2O5 | 23.08 | 630 | SiO2 | 53.51 |
| 631 | Ta2O5 | 27.90 | 632 | SiO2 | 52.84 |
| 633 | Ta2O5 | 25.32 | 634 | SiO2 | 48.26 |
| 635 | Ta2O5 | 34.00 | 636 | SiO2 | 37.82 |
| 637 | Ta2O5 | 31.24 | 638 | SiO2 | 46.03 |
| 639 | Ta2O5 | 28.48 | 640 | SiO2 | 44.58 |
| 641 | Ta2O5 | 26.21 | 642 | SiO2 | 59.59 |
| 643 | Ta2O5 | 20.74 | 644 | SiO2 | 56.62 |
| 645 | Ta2O5 | 28.33 | 646 | SiO2 | 48.80 |
| 647 | Ta2O5 | 30.12 | 648 | SiO2 | 42.50 |
| 649 | Ta2O5 | 38.87 | 650 | SiO2 | 36.14 |
| 651 | Ta2O5 | 32.32 | 652 | SiO2 | 48.59 |
| 653 | Ta2O5 | 23.95 | 654 | SiO2 | 52.27 |
| 655 | Ta2O5 | 18.10 | 656 | SiO2 | 65.65 |
| 657 | Ta2O5 | 15.32 | 658 | SiO2 | 56.94 |
| 659 | Ta2O5 | 27.18 | 660 | SiO2 | 38.54 |
| 661 | Ta2O5 | 38.89 | 662 | SiO2 | 25.21 |
| 663 | Ta2O5 | 57.11 | 664 | SiO2 | 18.26 |
| 665 | Ta2O5 | 44.91 | 666 | SiO2 | 38.76 |
| 667 | Ta2O5 | 21.66 | 668 | SiO2 | 111.00 |

Figure 12:
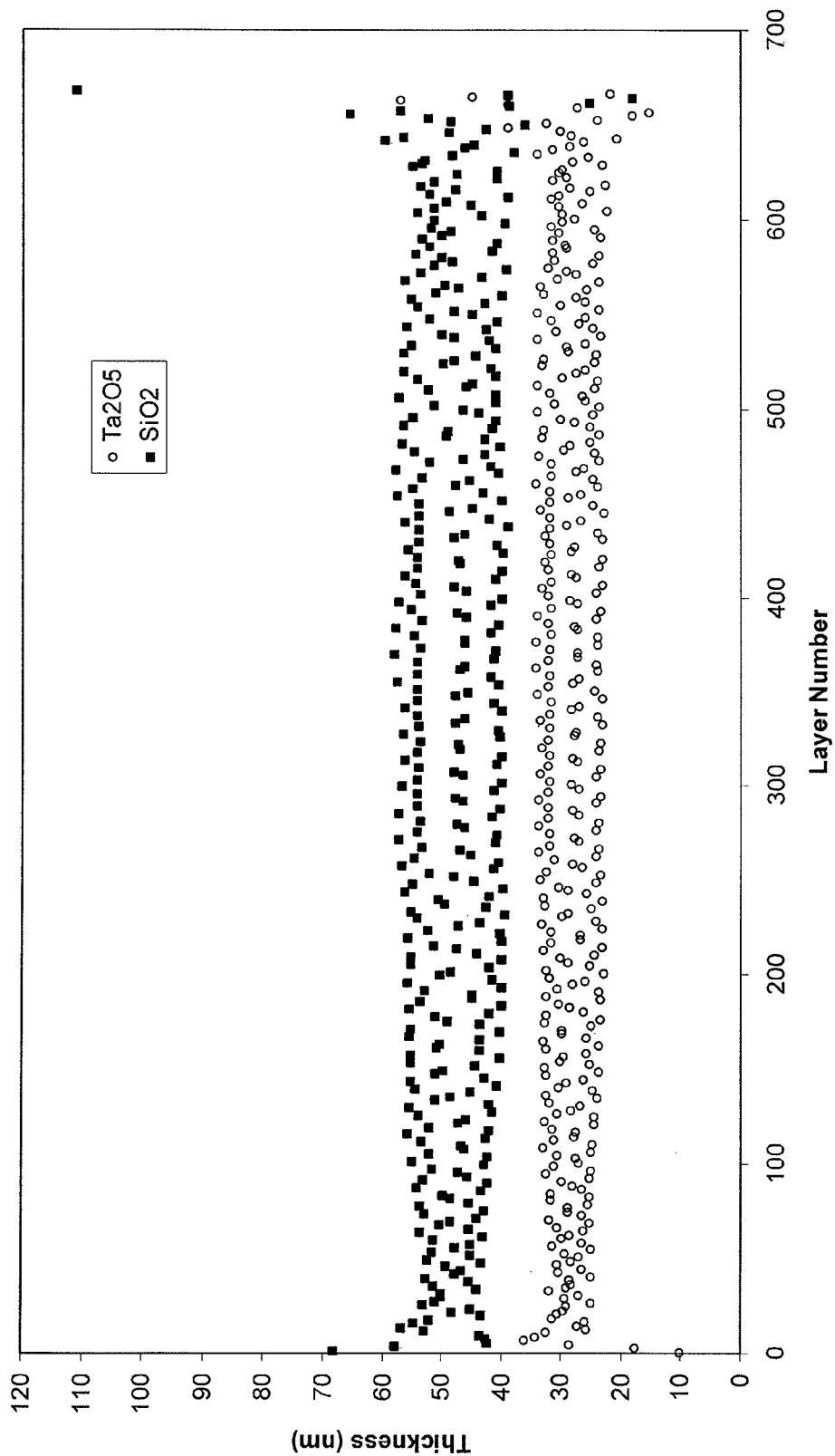
FIG. 12 is a graphical representation of the layer structure of a notch filter design based on a long-wave pass band defect and exhibiting a single notch at about 632.8 nm.

The data in Table 2 is represented graphically in FIG. 12. As shown, this filter design contained approximately 668 alternating layers of $SiO_2$ and $Ta_2O_5$. The sum total of the thicknesses of the individual layers was 25.6 µm.

Figure 13A:
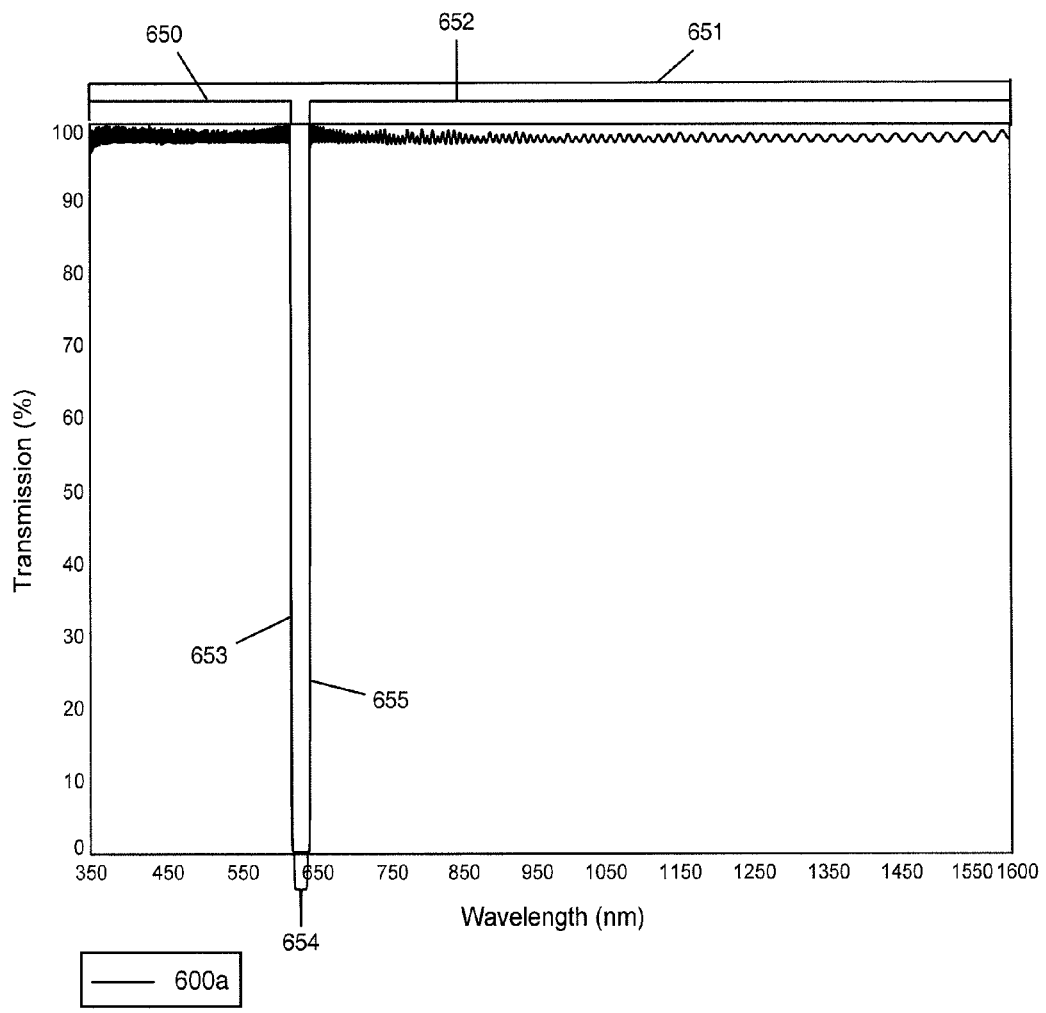
FIG. 13A is a calculated spectrum plotting transmission (%) vs. wavelength (nm) at 0 degrees angle of incidence for a notch filter design based on a long-wave pass band defect and exhibiting a single notch at about 632.8 nm.
Figure 13B:
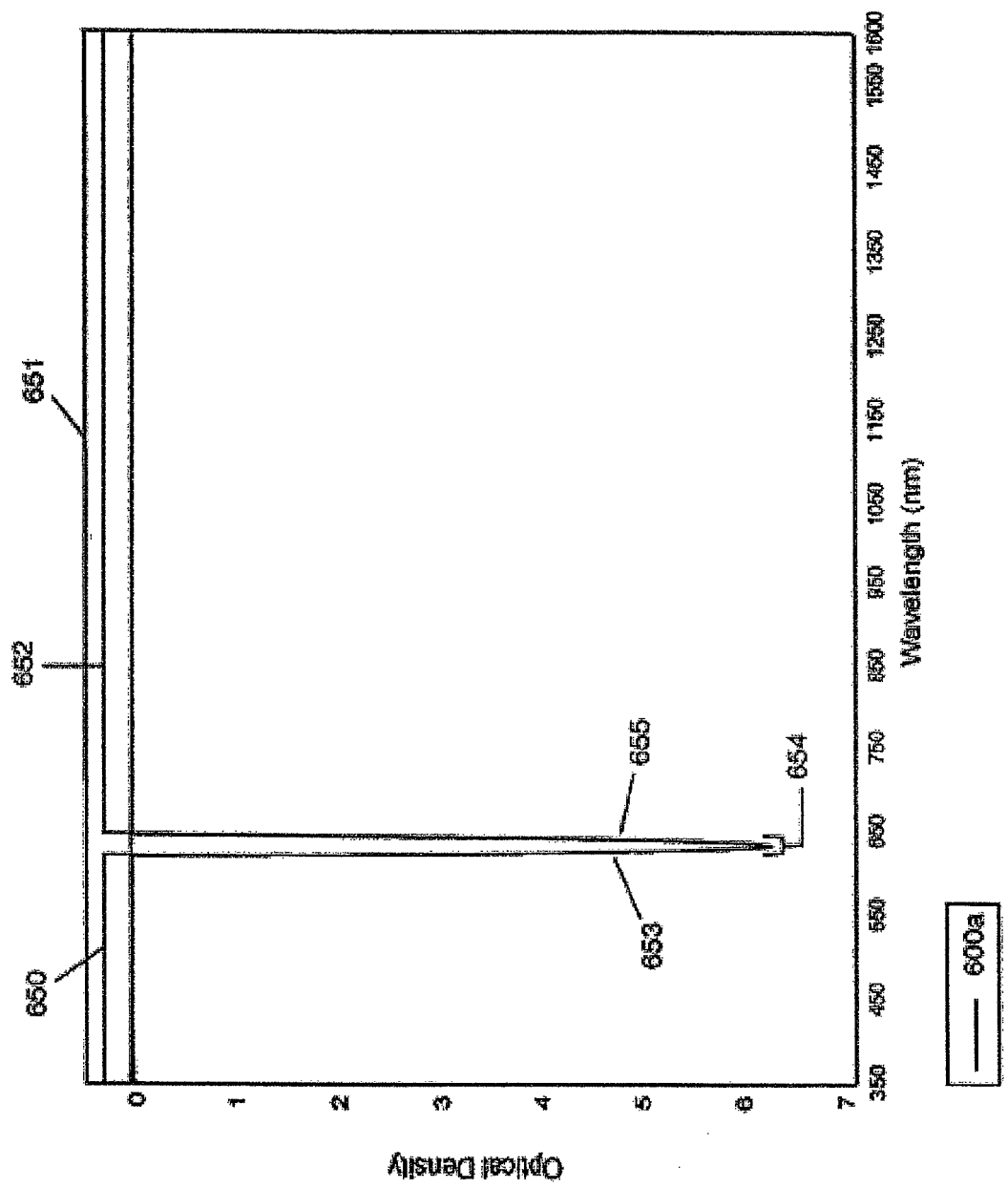
FIG. 13B is a calculated spectrum plotting optical density vs. wavelength (nm) at 0 degrees angle of incidence for a notch filter design based on a long-wave pass band defect and exhibiting a single notch at about 632.8 nm.

The spectrum of filter 600*m* was calculated at 0° angle of incidence. A portion of the calculated spectrum 600*a* for light of average polarization is shown in FIGS. 13A and B. As shown, spectrum 600*a* includes a pass band 651 extending from about 350 nm to above 1610 nm, which is interrupted by a single notch band 654 at about 632.8 nm. Pass band 651 includes pass band regions 650 and 652. Pass band region 652 extends from about 665 nm to above 1610 nm. The filter exhibits substantially greater than 90% transmission of all light having wavelengths within pass band regions 650 and 652.

Notch band 654 correlates to a pass band defect on the long wave side of the fundamental stop band of the filter (not shown), and has a short wave edge 653 and a long wave edge 655. The filter exhibits blocking of greater than optical density 6 of wavelengths within notch band 654.

Examples 5 and 6

Fabricated Single Notch Filters Based on Pass Band Defect and Exhibiting Extended Pass Band Bandwidth Two thin film notch filters (700*m*, 800*m*) based on LWP pass band defect were designed having the configurations shown in the following table.

TABLE 3

Notch filters based on LWP pass band defect

| Layer No. | Material | Example 5: Single Notch at 532 nm (700 m) Layer thickness in nm | Example 6: Single Notch at 808 nm (800 m) Layer thickness in nm |
|---|---|---|---|
| 1 | Ta2O5 | 10 | 10.003823 |
| 2 | SiO2 | 65.801053 | 65.150497 |
| 3 | Ta2O5 | 20.245876 | 19.262996 |
| 4 | SiO2 | 49.724275 | 54.215664 |
| 5 | Ta2O5 | 33.362109 | 28.905926 |
| 6 | SiO2 | 37.097508 | 42.278584 |
| 7 | Ta2O5 | 40.989575 | 39.131071 |
| 8 | SiO2 | 33.899983 | 36.577222 |
| 9 | Ta2O5 | 40.882155 | 37.091569 |
| 10 | SiO2 | 40.520062 | 45.895468 |
| 11 | Ta2O5 | 32.450609 | 30.422459 |
| 12 | SiO2 | 51.232948 | 52.745963 |
| 13 | Ta2O5 | 27.463299 | 28.013825 |
| 14 | SiO2 | 59.34817 | 57.945931 |
| 15 | Ta2O5 | 24.747094 | 24.617881 |
| 16 | SiO2 | 55.784762 | 61.462101 |
| 17 | Ta2O5 | 28.752554 | 27.343517 |
| 18 | SiO2 | 50.093699 | 49.653826 |
| 19 | Ta2O5 | 32.070406 | 34.499105 |
| 20 | SiO2 | 43.119079 | 45.320163 |
| 21 | Ta2O5 | 33.85735 | 32.731343 |
| 22 | SiO2 | 45.106228 | 49.377001 |
| 23 | Ta2O5 | 31.76459 | 32.304059 |
| 24 | SiO2 | 46.293392 | 48.014111 |
| 25 | Ta2O5 | 28.429434 | 31.259221 |
| 26 | SiO2 | 52.348024 | 55.175416 |
| 27 | Ta2O5 | 27.168583 | 25.88381 |
| 28 | SiO2 | 49.36194 | 58.056196 |
| 29 | Ta2O5 | 27.141424 | 29.888435 |
| 30 | SiO2 | 48.919019 | 47.575629 |
| 31 | Ta2O5 | 29.23108 | 33.314832 |
| 32 | SiO2 | 42.32878 | 49.609852 |
| 33 | Ta2O5 | 29.794032 | 30.426727 |
| 34 | SiO2 | 43.439095 | 49.808892 |
| 35 | Ta2O5 | 30.015663 | 33.368966 |
| 36 | SiO2 | 42.694649 | 46.773268 |
| 37 | Ta2O5 | 28.452353 | 30.357211 |
| 38 | SiO2 | 49.664194 | 57.297299 |
| 39 | Ta2O5 | 28.143207 | 26.022332 |
| 40 | SiO2 | 48.608684 | 54.163436 |
| 41 | Ta2O5 | 28.202943 | 32.166498 |
| 42 | SiO2 | 51.621846 | 46.859861 |
| 43 | Ta2O5 | 31.112055 | 31.297286 |
| 44 | SiO2 | 46.904942 | 52.845968 |
| 45 | Ta2O5 | 31.133614 | 30.104462 |
| 46 | SiO2 | 48.872506 | 47.190718 |
| 47 | Ta2O5 | 33.123161 | 34.704234 |
| 48 | SiO2 | 48.628863 | 47.76322 |
| 49 | Ta2O5 | 29.744714 | 28.276192 |
| 50 | SiO2 | 51.517908 | 58.954076 |
| 51 | Ta2O5 | 31.270613 | 27.523654 |
| 52 | SiO2 | 52.689946 | 49.5701 |
| 53 | Ta2O5 | 28.947065 | 33.476532 |
| 54 | SiO2 | 49.961627 | 49.002113 |
| 55 | Ta2O5 | 32.389607 | 28.913319 |
| 56 | SiO2 | 50.513914 | 54.151854 |

TABLE 3-continued

Notch filters based on LWP pass band defect

| Layer No. | Material | Example 5: Single Notch at 532 nm (700 m) Layer thickness in nm | Example 6: Single Notch at 808 nm (800 m) Layer thickness in nm |
|---|---|---|---|
| 57 | Ta2O5 | 31.367422 | 31.696076 |
| 58 | SiO2 | 46.480814 | 44.312237 |
| 59 | Ta2O5 | 32.352063 | 34.425465 |
| 60 | SiO2 | 51.856737 | 51.856875 |
| 61 | Ta2O5 | 30.36883 | 26.229791 |
| 62 | SiO2 | 48.573886 | 57.855118 |
| 63 | Ta2O5 | 29.752596 | 30.351518 |
| 64 | SiO2 | 53.327312 | 46.356648 |
| 65 | Ta2O5 | 30.554836 | 32.812473 |
| 66 | SiO2 | 47.284824 | 53.159876 |
| 67 | Ta2O5 | 29.847593 | 27.617776 |
| 68 | SiO2 | 50.256281 | 51.659663 |
| 69 | Ta2O5 | 32.551008 | 34.600599 |
| 70 | SiO2 | 46.22411 | 43.108482 |
| 71 | Ta2O5 | 29.361757 | 32.080271 |
| 72 | SiO2 | 50.389753 | 56.759476 |
| 73 | Ta2O5 | 31.698015 | 25.792726 |
| 74 | SiO2 | 49.842631 | 53.409736 |
| 75 | Ta2O5 | 28.086477 | 33.259372 |
| 76 | SiO2 | 50.798297 | 45.996118 |
| 77 | Ta2O5 | 32.22228 | 30.118841 |
| 78 | SiO2 | 50.583864 | 56.969536 |
| 79 | Ta2O5 | 29.536545 | 28.212785 |
| 80 | SiO2 | 47.687743 | 46.878898 |
| 81 | Ta2O5 | 33.380612 | 36.595054 |
| 82 | SiO2 | 51.396056 | 45.118647 |
| 83 | Ta2O5 | 30.232538 | 28.76181 |
| 84 | SiO2 | 47.882729 | 59.51579 |
| 85 | Ta2O5 | 31.539979 | 27.460841 |
| 86 | SiO2 | 54.609405 | 47.777314 |
| 87 | Ta2O5 | 30.51283 | 34.720696 |
| 88 | SiO2 | 47.880891 | 49.195258 |
| 89 | Ta2O5 | 30.664349 | 27.065472 |
| 90 | SiO2 | 53.325417 | 57.539343 |
| 91 | Ta2O5 | 32.953782 | 30.869753 |
| 92 | SiO2 | 47.146207 | 42.712543 |
| 93 | Ta2O5 | 30.024666 | 36.164119 |
| 94 | SiO2 | 51.987533 | 50.358238 |
| 95 | Ta2O5 | 33.376826 | 25.917334 |
| 96 | SiO2 | 50.20754 | 58.318751 |
| 97 | Ta2O5 | 28.396411 | 30.882413 |
| 98 | SiO2 | 51.287305 | 44.283884 |
| 99 | Ta2O5 | 32.770753 | 33.322153 |
| 100 | SiO2 | 52.14977 | 54.494854 |
| 101 | Ta2O5 | 29.073587 | 25.673304 |
| 102 | SiO2 | 47.594591 | 53.846004 |
| 103 | Ta2O5 | 33.052353 | 34.677519 |
| 104 | SiO2 | 52.228099 | 41.167275 |
| 105 | Ta2O5 | 30.052574 | 33.176165 |
| 106 | SiO2 | 46.202764 | 56.395523 |
| 107 | Ta2O5 | 31.234671 | 25.229806 |
| 108 | SiO2 | 53.967945 | 53.245658 |
| 109 | Ta2O5 | 30.118998 | 34.376769 |
| 110 | SiO2 | 46.245033 | 44.334282 |
| 111 | Ta2O5 | 29.783628 | 29.936326 |
| 112 | SiO2 | 53.130517 | 59.296665 |
| 113 | Ta2O5 | 31.785331 | 26.534477 |
| 114 | SiO2 | 45.745365 | 47.744746 |
| 115 | Ta2O5 | 29.277795 | 37.461517 |
| 116 | SiO2 | 51.928077 | 43.164507 |
| 117 | Ta2O5 | 32.857922 | 29.050379 |
| 118 | SiO2 | 47.656494 | 60.322505 |
| 119 | Ta2O5 | 28.177167 | 27.141219 |
| 120 | SiO2 | 51.839135 | 47.000847 |
| 121 | Ta2O5 | 32.964539 | 35.789506 |
| 122 | SiO2 | 50.839071 | 47.966105 |
| 123 | Ta2O5 | 27.985951 | 26.407168 |
| 124 | SiO2 | 49.315758 | 60.301397 |
| 125 | Ta2O5 | 33.688266 | 29.719354 |
| 126 | SiO2 | 52.222032 | 42.20782 |
| 127 | Ta2O5 | 29.38394 | 37.263259 |
| 128 | SiO2 | 46.854747 | 48.936569 |
| 129 | Ta2O5 | 32.816194 | 25.74566 |
| 130 | SiO2 | 54.635219 | 59.066644 |
| 131 | Ta2O5 | 29.959099 | 30.84785 |
| 132 | SiO2 | 46.75317 | 42.759765 |
| 133 | Ta2O5 | 30.797215 | 34.273716 |
| 134 | SiO2 | 55.163875 | 54.286694 |
| 135 | Ta2O5 | 31.840774 | 24.413015 |
| 136 | SiO2 | 46.05142 | 56.22287 |
| 137 | Ta2O5 | 29.603889 | 33.990967 |
| 138 | SiO2 | 53.111105 | 39.875218 |
| 139 | Ta2O5 | 33.291545 | 34.200312 |
| 140 | SiO2 | 47.53246 | 55.473427 |
| 141 | Ta2O5 | 28.016719 | 24.742929 |
| 142 | SiO2 | 51.690723 | 53.778265 |
| 143 | Ta2O5 | 33.016588 | 34.578634 |
| 144 | SiO2 | 49.907426 | 42.243913 |
| 145 | Ta2O5 | 27.338221 | 30.718759 |
| 146 | SiO2 | 49.17692 | 59.919843 |
| 147 | Ta2O5 | 33.339842 | 24.957305 |
| 148 | SiO2 | 51.166532 | 49.525229 |
| 149 | Ta2O5 | 28.125453 | 37.281521 |
| 150 | SiO2 | 46.41038 | 41.355447 |
| 151 | Ta2O5 | 32.886433 | 29.948014 |
| 152 | SiO2 | 53.379591 | 60.226289 |
| 153 | Ta2O5 | 28.904556 | 26.242761 |
| 154 | SiO2 | 45.980491 | 47.231569 |
| 155 | Ta2O5 | 31.383288 | 36.598189 |
| 156 | SiO2 | 55.200485 | 45.792229 |
| 157 | Ta2O5 | 30.519298 | 26.702597 |
| 158 | SiO2 | 45.087659 | 62.106349 |
| 159 | Ta2O5 | 30.555105 | 27.863575 |
| 160 | SiO2 | 54.622314 | 43.259144 |
| 161 | Ta2O5 | 32.704797 | 38.031549 |
| 162 | SiO2 | 45.917606 | 46.510717 |
| 163 | Ta2O5 | 28.87997 | 26.210655 |
| 164 | SiO2 | 53.39466 | 60.193551 |
| 165 | Ta2O5 | 33.378043 | 29.8947 |
| 166 | SiO2 | 49.081062 | 42.191557 |
| 167 | Ta2O5 | 27.456373 | 35.735274 |
| 168 | SiO2 | 51.172402 | 52.164514 |
| 169 | Ta2O5 | 33.8621 | 24.036527 |
| 170 | SiO2 | 50.668017 | 59.141611 |
| 171 | Ta2O5 | 27.886235 | 32.276807 |
| 172 | SiO2 | 47.45931 | 39.70341 |
| 173 | Ta2O5 | 33.618186 | 35.631822 |
| 174 | SiO2 | 52.839082 | 53.721444 |
| 175 | Ta2O5 | 28.222627 | 24.425308 |
| 176 | SiO2 | 45.958416 | 55.496564 |
| 177 | Ta2O5 | 31.976308 | 34.153414 |
| 178 | SiO2 | 54.506532 | 40.722741 |
| 179 | Ta2O5 | 29.274623 | 32.338636 |
| 180 | SiO2 | 45.04971 | 59.2197 |
| 181 | Ta2O5 | 30.814863 | 23.772798 |
| 182 | SiO2 | 54.635805 | 52.412631 |
| 183 | Ta2O5 | 31.404006 | 36.456654 |
| 184 | SiO2 | 44.175971 | 40.363339 |
| 185 | Ta2O5 | 29.671398 | 31.291782 |
| 186 | SiO2 | 54.55712 | 59.696309 |
| 187 | Ta2O5 | 32.718722 | 25.357676 |
| 188 | SiO2 | 46.68292 | 48.723744 |
| 189 | Ta2O5 | 27.807847 | 37.131614 |
| 190 | SiO2 | 53.506018 | 43.62609 |
| 191 | Ta2O5 | 33.619338 | 27.734284 |
| 192 | SiO2 | 49.303462 | 63.059171 |
| 193 | Ta2O5 | 27.650582 | 26.298065 |
| 194 | SiO2 | 49.64795 | 45.113915 |
| 195 | Ta2O5 | 34.503756 | 38.246142 |
| 196 | SiO2 | 51.750325 | 44.697836 |
| 197 | Ta2O5 | 27.867437 | 26.839817 |
| 198 | SiO2 | 47.265306 | 61.085071 |
| 199 | Ta2O5 | 33.173828 | 28.605554 |
| 200 | SiO2 | 54.682504 | 42.454229 |

TABLE 3-continued

Notch filters based on LWP pass band defect

| Layer No. | Material | Example 5: Single Notch at 532 nm (700 m) Layer thickness in nm | Example 6: Single Notch at 808 nm (800 m) Layer thickness in nm |
|---|---|---|---|
| 201 | Ta2O5 | 28.601304 | 36.883156 |
| 202 | SiO2 | 45.496048 | 49.142896 |
| 203 | Ta2O5 | 31.64584 | 24.2212 |
| 204 | SiO2 | 55.245551 | 61.182176 |
| 205 | Ta2O5 | 30.518616 | 30.083299 |
| 206 | SiO2 | 44.194698 | 40.22505 |
| 207 | Ta2O5 | 30.317114 | 36.714849 |
| 208 | SiO2 | 54.472153 | 50.291283 |
| 209 | Ta2O5 | 32.260821 | 24.270388 |
| 210 | SiO2 | 45.119704 | 57.686509 |
| 211 | Ta2O5 | 28.191204 | 32.202029 |
| 212 | SiO2 | 54.785513 | 39.612605 |
| 213 | Ta2O5 | 33.07752 | 34.427083 |
| 214 | SiO2 | 47.945661 | 55.09032 |
| 215 | Ta2O5 | 27.375278 | 22.95353 |
| 216 | SiO2 | 51.365762 | 56.487377 |
| 217 | Ta2O5 | 34.49756 | 33.93087 |
| 218 | SiO2 | 50.416453 | 38.965071 |
| 219 | Ta2O5 | 27.626927 | 33.698993 |
| 220 | SiO2 | 48.479114 | 56.439826 |
| 221 | Ta2O5 | 33.968143 | 23.998103 |
| 222 | SiO2 | 54.126966 | 52.656524 |
| 223 | Ta2O5 | 28.184719 | 35.972749 |
| 224 | SiO2 | 46.565389 | 40.234802 |
| 225 | Ta2O5 | 32.488372 | 30.75739 |
| 226 | SiO2 | 56.195314 | 61.173248 |
| 227 | Ta2O5 | 30.260031 | 23.903948 |
| 228 | SiO2 | 44.672089 | 49.952821 |
| 229 | Ta2O5 | 30.988516 | 37.477171 |
| 230 | SiO2 | 55.455639 | 41.140074 |
| 231 | Ta2O5 | 32.579126 | 29.432748 |
| 232 | SiO2 | 45.265187 | 61.257483 |
| 233 | Ta2O5 | 28.784153 | 26.114905 |
| 234 | SiO2 | 54.799394 | 45.844517 |
| 235 | Ta2O5 | 33.247251 | 38.049696 |
| 236 | SiO2 | 48.351685 | 44.556054 |
| 237 | Ta2O5 | 27.042553 | 26.311806 |
| 238 | SiO2 | 51.85434 | 63.605981 |
| 239 | Ta2O5 | 34.254828 | 27.331093 |
| 240 | SiO2 | 50.219747 | 43.224563 |
| 241 | Ta2O5 | 27.431158 | 38.126162 |
| 242 | SiO2 | 47.962006 | 46.632598 |
| 243 | Ta2O5 | 34.063528 | 25.642883 |
| 244 | SiO2 | 53.377969 | 60.76596 |
| 245 | Ta2O5 | 27.700007 | 30.151164 |
| 246 | SiO2 | 46.206796 | 40.587184 |
| 247 | Ta2O5 | 32.482196 | 36.696343 |
| 248 | SiO2 | 56.159335 | 51.464825 |
| 249 | Ta2O5 | 29.303343 | 23.558549 |
| 250 | SiO2 | 44.387491 | 60.084734 |
| 251 | Ta2O5 | 31.350116 | 31.725504 |
| 252 | SiO2 | 55.592764 | 39.39917 |
| 253 | Ta2O5 | 32.007506 | 35.633773 |
| 254 | SiO2 | 44.491977 | 53.366184 |
| 255 | Ta2O5 | 29.254367 | 23.808613 |
| 256 | SiO2 | 55.22319 | 55.679356 |
| 257 | Ta2O5 | 33.195516 | 34.293774 |
| 258 | SiO2 | 47.529933 | 39.075865 |
| 259 | Ta2O5 | 27.350146 | 33.191736 |
| 260 | SiO2 | 53.252446 | 57.902252 |
| 261 | Ta2O5 | 34.217116 | 23.007733 |
| 262 | SiO2 | 50.084391 | 53.963251 |
| 263 | Ta2O5 | 27.419705 | 35.670204 |
| 264 | SiO2 | 48.891959 | 39.402235 |
| 265 | Ta2O5 | 34.725082 | 31.74958 |
| 266 | SiO2 | 52.92207 | 59.177858 |
| 267 | Ta2O5 | 28.087531 | 24.618133 |
| 268 | SiO2 | 46.296995 | 49.348911 |
| 269 | Ta2O5 | 32.833179 | 37.561871 |
| 270 | SiO2 | 56.03185 | 41.086223 |
| 271 | Ta2O5 | 29.059958 | 28.848055 |
| 272 | SiO2 | 44.836689 | 63.071552 |
| 273 | Ta2O5 | 31.091894 | 24.949051 |
| 274 | SiO2 | 55.431489 | 46.623906 |
| 275 | Ta2O5 | 31.727264 | 38.053848 |
| 276 | SiO2 | 43.723187 | 42.932326 |
| 277 | Ta2O5 | 29.447197 | 27.460025 |
| 278 | SiO2 | 54.716455 | 61.501917 |
| 279 | Ta2O5 | 32.841937 | 27.247267 |
| 280 | SiO2 | 45.968863 | 42.737414 |
| 281 | Ta2O5 | 27.288725 | 37.911375 |
| 282 | SiO2 | 53.587676 | 45.467677 |
| 283 | Ta2O5 | 33.462091 | 24.915015 |
| 284 | SiO2 | 48.616921 | 62.219423 |
| 285 | Ta2O5 | 26.858369 | 27.587399 |
| 286 | SiO2 | 50.023555 | 41.139754 |
| 287 | Ta2O5 | 34.57227 | 37.095484 |
| 288 | SiO2 | 50.339676 | 46.12846 |
| 289 | Ta2O5 | 27.299669 | 24.571641 |
| 290 | SiO2 | 47.424445 | 59.146483 |
| 291 | Ta2O5 | 33.651983 | 29.248826 |
| 292 | SiO2 | 54.266987 | 39.289181 |
| 293 | Ta2O5 | 27.599281 | 36.518336 |
| 294 | SiO2 | 45.659186 | 48.519592 |
| 295 | Ta2O5 | 32.003706 | 23.406289 |
| 296 | SiO2 | 55.380842 | 60.531212 |
| 297 | Ta2O5 | 29.601734 | 29.690765 |
| 298 | SiO2 | 43.59716 | 39.496899 |
| 299 | Ta2O5 | 31.009305 | 36.297316 |
| 300 | SiO2 | 54.71701 | 50.421964 |
| 301 | Ta2O5 | 31.460661 | 23.939609 |
| 302 | SiO2 | 43.992687 | 57.659874 |
| 303 | Ta2O5 | 28.809128 | 32.430335 |
| 304 | SiO2 | 55.39245 | 38.654713 |
| 305 | Ta2O5 | 32.245059 | 35.212245 |
| 306 | SiO2 | 46.329726 | 54.803531 |
| 307 | Ta2O5 | 27.293361 | 22.797758 |
| 308 | SiO2 | 53.199519 | 57.275646 |
| 309 | Ta2O5 | 33.98371 | 33.796786 |
| 310 | SiO2 | 48.128335 | 39.165247 |
| 311 | Ta2O5 | 27.358468 | 33.642458 |
| 312 | SiO2 | 49.748436 | 57.07663 |
| 313 | Ta2O5 | 34.679611 | 23.994683 |
| 314 | SiO2 | 51.837217 | 52.270398 |
| 315 | Ta2O5 | 27.054508 | 36.710473 |
| 316 | SiO2 | 48.159714 | 39.476824 |
| 317 | Ta2O5 | 33.206859 | 31.054862 |
| 318 | SiO2 | 55.816862 | 61.741608 |
| 319 | Ta2O5 | 28.470979 | 23.820548 |
| 320 | SiO2 | 44.951794 | 50.016104 |
| 321 | Ta2O5 | 32.533133 | 37.412753 |
| 322 | SiO2 | 55.434743 | 41.626579 |
| 323 | Ta2O5 | 31.34751 | 29.060578 |
| 324 | SiO2 | 44.059781 | 61.711862 |
| 325 | Ta2O5 | 30.159674 | 26.283408 |
| 326 | SiO2 | 56.082643 | 44.881659 |
| 327 | Ta2O5 | 32.350681 | 38.723166 |
| 328 | SiO2 | 46.319266 | 44.207381 |
| 329 | Ta2O5 | 27.723725 | 26.300608 |
| 330 | SiO2 | 54.738385 | 63.898546 |
| 331 | Ta2O5 | 33.91545 | 27.181743 |
| 332 | SiO2 | 48.165314 | 43.127036 |
| 333 | Ta2O5 | 27.266172 | 37.868701 |
| 334 | SiO2 | 50.020608 | 47.524379 |
| 335 | Ta2O5 | 34.829859 | 25.214363 |
| 336 | SiO2 | 50.979889 | 60.60703 |
| 337 | Ta2O5 | 27.270016 | 30.61103 |
| 338 | SiO2 | 47.898185 | 39.833411 |
| 339 | Ta2O5 | 33.173077 | 37.295031 |
| 340 | SiO2 | 54.876739 | 51.554262 |
| 341 | Ta2O5 | 27.667311 | 23.41462 |
| 342 | SiO2 | 45.849214 | 60.580453 |
| 343 | Ta2O5 | 32.359437 | 32.045499 |
| 344 | SiO2 | 55.229451 | 39.902838 |

TABLE 3-continued

Notch filters based on LWP pass band defect

| Layer No. | Material | Example 5: Single Notch at 532 nm (700 m) Layer thickness in nm | Example 6: Single Notch at 808 nm (800 m) Layer thickness in nm |
|---|---|---|---|
| 345 | Ta2O5 | 30.338726 | 35.186195 |
| 346 | SiO2 | 43.37546 | 55.321356 |
| 347 | Ta2O5 | 31.084494 | 23.852734 |
| 348 | SiO2 | 55.704277 | 54.919847 |
| 349 | Ta2O5 | 32.0837 | 35.831366 |
| 350 | SiO2 | 45.392428 | 38.932408 |
| 351 | Ta2O5 | 28.187374 | 32.967525 |
| 352 | SiO2 | 56.040065 | 60.265936 |
| 353 | Ta2O5 | 33.367861 | 23.436651 |
| 354 | SiO2 | 48.03671 | 52.888392 |
| 355 | Ta2O5 | 27.347467 | 36.674155 |
| 356 | SiO2 | 51.518199 | 41.350886 |
| 357 | Ta2O5 | 35.258657 | 30.159464 |
| 358 | SiO2 | 50.388545 | 62.032721 |
| 359 | Ta2O5 | 27.624845 | 25.783651 |
| 360 | SiO2 | 48.238644 | 46.460565 |
| 361 | Ta2O5 | 34.044363 | 39.260049 |
| 362 | SiO2 | 55.083605 | 43.453218 |
| 363 | Ta2O5 | 27.808707 | 27.287981 |
| 364 | SiO2 | 46.750166 | 64.576707 |
| 365 | Ta2O5 | 32.269888 | 26.976751 |
| 366 | SiO2 | 56.618039 | 44.46658 |
| 367 | Ta2O5 | 30.4651 | 38.070537 |
| 368 | SiO2 | 43.827989 | 48.249774 |
| 369 | Ta2O5 | 31.138827 | 25.350872 |
| 370 | SiO2 | 55.236794 | 61.579233 |
| 371 | Ta2O5 | 33.023932 | 31.140997 |
| 372 | SiO2 | 45.225086 | 39.993512 |
| 373 | Ta2O5 | 28.169661 | 37.721958 |
| 374 | SiO2 | 55.367135 | 52.635382 |
| 375 | Ta2O5 | 33.132194 | 23.618097 |
| 376 | SiO2 | 48.918363 | 60.349084 |
| 377 | Ta2O5 | 26.88469 | 32.927937 |
| 378 | SiO2 | 51.450964 | 40.452642 |
| 379 | Ta2O5 | 34.718338 | 34.42478 |
| 380 | SiO2 | 50.170562 | 57.451666 |
| 381 | Ta2O5 | 27.535718 | 24.041596 |
| 382 | SiO2 | 47.481784 | 53.752137 |
| 383 | Ta2O5 | 34.142899 | 37.052573 |
| 384 | SiO2 | 54.372882 | 39.262871 |
| 385 | Ta2O5 | 27.577254 | 32.113741 |
| 386 | SiO2 | 46.245414 | 61.530214 |
| 387 | Ta2O5 | 31.853464 | 24.095687 |
| 388 | SiO2 | 56.907632 | 50.943266 |
| 389 | Ta2O5 | 29.612033 | 37.312676 |
| 390 | SiO2 | 44.055061 | 42.889444 |
| 391 | Ta2O5 | 31.119579 | 28.680532 |
| 392 | SiO2 | 55.179301 | 63.094515 |
| 393 | Ta2O5 | 32.546004 | 26.768007 |
| 394 | SiO2 | 44.207776 | 44.379389 |
| 395 | Ta2O5 | 28.856554 | 39.585256 |
| 396 | SiO2 | 55.481568 | 44.86187 |
| 397 | Ta2O5 | 33.021687 | 26.338375 |
| 398 | SiO2 | 48.206163 | 63.942578 |
| 399 | Ta2O5 | 26.594568 | 28.256381 |
| 400 | SiO2 | 53.277155 | 42.993191 |
| 401 | Ta2O5 | 34.204021 | 37.430695 |
| 402 | SiO2 | 50.035974 | 50.59601 |
| 403 | Ta2O5 | 27.470288 | 24.412429 |
| 404 | SiO2 | 48.095805 | 60.561504 |
| 405 | Ta2O5 | 34.937633 | 32.520888 |
| 406 | SiO2 | 52.933711 | 39.014586 |
| 407 | Ta2O5 | 27.643111 | 36.927251 |
| 408 | SiO2 | 46.701762 | 54.219796 |
| 409 | Ta2O5 | 32.235654 | 23.533318 |
| 410 | SiO2 | 57.056974 | 58.30093 |
| 411 | Ta2O5 | 28.875554 | 34.086529 |
| 412 | SiO2 | 45.050974 | 40.615626 |
| 413 | Ta2O5 | 30.99853 | 33.044862 |
| 414 | SiO2 | 55.759806 | 59.582892 |
| 415 | Ta2O5 | 32.168051 | 24.157803 |
| 416 | SiO2 | 43.79677 | 51.783595 |
| 417 | Ta2O5 | 29.738405 | 38.039568 |
| 418 | SiO2 | 54.870661 | 39.772809 |
| 419 | Ta2O5 | 33.182961 | 30.981624 |
| 420 | SiO2 | 47.940333 | 62.388196 |
| 421 | Ta2O5 | 26.724603 | 25.014479 |
| 422 | SiO2 | 54.419232 | 48.814993 |
| 423 | Ta2O5 | 33.840924 | 37.71539 |
| 424 | SiO2 | 50.600905 | 44.741459 |
| 425 | Ta2O5 | 27.353963 | 27.307928 |
| 426 | SiO2 | 48.683295 | 63.635011 |
| 427 | Ta2O5 | 35.233673 | 27.927968 |
| 428 | SiO2 | 52.731342 | 42.80056 |
| 429 | Ta2O5 | 28.583151 | 39.50989 |
| 430 | SiO2 | 46.386725 | 46.838912 |
| 431 | Ta2O5 | 32.834359 | 25.652637 |
| 432 | SiO2 | 57.486304 | 62.783117 |
| 433 | Ta2O5 | 29.268495 | 29.945844 |
| 434 | SiO2 | 46.018107 | 42.041696 |
| 435 | Ta2O5 | 30.508486 | 36.472083 |
| 436 | SiO2 | 56.899769 | 53.617843 |
| 437 | Ta2O5 | 32.87683 | 23.830458 |
| 438 | SiO2 | 44.674072 | 58.876076 |
| 439 | Ta2O5 | 29.61374 | 34.18748 |
| 440 | SiO2 | 53.766979 | 38.679247 |
| 441 | Ta2O5 | 34.586969 | 35.745662 |
| 442 | SiO2 | 48.764792 | 56.555778 |
| 443 | Ta2O5 | 26.937613 | 23.846165 |
| 444 | SiO2 | 53.448861 | 55.489021 |
| 445 | Ta2O5 | 33.564913 | 35.647807 |
| 446 | SiO2 | 53.348157 | 41.283423 |
| 447 | Ta2O5 | 27.321757 | 31.148427 |
| 448 | SiO2 | 48.005112 | 62.004254 |
| 449 | Ta2O5 | 34.531081 | 24.749781 |
| 450 | SiO2 | 53.852566 | 49.1763 |
| 451 | Ta2O5 | 29.844997 | 39.01966 |
| 452 | SiO2 | 44.500351 | 41.169763 |
| 453 | Ta2O5 | 32.186214 | 29.446156 |
| 454 | SiO2 | 57.549805 | 62.946649 |
| 455 | Ta2O5 | 30.370459 | 26.404151 |
| 456 | SiO2 | 46.416734 | 46.115414 |
| 457 | Ta2O5 | 28.801004 | 37.791983 |
| 458 | SiO2 | 56.976184 | 47.105333 |
| 459 | Ta2O5 | 33.142522 | 25.697018 |
| 460 | SiO2 | 45.950929 | 63.53825 |
| 461 | Ta2O5 | 28.586846 | 29.495407 |
| 462 | SiO2 | 52.181554 | 41.013177 |
| 463 | Ta2O5 | 35.211672 | 38.871084 |
| 464 | SiO2 | 49.232207 | 49.225603 |
| 465 | Ta2O5 | 27.034665 | 24.993383 |
| 466 | SiO2 | 50.963265 | 60.551374 |
| 467 | Ta2O5 | 33.466002 | 31.76363 |
| 468 | SiO2 | 54.839 | 41.012743 |
| 469 | Ta2O5 | 27.078836 | 35.015962 |
| 470 | SiO2 | 47.485503 | 56.324345 |
| 471 | Ta2O5 | 33.451644 | 23.462161 |
| 472 | SiO2 | 54.726327 | 56.661852 |
| 473 | Ta2O5 | 30.529778 | 35.447725 |
| 474 | SiO2 | 43.635292 | 38.674587 |
| 475 | Ta2O5 | 32.163453 | 34.238894 |
| 476 | SiO2 | 56.228585 | 57.878888 |
| 477 | Ta2O5 | 31.438023 | 24.412951 |
| 478 | SiO2 | 46.669548 | 52.596026 |
| 479 | Ta2O5 | 28.060583 | 36.428344 |
| 480 | SiO2 | 57.607079 | 42.12023 |
| 481 | Ta2O5 | 32.939873 | 29.600226 |
| 482 | SiO2 | 47.762977 | 63.195297 |
| 483 | Ta2O5 | 28.214614 | 25.170715 |
| 484 | SiO2 | 51.323256 | 47.328976 |
| 485 | Ta2O5 | 35.829187 | 39.058444 |
| 486 | SiO2 | 50.029302 | 42.211968 |
| 487 | Ta2O5 | 27.843007 | 28.603363 |
| 488 | SiO2 | 48.898416 | 62.114955 |

TABLE 3-continued

Notch filters based on LWP pass band defect

| Layer No. | Material | Example 5: Single Notch at 532 nm (700 m) Layer thickness in nm | Example 6: Single Notch at 808 nm (800 m) Layer thickness in nm |
|---|---|---|---|
| 489 | Ta2O5 | 33.798111 | 27.496668 |
| 490 | SiO2 | 56.444349 | 44.650675 |
| 491 | Ta2O5 | 27.630417 | 37.558939 |
| 492 | SiO2 | 47.352446 | 48.531342 |
| 493 | Ta2O5 | 32.142253 | 24.893041 |
| 494 | SiO2 | 56.373865 | 63.048801 |
| 495 | Ta2O5 | 31.605341 | 30.05324 |
| 496 | SiO2 | 43.583946 | 40.571515 |
| 497 | Ta2O5 | 31.517764 | 38.293871 |
| 498 | SiO2 | 54.797093 | 49.937828 |
| 499 | Ta2O5 | 33.315068 | 25.031645 |
| 500 | SiO2 | 47.094778 | 58.827476 |
| 501 | Ta2O5 | 27.379589 | 32.712495 |
| 502 | SiO2 | 56.110833 | 40.683859 |
| 503 | Ta2O5 | 33.252695 | 34.259926 |
| 504 | SiO2 | 50.731386 | 57.319344 |
| 505 | Ta2O5 | 27.195214 | 23.235631 |
| 506 | SiO2 | 49.776259 | 55.99631 |
| 507 | Ta2O5 | 35.542975 | 35.531064 |
| 508 | SiO2 | 50.979126 | 38.898091 |
| 509 | Ta2O5 | 28.727402 | 33.673312 |
| 510 | SiO2 | 46.354414 | 57.762121 |
| 511 | Ta2O5 | 33.317277 | 24.897154 |
| 512 | SiO2 | 56.535474 | 50.948503 |
| 513 | Ta2O5 | 28.236571 | 36.703163 |
| 514 | SiO2 | 46.255615 | 42.179391 |
| 515 | Ta2O5 | 30.39602 | 29.062856 |
| 516 | SiO2 | 57.116888 | 63.260992 |
| 517 | Ta2O5 | 31.209261 | 25.000347 |
| 518 | SiO2 | 43.302444 | 47.083548 |
| 519 | Ta2O5 | 30.465267 | 38.655263 |
| 520 | SiO2 | 52.864294 | 42.262886 |
| 521 | Ta2O5 | 33.415651 | 28.61664 |
| 522 | SiO2 | 45.012945 | 60.771288 |
| 523 | Ta2O5 | 27.440839 | 27.727118 |
| 524 | SiO2 | 54.760793 | 44.045612 |
| 525 | Ta2O5 | 32.061842 | 37.473834 |
| 526 | SiO2 | 49.479339 | 47.871246 |
| 527 | Ta2O5 | 25.987952 | 24.851527 |
| 528 | SiO2 | 51.119188 | 63.072547 |
| 529 | Ta2O5 | 34.224699 | 29.073076 |
| 530 | SiO2 | 48.742697 | 41.17073 |
| 531 | Ta2O5 | 27.928174 | 38.016845 |
| 532 | SiO2 | 46.306992 | 48.435066 |
| 533 | Ta2O5 | 34.4914 | 25.482728 |
| 534 | SiO2 | 52.046685 | 58.173939 |
| 535 | Ta2O5 | 26.966602 | 31.909365 |
| 536 | SiO2 | 47.813885 | 40.476528 |
| 537 | Ta2O5 | 31.266959 | 34.802026 |
| 538 | SiO2 | 56.976187 | 55.063807 |
| 539 | Ta2O5 | 28.213522 | 22.966372 |
| 540 | SiO2 | 44.741983 | 57.801722 |
| 541 | Ta2O5 | 31.90765 | 33.479007 |
| 542 | SiO2 | 53.741685 | 39.086522 |
| 543 | Ta2O5 | 32.470184 | 34.647085 |
| 544 | SiO2 | 42.904057 | 54.527255 |
| 545 | Ta2O5 | 30.403942 | 24.882014 |
| 546 | SiO2 | 55.324098 | 52.426451 |
| 547 | Ta2O5 | 32.000046 | 35.537214 |
| 548 | SiO2 | 48.328644 | 40.729319 |
| 549 | Ta2O5 | 26.665922 | 30.842579 |
| 550 | SiO2 | 55.842201 | 61.159368 |
| 551 | Ta2O5 | 33.434345 | 23.672695 |
| 552 | SiO2 | 49.315059 | 51.055585 |
| 553 | Ta2O5 | 28.277665 | 37.054778 |
| 554 | SiO2 | 48.14683 | 40.824776 |
| 555 | Ta2O5 | 36.070823 | 30.678103 |
| 556 | SiO2 | 50.980162 | 58.973298 |
| 557 | Ta2O5 | 28.491797 | 26.863487 |
| 558 | SiO2 | 48.003734 | 46.312206 |
| 559 | Ta2O5 | 32.22306 | 37.614934 |
| 560 | SiO2 | 58.28214 | 45.173835 |
| 561 | Ta2O5 | 28.050991 | 26.469439 |
| 562 | SiO2 | 47.106033 | 64.143372 |
| 563 | Ta2O5 | 31.324174 | 26.92578 |
| 564 | SiO2 | 55.339642 | 44.370497 |
| 565 | Ta2O5 | 33.173813 | 37.993177 |
| 566 | SiO2 | 43.258917 | 46.290719 |
| 567 | Ta2O5 | 31.016218 | 27.028577 |
| 568 | SiO2 | 53.368136 | 58.405858 |
| 569 | Ta2O5 | 33.715045 | 30.932934 |
| 570 | SiO2 | 49.03408 | 41.566578 |
| 571 | Ta2O5 | 26.727414 | 36.033706 |
| 572 | SiO2 | 55.325692 | 52.497914 |
| 573 | Ta2O5 | 32.673542 | 23.536821 |
| 574 | SiO2 | 52.378823 | 60.512136 |
| 575 | Ta2O5 | 27.735453 | 31.496181 |
| 576 | SiO2 | 47.663439 | 40.832897 |
| 577 | Ta2O5 | 35.79182 | 35.477657 |
| 578 | SiO2 | 50.964516 | 52.388317 |
| 579 | Ta2O5 | 30.204905 | 25.705388 |
| 580 | SiO2 | 45.116845 | 53.415217 |
| 581 | Ta2O5 | 32.253456 | 34.993688 |
| 582 | SiO2 | 57.874323 | 40.517919 |
| 583 | Ta2O5 | 28.582758 | 32.14507 |
| 584 | SiO2 | 48.155781 | 59.462173 |
| 585 | Ta2O5 | 29.14898 | 23.438466 |
| 586 | SiO2 | 56.537465 | 54.103759 |
| 587 | Ta2O5 | 32.788975 | 35.146191 |
| 588 | SiO2 | 43.979588 | 41.504289 |
| 589 | Ta2O5 | 30.663033 | 31.716544 |
| 590 | SiO2 | 50.906098 | 56.946465 |
| 591 | Ta2O5 | 35.016645 | 27.206299 |
| 592 | SiO2 | 47.891577 | 47.143868 |
| 593 | Ta2O5 | 27.025392 | 37.470409 |
| 594 | SiO2 | 54.185597 | 44.079657 |
| 595 | Ta2O5 | 31.807849 | 27.678654 |
| 596 | SiO2 | 54.575454 | 63.606957 |
| 597 | Ta2O5 | 26.772718 | 25.860692 |
| 598 | SiO2 | 48.954371 | 47.469027 |
| 599 | Ta2O5 | 34.53703 | 36.566805 |
| 600 | SiO2 | 50.799322 | 45.977221 |
| 601 | Ta2O5 | 31.225928 | 28.23399 |
| 602 | SiO2 | 43.566227 | 57.214008 |
| 603 | Ta2O5 | 33.381907 | 30.98652 |
| 604 | SiO2 | 55.698248 | 41.880523 |
| 605 | Ta2O5 | 29.369756 | 36.629262 |
| 606 | SiO2 | 48.988056 | 50.881116 |
| 607 | Ta2O5 | 27.980389 | 24.544077 |
| 608 | SiO2 | 58.882631 | 61.617577 |
| 609 | Ta2O5 | 31.575227 | 29.753663 |
| 610 | SiO2 | 46.336884 | 43.632958 |
| 611 | Ta2O5 | 30.282035 | 34.928766 |
| 612 | SiO2 | 49.635779 | 51.695292 |
| 613 | Ta2O5 | 36.385334 | 26.870818 |
| 614 | SiO2 | 46.282315 | 52.702994 |
| 615 | Ta2O5 | 28.79744 | 34.99408 |
| 616 | SiO2 | 51.603007 | 40.986564 |
| 617 | Ta2O5 | 31.769469 | 33.013722 |
| 618 | SiO2 | 56.354859 | 58.005974 |
| 619 | Ta2O5 | 25.72446 | 23.725168 |
| 620 | SiO2 | 50.816941 | 56.387319 |
| 621 | Ta2O5 | 32.236382 | 33.127952 |
| 622 | SiO2 | 52.431641 | 44.151532 |
| 623 | Ta2O5 | 31.369175 | 31.621068 |
| 624 | SiO2 | 42.331785 | 55.485489 |
| 625 | Ta2O5 | 34.375931 | 28.537409 |
| 626 | SiO2 | 51.429316 | 46.268605 |
| 627 | Ta2O5 | 31.044984 | 37.757087 |
| 628 | SiO2 | 47.450971 | 43.705079 |
| 629 | Ta2O5 | 27.702867 | 28.761256 |
| 630 | SiO2 | 59.908059 | 62.266037 |
| 631 | Ta2O5 | 29.197421 | 25.547537 |
| 632 | SiO2 | 49.578109 | 50.568398 |

TABLE 3-continued

Notch filters based on LWP pass band defect

| Layer No. | Material | Example 5: Single Notch at 532 nm (700 m) Layer thickness in nm | Example 6: Single Notch at 808 nm (800 m) Layer thickness in nm |
|---|---|---|---|
| 633 | Ta2O5 | 28.508407 | 34.153423 |
| 634 | SiO2 | 50.37666 | 48.049238 |
| 635 | Ta2O5 | 36.194917 | 28.700112 |
| 636 | SiO2 | 44.016435 | 54.810936 |
| 637 | Ta2O5 | 31.166988 | 32.197519 |
| 638 | SiO2 | 47.810406 | 41.268427 |
| 639 | Ta2O5 | 33.397279 | 37.154495 |
| 640 | SiO2 | 54.58628 | 49.040577 |
| 641 | Ta2O5 | 25.329005 | 25.713417 |
| 642 | SiO2 | 55.168782 | 61.079449 |
| 643 | Ta2O5 | 29.184019 | 28.030911 |
| 644 | SiO2 | 57.051298 | 47.795712 |
| 645 | Ta2O5 | 29.692538 | 32.382491 |
| 646 | SiO2 | 43.765142 | 51.946974 |
| 647 | Ta2O5 | 35.542358 | 27.970105 |
| 648 | SiO2 | 47.668357 | 49.956704 |
| 649 | Ta2O5 | 34.464485 | 35.820368 |
| 650 | SiO2 | 44.298978 | 39.521994 |
| 651 | Ta2O5 | 29.48682 | 34.47368 |
| 652 | SiO2 | 58.606456 | 53.781554 |
| 653 | Ta2O5 | 27.152689 | 24.635589 |
| 654 | SiO2 | 55.02778 | 58.58189 |
| 655 | Ta2O5 | 24.958455 | 29.170212 |
| 656 | SiO2 | 55.179905 | 49.471049 |
| 657 | Ta2O5 | 32.53057 | 29.719441 |
| 658 | SiO2 | 43.098513 | 54.502192 |
| 659 | Ta2O5 | 32.256653 | 29.732175 |
| 660 | SiO2 | 41.155168 | 44.315374 |
| 661 | Ta2O5 | 36.616118 | 39.386561 |
| 662 | SiO2 | 43.75181 | 40.065283 |
| 663 | Ta2O5 | 27.08781 | 32.207851 |
| 664 | SiO2 | 53.406123 | 57.529585 |
| 665 | Ta2O5 | 25.49135 | 25.048954 |
| 666 | SiO2 | 61.443028 | 57.490602 |
| 667 | Ta2O5 | 21.964137 | 28.502816 |
| 668 | SiO2 | 54.539715 | 54.974237 |
| 669 | Ta2O5 | 31.178723 | 27.202686 |
| 670 | SiO2 | 45.627038 | 53.609933 |
| 671 | Ta2O5 | 36.088493 | 34.53089 |
| 672 | SiO2 | 34.81179 | 36.883753 |
| 673 | Ta2O5 | 41.431306 | 42.796739 |
| 674 | SiO2 | 43.509561 | 40.646743 |
| 675 | Ta2O5 | 31.054789 | 30.612102 |
| 676 | SiO2 | 53.776843 | 59.100602 |
| 677 | Ta2O5 | 21.152513 | 23.659354 |
| 678 | SiO2 | 80.313791 | 64.692993 |
| 679 | Ta2O5 | 17.597561 | 20.890205 |
| 680 | SiO2 | 65.829712 | 71.176753 |
| 681 | Ta2O5 | 24.608626 | 22.574481 |
| 682 | SiO2 | 45.235586 | 49.325786 |
| 683 | Ta2O5 | 44.586908 | 40.812736 |
| 684 | SiO2 | 21.129002 | 24.108805 |
| 685 | Ta2O5 | 56.795078 | 55.620497 |
| 686 | SiO2 | 16.523904 | 24.048807 |
| 687 | Ta2O5 | 52.178318 | 41.966655 |
| 688 | SiO2 | 35.250747 | 39.287196 |
| 689 | Ta2O5 | 21.477629 | 23.567065 |
| 690 | SiO2 | 112.750168 | 110.32934 |

Figure 14A:
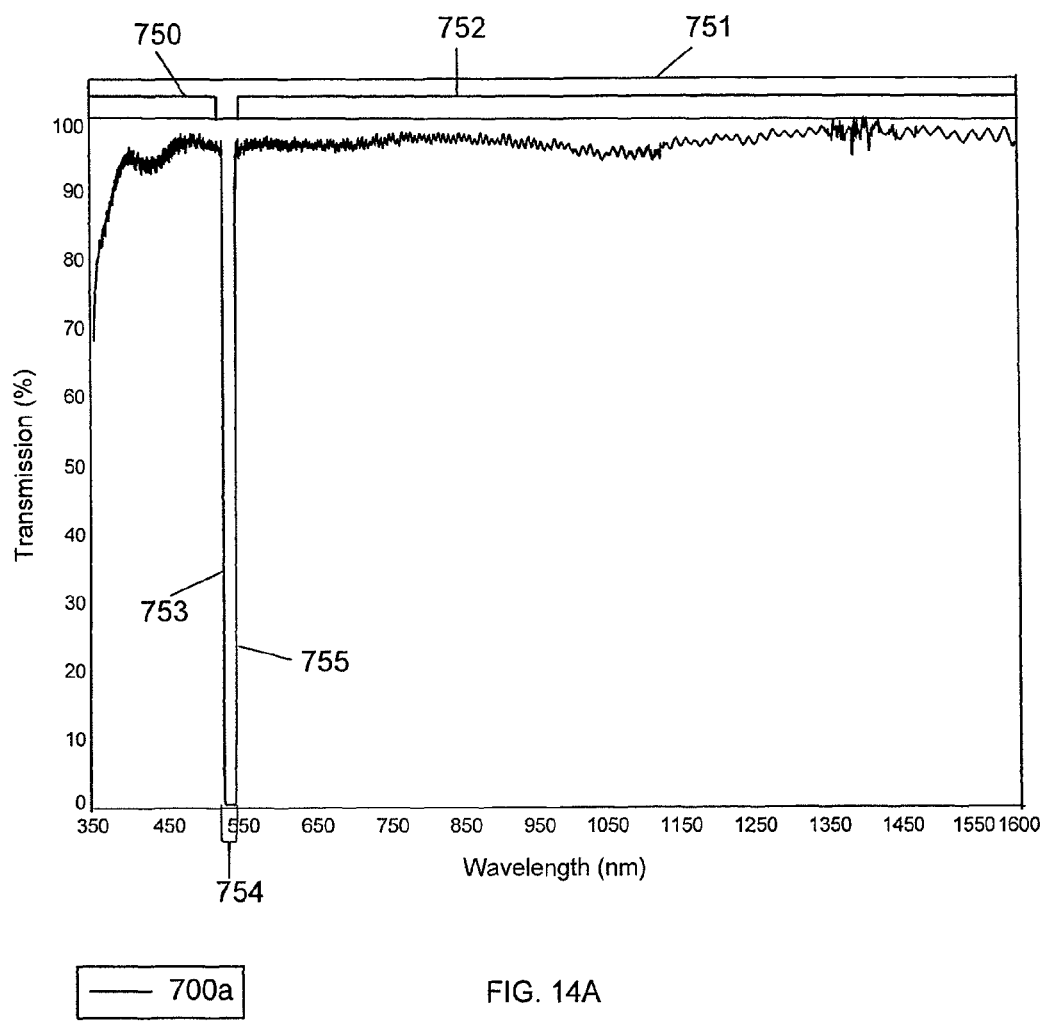
FIG. 14A is a measured spectrum plotting transmission (%) vs. wavelength (nm) at 0 degrees angle of incidence for a notch filter based on a long-wave pass band defect and exhibiting a single notch at about 532 nm.
Figure 14B:
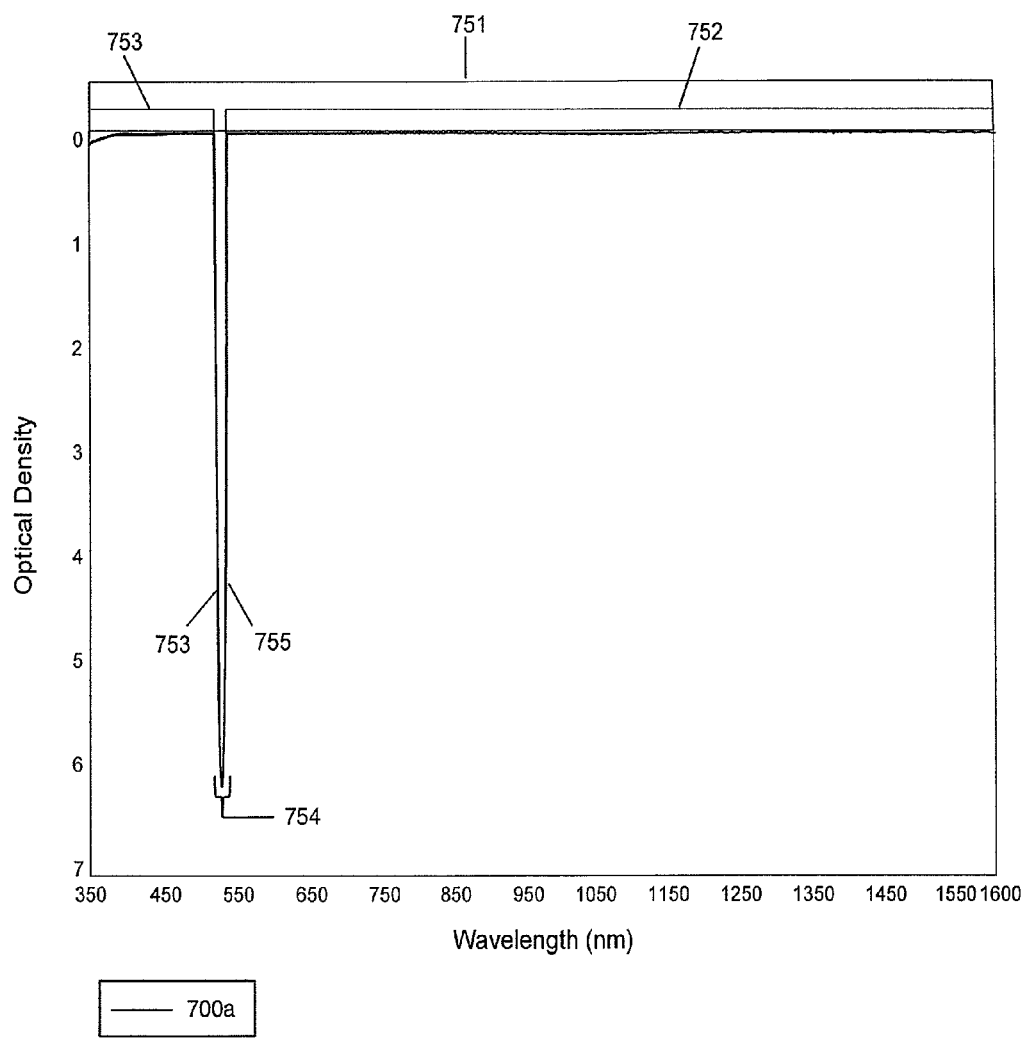
FIG. 14B is a measured spectrum plotting optical density vs. wavelength (nm) at 0 degrees angle of incidence for a notch filter based on a long-wave pass band defect and exhibiting a single notch at about 532 nm.

Filters 700*m* and 800*m* were deposited using a computer controlled ion beam sputtering system, such as the one described in detail in U.S. Pat. No. 7,068,430, which is incorporated herein by reference. These filters were then measured with a resolution of about 0.1 nm using a spectrophotometer. A portion of the measured spectrum 700*a* for light of average polarization for filter 700*m* is shown in FIGS. 14A and B. A portion of the measured spectrum 800*a* for light of average polarization for filter 800*m* is shown in FIGS. 15A and B.

As shown in FIGS. 14A and B, filter 700*m* exhibited a spectrum 700*a* that includes a pass band extending from about 350 nm to above 1600 nm. Pass band 751 included pass band regions 750 and 752, and was interrupted by a single notch 754 at about 532 nm. Pass band region 752 extended from about 550 nm to above 1600 nm. The optical transmission of light within pass band regions 750 and 752 was greater than 90%.

Figure 15A:
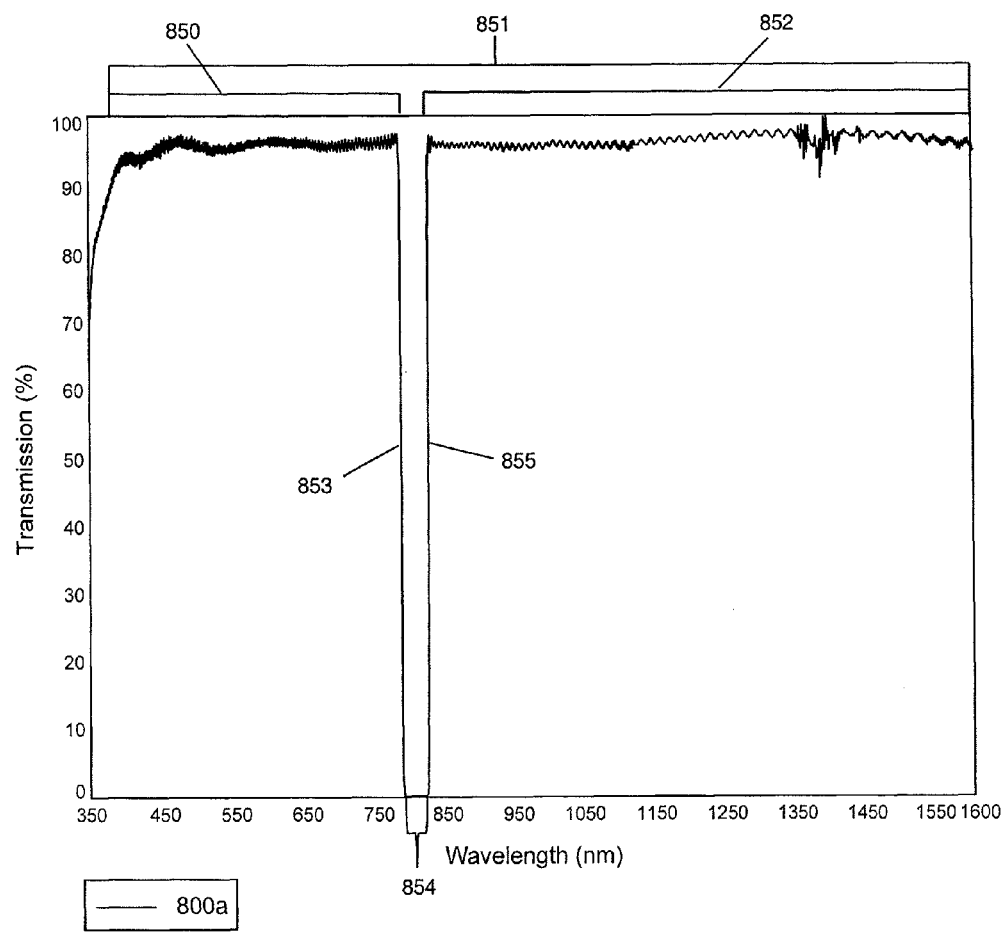
FIG. 15A is a measured spectrum plotting transmission (%) vs. wavelength (nm) at 0 degrees angle of incidence for a notch filter based on a long-wave pass band defect and exhibiting a single notch at about 808 nm.
Figure 15B:
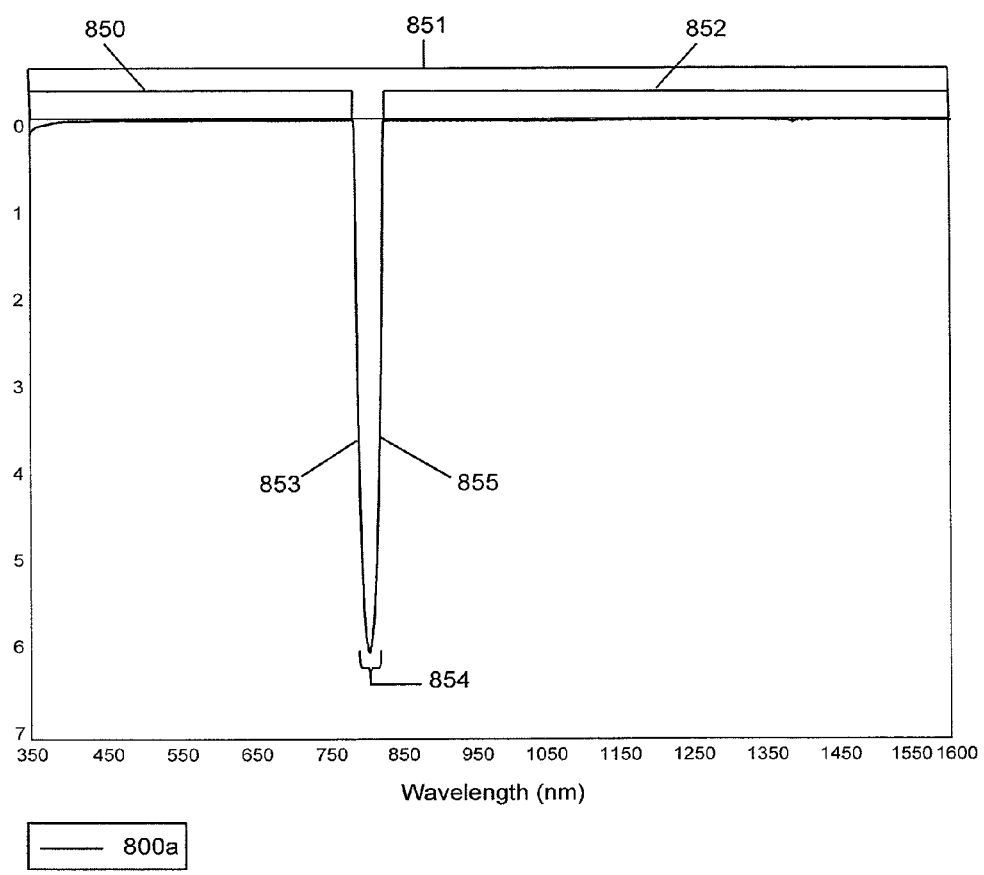
FIG. 15B is a measured spectrum plotting optical density vs. wavelength (nm) at 0 degrees angle of incidence for a notch filter based on a long-wave pass band defect and exhibiting a single notch at about 808 nm.

Similarly, as shown in FIGS. 15A and B, filter 800*m* exhibited a spectrum 800*a* that includes a pass band extending from about 350 nm to above 1600 nm. Pass band 851 included pass band regions 850 and 852, and was interrupted by a single notch 854 at about 830 nm. Pass band region 752 extended from about 830 nm to above 1600 nm. The optical transmission of light within pass band regions 850 and 852 was greater than 90%.

Other than in the examples, or where otherwise indicated, all numbers expressing endpoints of ranges, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the present disclosure are approximations, unless otherwise indicated the numerical values set forth in the specific examples are reported as precisely as possible. Any numerical value, however, inherently contains certain errors necessarily resulting from the standard deviation found in their respective testing measurements.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A thin film notch filter, comprising:
   a substrate; and
   a plurality of discrete material layers of alternating high and low refractive index deposited on said substrate;
   wherein said plurality of discrete material layers exhibits a spectrum comprising a pass band substantially extending from at least a first wavelength to at least a second wavelength, said pass band being interrupted only by a notch region corresponding to a non-harmonic stop band at a non-harmonic notch wavelength $\lambda_n$;
   wherein said spectrum is a function of a set of electromagnetic radiation wavelengths, said set of electromagnetic radiation wavelengths comprising at least a set of visible electromagnetic wavelengths;
   wherein each wavelength in said set of visible electromagnetic wavelengths is greater than said first wavelength, said second wavelength is greater than or equal to 900 nm, and said second wavelength is less than or equal to 1600 nm;
   wherein said notch region corresponding to said non-harmonic stop band at said non-harmonic notch wavelength $\lambda_n$ exhibits a full width at half-maximum that is less than or equal to a notch bandwidth at said non-harmonic notch wavelength $\lambda_n$;

wherein said notch bandwidth at said non-harmonic notch wavelength $\lambda_n$ is equal to $((55\times10^{-6})\times\lambda_n^2)+((14\times10^{-3})\times\lambda_n)-5.9$ nanometers, when $\lambda_n$ is specified in units of nanometers;

wherein said pass band exhibits at least 90% transmission at all wavelengths excluding wavelengths associated with said notch region exhibiting said full width at half-maximum;

wherein said plurality of discrete material layers substantially defines a fundamental stop band centered at a wavelength $\lambda_0$, said fundamental stop band exhibiting transmission less than 10%, said wavelength $\lambda_0$ being approximately $\approx 4\times n_H \times d_H^i$ for substantially all high refractive index material layers, and said wavelength $\lambda_0$ being approximately $\approx 4\times n_L \times d_L^i$ for substantially all low refractive index material layers, wherein said $n_H$ value is substantially an index of refraction value of an ith high refractive index material layer with thickness $d_H^i$ at said wavelength $\lambda_0$, and said $n_L$ value is substantially an index of refraction value of an ith low refractive index material layer with thickness $d_L^i$ at said wavelength $\lambda_0$; and wherein said non-harmonic notch wavelength $\lambda_n$ is at a value other than approximately $\approx (\lambda_0/j)$ where j is an integer.

2. The thin film notch filter of claim 1, wherein said non-hall ionic stop band correlates to a pass band defect.

3. The thin film notch filter of claim 2, wherein said pass band defect correlates to at least one of a set of: a short wave pass band defect and a long wave pass band defect.

4. The thin film notch filter of claim 1, wherein said notch region represents a region of electromagnetic radiation wavelengths that are substantially blocked by said thin film notch filter.

5. The thin film notch filter of claim 4, wherein said thin film notch filter has an optical density of at least about 4 at said non-harmonic notch wavelength $\lambda_n$.

6. The thin film notch filter of claim 5, wherein said optical density of at least about 4 is an optical density of at least about 6.

7. The thin film notch filter of claim 1, wherein said spectrum comprises said fundamental stop band.

8. The thin film notch filter of claim 7,
wherein said fundamental stop band corresponds to a set of fundamental stop band wavelengths;
wherein said set of electromagnetic radiation wavelengths comprises a set of ultraviolet electromagnetic wavelengths and a set of infrared electromagnetic wavelengths;
wherein said set of ultraviolet electromagnetic wavelengths comprises one fundamental stop band wavelength, the fundamental stop band wavelength being in the set of fundamental stop band wavelengths;
wherein said notch region corresponds to a set of notch wavelengths, the set of notch wavelengths comprising at least one of: a subset of visible electromagnetic wavelengths from the set of visible electromagnetic wavelengths and a subset of infrared electromagnetic wavelengths from the set of infrared electromagnetic wavelengths.

9. The thin film notch filter of claim 8, wherein said set of notch wavelengths comprises the subset of visible electromagnetic wavelengths.

10. The thin film notch filter of claim 1, wherein said notch region substantially corresponds to a desired wavelength of a laser.

11. The thin film notch filter of claim 10, wherein said desired wavelength of a laser is chosen from at least one of about: 405 nm, 440 nm, 442 nm, 458 nm, 473 nm, 488 nm, 491 nm, 515 nm, 532 nm, 543 nm, 561 nm, 568 nm, 594 nm, 633 nm, 635 nm, 647 nm, 664 nm, 671 nm, 780 nm, 785 nm, 808 nm, 830 nm, 850 nm, 980 nm, and 1064 nm.

12. The thin film notch filter of claim 1, wherein said first wavelength is about 350 nm and said second wavelength is about 1600 nm.

13. The thin film notch filter of claim 1, wherein said first wavelength is about 400 nm and said second wavelength is about 1300 nm.

14. The thin film notch filter of claim 1, wherein said first wavelength is a near-visible wavelength.

15. The thin film notch filter of claim 1, wherein said second wavelength is an infrared wavelength.

16. The thin film notch filter of claim 1, wherein said first wavelength is an ultraviolet wavelength.

17. A thin film notch filter, comprising
a substrate; and
a plurality of discrete material layers of alternating high and low refractive index deposited on said substrate;
wherein said plurality of discrete material layers exhibits a spectrum comprising a pass band extending from about 350 nm to about 1600 nm;
wherein said pass band is interrupted only by a notch region corresponding to a non-harmonic stop band at a non-harmonic notch wavelength $\lambda_n$;
wherein said plurality of discrete material layers exhibits low optical transmission of light having a wavelength at said non-harmonic notch wavelength $\lambda_n$;
wherein said notch region corresponding to said non-harmonic stop band at said non-harmonic notch wavelength $\lambda_n$ exhibits a full width at half-maximum that is less than or equal to a notch bandwidth at said non-harmonic notch wavelength $\lambda_n$;
wherein said notch bandwidth at said non-harmonic notch wavelength $\lambda_n$ is equal to $((55\times10^{-6})\times\lambda_n^2)+((14\times10^{-3})\times\lambda_n)-5.9$ nanometers, when $\lambda_n$ is specified in units of nanometers;
wherein said pass band exhibits at least 90% transmission at all wavelengths excluding wavelengths associated with said notch region exhibiting said full width at half-maximum;
wherein said plurality of discrete material layers substantially defines a fundamental stop band centered at a wavelength $\lambda_0$, said fundamental stop band exhibiting transmission less than 10%, said wavelength $\lambda_0$ being approximately $\approx 4\times n_H \times d_H^i$ for substantially all high refractive index material layers, and said wavelength $\lambda_0$ being approximately $\approx 4\times n_L \times d_L^i$ for substantially all low refractive index material layers, wherein said $n_H$ value is substantially an index of refraction value of an ith high refractive index material layer with thickness $d_H^i$ said wavelength $\lambda_0$, and said $n_L$ value is substantially an index of refraction value of an ith low refractive index material layer with thickness $d_L^i$ at said wavelength $\lambda_0$; and
wherein said non-harmonic notch wavelength is at a value other than approximately $\approx (\lambda_0/j)$ where j is an integer.

18. A thin film notch filter, comprising
a substrate; and
a plurality of discrete material layers of alternating high and low refractive index deposited on said substrate;
wherein said plurality of discrete material layers exhibits a spectrum comprising at least one stop band and a pass band, said pass band being interrupted only by a single notch region corresponding to a non-harmonic stop band at a non-harmonic notch wavelength $\lambda_n$, said notch region having a long wave side, and a short wave side;

wherein said pass band extends at least between a wavelength that is about $(1.3 \times \lambda_n)$ on the long wave side to a wavelength that is about $(\lambda_n/1.3)$ on the short wave side of said notch region;

wherein said notch region corresponding to said non-harmonic stop band at said non-harmonic notch wavelength $\lambda_n$ exhibits a full width at half-maximum that is less than or equal to a notch bandwidth at said non-harmonic notch wavelength $\lambda_n$;

wherein said notch bandwidth at said non-harmonic notch wavelength $\lambda_n$ is equal to $((55 \times 10^{-6}) \times \lambda_n^2) + ((14 \times 10^{-3}) \times \lambda_n) - 5.9$ nanometers, when $\lambda_n$ is specified in units of nanometers;

wherein said pass band exhibits at least 90% transmission at all wavelengths excluding wavelengths associated with said notch region exhibiting said full width at half-maximum;

wherein said plurality of discrete material layers substantially defines said stop band centered at a wavelength $\lambda_0$, said stop band exhibiting transmission less than 10%, said wavelength $\lambda_0$ being approximately $\approx 4 \times n_H \times d_H^i$ for substantially all high refractive index material layers, and said wavelength $\lambda_0$ being approximately $\approx 4 \times n_L \times d_L^i$ for substantially all low refractive index material layers, wherein said $n_H$ value is substantially an index of refraction value of an ith high refractive index material layer with thickness $d_H^i$ at said wavelength $\lambda_0$, and said $n_L$ value is substantially an index of refraction value of an ith low refractive index material layer with thickness $d_L^i$ at said wavelength $\lambda_0$; and wherein said non-harmonic notch wavelength $\lambda_n$ is at a value other than approximately $\approx (\lambda_0/j)$ where j is an integer.

19. The thin film notch filter of claim 18, wherein said pass band extends between at least a wavelength that is about $(1.4 \times \lambda_n)$ on the long wave side to a wavelength that is about $(\lambda_n/1.4)$ on the short wave side of said notch region.

20. The thin film notch filter of claim 19, wherein said pass band extends between at least a wavelength that is about $(1.5 \times \lambda_n)$ on the long wave side to a wavelength that is about $(\lambda_n/1.5)$ on the short wave side of said notch region.

21. A spectroscopy system, comprising:

an incident light source; and a thin film notch filter, the thin film notch filter comprising:

a substrate; and a plurality of discrete material layers of alternating high and low refractive index deposited on said substrate;

wherein said plurality of discrete material layers exhibits a spectrum comprising a pass band substantially extending from at least a first wavelength to at least a second wavelength, said pass band being interrupted only by a notch region corresponding to a non-harmonic stop band at a non-harmonic notch wavelength $\lambda_n$;

wherein said spectrum is a function of a set of electromagnetic radiation wavelengths, said set of electromagnetic radiation wavelengths comprising at least a set of visible electromagnetic wavelengths;

wherein each wavelength in said set of visible electromagnetic wavelengths is greater than said first wavelength, and said second wavelength is greater than or equal to 900 nm, and said second wavelength is less than or equal to 1600 nm;

wherein said notch region corresponding to said non-harmonic stop band at said non-harmonic notch wavelength $\lambda_n$ exhibits a full width at half-maximum that is less than or equal to a notch bandwidth at said non-harmonic notch wavelength $\lambda_n$;

wherein said notch bandwidth at said non-harmonic notch wavelength $\lambda_n$ is equal to $((55 \times 10^{-6}) \times \lambda_n^2) + ((14 \times 10^{-3}) \times \lambda_n) - 5.9$ nanometers, when $\lambda_n$ is specified in units of nanometers;

wherein said pass band exhibits at least 90% transmission at all wavelengths excluding wavelengths associated with said notch region exhibiting said full width at half-maximum;

wherein said plurality of discrete material layers substantially defines a fundamental stop band centered at a wavelength $\lambda_0$, said fundamental stop band exhibiting transmission less than 10%, said wavelength $\lambda_0$ being approximately $4 \times n_H \times d_H^i$ for substantially all high refractive index material layers, and said wavelength $\lambda_0$ being approximately $\approx 4 \times n_L \times d_L^i$ for substantially all low refractive index material layers, wherein said $n_H$ value is substantially an index of refraction value of an ith high refractive index material layer with thickness $d_H^i$ at said wavelength $\lambda_0$, and said $n_L$ value is substantially an index of refraction value of an ith low refractive index material layer with thickness $d_L^i$ at said wavelength $\lambda_0$; and wherein said non-harmonic notch wavelength is at a value other than approximately $\approx (\lambda_0/j)$ where j is an integer.

22. A method of making a thin film notch filter, the method comprising:

providing a substrate;

depositing a plurality of discrete material layers of alternating high and low refractive index on said substrate; and optimizing the configuration of said plurality of discrete material layers such that said plurality of discrete material layers exhibits a spectrum comprising a pass band substantially extending from at least a first wavelength to at least a second wavelength, said pass band being interrupted only by a notch region corresponding to a non-harmonic stop band at a non-harmonic notch wavelength $\lambda_n$;

wherein said spectrum is a function of a set of electromagnetic radiation wavelengths, said set of electromagnetic radiation wavelengths comprising at least a set of visible electromagnetic wavelengths; and wherein each wavelength in said set of visible electromagnetic wavelengths is greater than said first wavelength, said second wavelength is greater than or equal to 900 nm, and said second wavelength is less than or equal to 1600 nm;

wherein said notch region corresponding to said non-harmonic stop band at said non-harmonic notch wavelength $\lambda_n$ exhibits a full width at half-maximum that is less than or equal to a notch bandwidth at said non-harmonic notch wavelength $\lambda_n$;

wherein said notch bandwidth at said non-harmonic notch wavelength $\lambda_n$ is equal to $((55 \times 10^{-6}) \times \lambda_n^2) + ((14 \times 10^{-3}) \times \lambda_n) - 5.9$ nanometers, when $\lambda_n$ is specified in units of nanometers;

wherein said pass band exhibits at least 90% transmission at all wavelengths excluding wavelengths associated with said notch region exhibiting said full width at half-maximum;

wherein said plurality of discrete material layers substantially defines a fundamental stop band centered at a wavelength $\lambda_0$, said fundamental stop band exhibiting transmission less than 10%, said wavelength $\lambda_0$ being approximately $4 \times n_H \times d_H^i$ for substantially all high refractive index material layers, and said wavelength $\lambda_0$ being approximately $\approx 4 \times n_L \times d_L^i$ for substantially all low refractive index material layers, wherein said $n_H$ value is substantially an index of refraction value of an ith high refractive index material layer with thickness $d_H^i$ at said wavelength $\lambda_0$, and said $n_L$ value is substantially an index of refraction value of an ith low refractive index material layer with thickness $d_L^i$ at said wavelength $\lambda_0$; and wherein said non-harmonic notch wavelength $\lambda_n$ is at a value other than approximately $\approx (\lambda_0/j)$ where j is an integer.

* * * * *